US012566544B2

(12) United States Patent
Bian et al.

(10) Patent No.: US 12,566,544 B2
(45) Date of Patent: Mar. 3, 2026

(54) PAGE SLIDING PROCESSING METHOD AND RELATED APPARATUS

(71) Applicant: Huawei Technologies Co., Ltd., Shenzhen (CN)

(72) Inventors: Chao Bian, Nanjing (CN); Xiaoxiao Chen, Nanjing (CN); Fan Tang, Xi'an (CN); Zeng Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 18/175,138

(22) Filed: Feb. 27, 2023

(65) Prior Publication Data

US 2023/0205411 A1 Jun. 29, 2023

Related U.S. Application Data

(63) Continuation of application No. PCT/CN2021/115457, filed on Aug. 30, 2021.

(30) Foreign Application Priority Data

Aug. 31, 2020 (CN) .......................... 202010901735.7

(51) Int. Cl.
*G06F 3/0485* (2022.01)
*G06F 3/0483* (2013.01)
*G06F 3/0488* (2022.01)

(52) U.S. Cl.
CPC .......... *G06F 3/0485* (2013.01); *G06F 3/0483* (2013.01); *G06F 3/0488* (2013.01)

(58) Field of Classification Search
CPC .. G06F 3/0483; G06F 3/04883; G06F 3/0482; G06F 3/04845; G06F 3/0488
See application file for complete search history.

(56) References Cited

U.S. PATENT DOCUMENTS 7,469,381 B2 * 12/2008 Ording .............. H04M 1/72445
715/764
7,844,915 B2 * 11/2010 Platzer .................. G06F 3/0485
345/173

(Continued)

FOREIGN PATENT DOCUMENTS

CN 103092477 A 5/2013
CN 103150104 A 6/2013

(Continued)

OTHER PUBLICATIONS

Hi, I''m Jun Hei et al., "How about the multi-tasking interface animation after Honor v10 upgrades Hongmeng?," Aug. 23, 2021, https://www.bilibili.com/video/BV1gL411b7do/, 1 page.

(Continued)

*Primary Examiner* — Benjamin Smith
(74) *Attorney, Agent, or Firm* — Conley Rose, P.C.

(57) ABSTRACT

A page sliding processing method includes that an electronic device displays a second page module, a first page module, and a third page module which are sequentially arranged on the first page. There is a first interval between the first page module and the second page module and a second interval between the first page module and the third page module. The electronic device receives a sliding operation pointing from the first page module to the second page module.

18 Claims, 38 Drawing Sheets

(56) References Cited

U.S. PATENT DOCUMENTS

| | | | | |
|---|---|---|---|---|
| 7,872,652 B2* | 1/2011 | Platzer | G06F 9/451 | 345/473 |
| 8,209,606 B2* | 6/2012 | Ording | G06F 40/106 | 345/173 |
| 8,255,798 B2* | 8/2012 | Ording | G06F 40/106 | 345/173 |
| 8,429,557 B2* | 4/2013 | Platzer | G06F 3/0485 | 345/169 |
| 8,595,643 B2* | 11/2013 | Horagai | G06F 3/0485 | 715/830 |
| 8,656,311 B1* | 2/2014 | Harper | G06F 3/0488 | 715/201 |
| 8,762,886 B2* | 6/2014 | Lietzke | G06F 3/04812 | 345/173 |
| 8,799,816 B2* | 8/2014 | Wells | G06F 3/04883 | 715/830 |
| 8,881,050 B2* | 11/2014 | Kim | G06F 3/0488 | 345/173 |
| 9,052,814 B2* | 6/2015 | Ording | H04M 1/72445 | |
| 9,141,273 B2* | 9/2015 | Lee | G06F 3/04817 | |
| 9,329,764 B2* | 5/2016 | Kuscher | G06F 3/0485 | |
| 9,417,781 B2* | 8/2016 | Lee | G06F 3/0488 | |
| 9,417,787 B2* | 8/2016 | Fong | G06F 3/04886 | |
| 9,448,633 B2* | 9/2016 | Rodgers | G06F 3/017 | |
| 9,501,150 B2* | 11/2016 | Rodgers | G06F 3/0481 | |
| 9,529,519 B2* | 12/2016 | Blumenberg | G06F 3/04883 | |
| 9,575,648 B2* | 2/2017 | Blumenberg | G06F 3/0485 | |
| 9,678,658 B2* | 6/2017 | Zhang | G06F 3/0482 | |
| 9,823,828 B2* | 11/2017 | Zambetti | G06F 3/04847 | |
| 9,851,885 B2* | 12/2017 | Brinda | G06F 3/0485 | |
| 10,082,943 B2* | 9/2018 | Kim | G06F 3/0485 | |
| 10,168,861 B2* | 1/2019 | Takase | G06F 3/0485 | |
| 10,191,634 B2* | 1/2019 | Ren | G06F 3/04845 | |
| 10,331,325 B2* | 6/2019 | Won | G06F 3/0488 | |
| 10,387,026 B2* | 8/2019 | Takimoto | G06F 3/0482 | |
| 10,430,068 B2* | 10/2019 | Zhang | G06F 3/0482 | |
| 10,712,843 B2* | 7/2020 | Lee | G06F 3/041 | |
| 10,817,162 B2* | 10/2020 | Platzer | G06F 3/0485 | |
| 10,963,142 B2* | 3/2021 | Platzer | G06F 3/0485 | |
| 11,157,158 B2* | 10/2021 | Dakin | G06F 3/0488 | |
| 11,573,692 B2* | 2/2023 | Takimoto | G06F 3/04883 | |
| 11,644,966 B2* | 5/2023 | Dakin | G06F 3/0488 | 715/784 |
| 11,886,698 B2* | 1/2024 | Ording | H04M 1/72445 | |
| 11,954,322 B2* | 4/2024 | Blumenberg | G06F 3/04883 | |
| 11,983,383 B2* | 5/2024 | Sasanuma | G06F 3/0481 | |
| 12,366,954 B2* | 7/2025 | Bearman | G06F 3/0485 | |
| 2007/0265082 A1* | 11/2007 | Shimura | A63F 13/42 | 463/37 |
| 2008/0165161 A1* | 7/2008 | Platzer | G06F 1/1684 | 345/177 |
| 2008/0168384 A1* | 7/2008 | Platzer | G06F 3/0488 | 719/328 |
| 2008/0168402 A1* | 7/2008 | Blumenberg | G06F 3/0485 | 715/863 |
| 2008/0168404 A1* | 7/2008 | Ording | H04M 1/7243 | 715/764 |
| 2008/0168478 A1* | 7/2008 | Platzer | G06F 3/04883 | 719/328 |
| 2009/0070704 A1* | 3/2009 | Ording | H04M 1/72403 | 715/788 |
| 2009/0070705 A1* | 3/2009 | Ording | G06F 3/04845 | 715/702 |
| 2010/0325575 A1* | 12/2010 | Platzer | G06F 3/04883 | 715/781 |
| 2011/0010659 A1* | 1/2011 | Kim | G06F 3/0485 | 345/173 |
| 2011/0029927 A1* | 2/2011 | Lietzke | G06F 3/04812 | 715/702 |
| 2011/0099509 A1* | 4/2011 | Horagai | G06F 3/0485 | 715/784 |
| 2011/0138329 A1* | 6/2011 | Wells | G06F 3/0485 | 715/830 |
| 2011/0202834 A1* | 8/2011 | Mandryk | G06F 3/04883 | 715/800 |
| 2011/0202859 A1* | 8/2011 | Fong | G06F 3/04886 | 715/769 |
| 2011/0314429 A1* | 12/2011 | Blumenberg | G06T 13/80 | 715/863 |
| 2011/0314430 A1* | 12/2011 | Blumenberg | G06F 3/04883 | 715/863 |
| 2012/0278754 A1* | 11/2012 | Lehmann | G09G 5/34 | 715/784 |
| 2012/0278755 A1* | 11/2012 | Lehmann | G09G 5/34 | 715/784 |
| 2013/0083037 A1* | 4/2013 | Rodgers | G06F 3/0481 | 345/474 |
| 2013/0086516 A1* | 4/2013 | Rodgers | G06F 3/0481 | 715/799 |
| 2013/0093795 A1* | 4/2013 | Miyazaki | G06F 3/0485 | 345/173 |
| 2013/0106915 A1* | 5/2013 | Lee | G06F 3/04883 | 345/619 |
| 2013/0212530 A1* | 8/2013 | Takase | G06F 3/0482 | 715/815 |
| 2014/0137032 A1* | 5/2014 | Won | G06F 3/0485 | 715/784 |
| 2015/0052474 A1* | 2/2015 | Kim | G06F 3/0488 | 715/784 |
| 2015/0070283 A1 | 3/2015 | Irwin | | |
| 2015/0143294 A1* | 5/2015 | Piccinato | G06F 3/0482 | 715/817 |
| 2015/0205476 A1* | 7/2015 | Kuscher | G06F 3/0485 | 715/784 |
| 2016/0035119 A1* | 2/2016 | Lee | G06F 3/04817 | 345/473 |
| 2016/0170624 A1* | 6/2016 | Zambetti | G06F 3/048 | 715/771 |
| 2016/0170625 A1* | 6/2016 | Zambetti | G06F 3/04842 | 715/771 |
| 2016/0196033 A1* | 7/2016 | Zhang | G06F 3/0488 | 715/863 |
| 2016/0202865 A1* | 7/2016 | Dakin | G06F 3/0481 | 715/784 |
| 2016/0224223 A1* | 8/2016 | Ren | G06F 3/0488 | |
| 2016/0342325 A1* | 11/2016 | Blumenberg | G06F 3/0485 | |
| 2017/0277388 A1* | 9/2017 | Zhang | G06F 3/0482 | |
| 2017/0308277 A1* | 10/2017 | Platzer | G06F 3/04845 | |
| 2017/0315716 A1* | 11/2017 | Zambetti | G06F 3/0484 | |
| 2019/0324618 A1* | 10/2019 | Takimoto | G06F 3/0482 | |
| 2021/0117061 A1* | 4/2021 | Dakin | G06F 3/0488 | |
| 2021/0326016 A1* | 10/2021 | Platzer | G06F 3/04845 | |
| 2022/0011912 A1* | 1/2022 | Takimoto | G06F 3/0485 | |
| 2022/0043551 A1* | 2/2022 | Dakin | G06F 3/0481 | |
| 2022/0091736 A1 | 3/2022 | Dong et al. | | |
| 2023/0021869 A1* | 1/2023 | Blumenberg | G06F 3/0488 | |
| 2023/0280899 A1* | 9/2023 | Dakin | G06F 3/0488 | 715/784 |
| 2023/0367447 A1* | 11/2023 | Sasanuma | G06F 3/0482 | |
| 2024/0248578 A1* | 7/2024 | Sasanuma | G06F 3/04817 | |

FOREIGN PATENT DOCUMENTS

| | | |
|---|---|---|
| CN | 104199600 A | 12/2014 |
| CN | 104536650 A | 4/2015 |
| CN | 104571877 A | 4/2015 |
| CN | 105760067 A | 7/2016 |
| CN | 106155524 A | 11/2016 |
| CN | 107562357 A | 1/2018 |
| CN | 109804340 A | 5/2019 |
| CN | 111522492 A | 8/2020 |
| EP | 2741195 A1 | 6/2014 |
| JP | 2012137821 A | 7/2012 |
| JP | 2012150558 A | 8/2012 |
| JP | 2013164700 A | 8/2013 |
| JP | 2015537299 A | 12/2015 |

(56)　　　　　　　References Cited

FOREIGN PATENT DOCUMENTS

| | | |
|---|---|---|
| JP | 2017510918 A | 4/2017 |
| WO | 2015131574 A1 | 9/2015 |

OTHER PUBLICATIONS

Dead Knock Professional Cla et al.,"Huawei Hongmeng OS background switching is finally comfortable~," Jun. 12, 2020, https://www.bilibili.com/video/BV1Mi4y1g7Ku/?spm_id_from=autoNext, 1 page.

* cited by examiner

Module interval

PAGE SLIDING PROCESSING METHOD AND RELATED APPARATUS

CROSS-REFERENCE TO RELATED APPLICATIONS

This is a continuation of International Patent Application No. PCT/CN2021/115457 filed on Aug. 30, 2021, which claims priority to Chinese Patent Application No. 202010901735.7 filed on Aug. 31, 2020. The disclosures of the aforementioned applications are hereby incorporated by reference in their entireties.

TECHNICAL FIELD

This application relates to the field of electronic technologies, and in particular, to a page sliding processing method and a related apparatus.

BACKGROUND

Page content presented by an electronic device to a user is becoming richer, and a screen of the electronic device is unable to display all content on a page. In this case, a user needs to slide the page downward (or upward, leftward, rightward) to display more content on the page. Currently, in a process of sliding a page, all elements on the page are moved as a whole, resulting in a single effect of sliding the page and poor user experience.

SUMMARY

Embodiments of this application provide a page sliding processing method and a related apparatus to improve interest of page sliding, enhance an effect of feedback made by an electronic device for a user, and improve user experience.

According to a first aspect, this application provides a page sliding processing method, including: An electronic device displays a first page module, a second page module, and a third page module that are of a first page. The second page module, the first page module, and the third page module are sequentially arranged on the first page. There is a first interval between the first page module and the second page module. There is a second interval between the first page module and the third page module. The electronic device receives a sliding operation applied to the first page module in a first direction. The first direction points from the first page module to the second page module. The first page module, the second page module, and the third page module slide in the first direction in response to the sliding operation. The first interval decreases in a first time period and increases in a second time period. A start moment of the second time period is equal to a cutoff moment of the first time period. The second interval increases in a third time period and decreases in a fourth time period. A start moment of the fourth time period is equal to a cutoff moment of the third time period. In this way, this embodiment of this application provides a dynamic page sliding effect, thereby increasing interest of page sliding, enhancing an effect of feedback made by an electronic device for a user, and effectively improving user experience.

In an implementation, a width of the second page module in the first direction decreases in the first time period and increases in the second time period. A width of the third page module in the first direction increases in the third time period and decreases in the fourth time period. In this way, a width of a page module may dynamically change as a page slides.

In an implementation, the width of the second page module in the first direction is unequal to the width of the third page module in the first direction. A start moment of the first time period is the same as that of the third time period. A distance between the second page module and the third page module in the first direction increases in the first time period.

In an implementation, the start moment of the first time period is the same as that of the third time period, and the cutoff moment of the first time period is the same as that of the third time period; or the cutoff moment of the first time period is later than the cutoff moment of the third time period; or the cutoff moment of the first time period is earlier than the cutoff moment of the third time period.

In an implementation, duration of the sliding operation is a sixth time period, a start moment of the sixth time period is the same as that of the first time period, and the cutoff moment of the first time period is earlier than a cutoff moment of the sixth time period; or the cutoff moment of the first time period is equal to a cutoff moment of the sixth time period; or the cutoff moment of the first time period is later than a cutoff moment of the sixth time period.

In an implementation, the first page module stops sliding.

In an implementation, the first page module continues to slide.

In an implementation, before the first page module, the second page module, and the third page module slide in the first direction, the first interval is equal to a first value, and the second interval is equal to a second value. The first interval increases to the first value in the second time period, and the second interval decreases to the second value in the fourth time period.

In an implementation, before the first page module, the second page module, and the third page module slide in the first direction, the first interval is equal to a first value, and the second interval is equal to a second value. The first interval decreases to the first value in a seventh time period, and the second interval increases to the second value in an eighth time period. A start moment of the seventh time period is equal to a cutoff moment of the second time period, and a start moment of the eighth time period is equal to a cutoff moment of the fourth time period. A sliding direction of the first page module is the first direction in the first time period and the second time period, and the sliding direction of the first page module is a second direction in the seventh time period and the eighth time period. The first direction is opposite to the second direction.

In an implementation, before the first page module, the second page module, and the third page module slide in the first direction, the first interval is equal to a first value, and the second interval is equal to a second value. The second interval increases to the second value in a ninth time period, and the first interval increases to the first value in the second time period. A start moment of the ninth time period is later than or equal to a cutoff moment of the fourth time period, and the start moment of the ninth time period is earlier than a cutoff moment of the second time period. A sliding direction of the first page module is the first direction in the first time period and the second time period, and the sliding direction of the first page module is a second direction in the ninth time period. The first direction is opposite to the second direction.

In an implementation, before the first page module, the second page module, and the third page module slide in the first direction, the first interval is equal to a first value, and the second interval is equal to a second value. The second interval increases in a tenth time period and decreases to the second value in an eleventh time period, and the first interval increases to the first value in the second time period. A cutoff moment of the tenth time period is equal to a start moment of the eleventh time period, a start moment of the tenth time period is later than or equal to a cutoff moment of the fourth time period, and the start moment of the eleventh time period is earlier than a cutoff moment of the second time period. A sliding direction of the first page module is the first direction in the first time period and the second time period, and the sliding direction of the first page module is a second direction in the ninth time period and the tenth time period. The first direction is opposite to a second direction.

In an implementation, the third page module stops sliding in a ninth time period, the third page module in the first page module, the second page module, and the third page module is closest to a first side of the electronic device. The first side is a side that is of the electronic device and to which the second direction points.

In an implementation, in the sixth time period, when display content of the electronic device does not include all content of the third page module, a sliding distance of the first page module is equal to a sliding distance of the sliding operation in the first direction; or when display content of the electronic device includes all content of the third page module, a sliding distance of the first page module is shorter than a sliding distance of the sliding operation in the first direction.

In an implementation, the second page module and the third page module start to slide later than the first page module.

In an implementation, the second page module and the third page module start to slide at the same time.

In an implementation, a distance between the second module and the third module remains unchanged in the first direction.

In an implementation, the second page module and the third page module stop sliding later than the first page module.

In an implementation, the second page module and the third page module stop sliding at the same time.

In an implementation, sliding duration of the second page module and the third page module slide is shorter than that of the first page module.

In an implementation, the second page module and the third page module have same sliding duration.

In an implementation, after the sixth time period, a sliding distance of the first page module in the first direction is determined based on a sliding speed of the sliding operation.

In an implementation, a fourth page module, the second page module, the first page module, the third page module, and a fifth page module are sequentially arranged on the first page, there is a third interval between the second page module and the fourth page module, and there is a fourth interval between the third page module and the fifth page module. That the first page module, the second page module, and the third page module slide in the first direction in response to the sliding operation includes: The first page module, the second page module, the third page module, the fourth page module, and the fifth page module slide in the first direction in response to the sliding operation. The third interval decreases in the first time period and increases in the second time period, and the fourth interval increases in the third time period and decreases in the fourth time period.

In an implementation, the fourth page module starts to slide later than the second page module, and the fifth page module start to slide later than the third page module.

In an implementation, the fourth page module and the fifth page module start to slide at the same time.

In an implementation, compared with the start moment of the first time period, at a first moment of the first time period, a decrease amplitude of the third interval is less than a decrease amplitude of the first interval. Compared with the start moment of the third time period, at a second moment of the third time period, an increase amplitude of the fourth interval is less than an increase amplitude of the second interval.

In an implementation, compared with the start moment of the first time period, at a first moment of the first time period, a decrease amplitude of the third interval is equal to a decrease amplitude of the first interval. Compared with the start moment of the third time period, at a second moment of the third time period, an increase amplitude of the fourth interval is equal to an increase amplitude of the second interval.

According to a second aspect, this application provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform any of the possible implementations of the first aspect.

According to a third aspect, an embodiment of this application provides a computer storage medium including computer instructions. When the computer instructions are run on an electronic device, the electronic device is enabled to perform any of the possible implementations of the first aspect.

According to a fourth aspect, an embodiment of this application provides a computer program product. When the computer program product runs on a computer, the computer is enabled to perform any of the possible implementations of the first aspect.

DESCRIPTION OF EMBODIMENTS

The following describes the technical solutions in embodiments in this application with reference to the accompanying drawings. In the description of the embodiments of this application, unless otherwise stated, "I" represents the meaning of "or", for example, AB may represent A or B. In the specification, "and/or" is merely an association relationship describing associated objects, and represents that there may be three relationships. For example, A and/or B, may represent the following three cases: Only A exists, both A and B exist, and only B exists. In addition, in the description of the embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by the "first" and the "second" may explicitly or implicitly include one or more features. In the description of the embodiments of this application, unless otherwise stated, "a plurality of" means two or more.

An embodiment of this application provides a page sliding processing method, and the method is applied to an electronic device 100. The method may be used to improve interest of page sliding, enhance an effect of feedback made by an electronic device for a user, and improve user experience.

Figure 2:
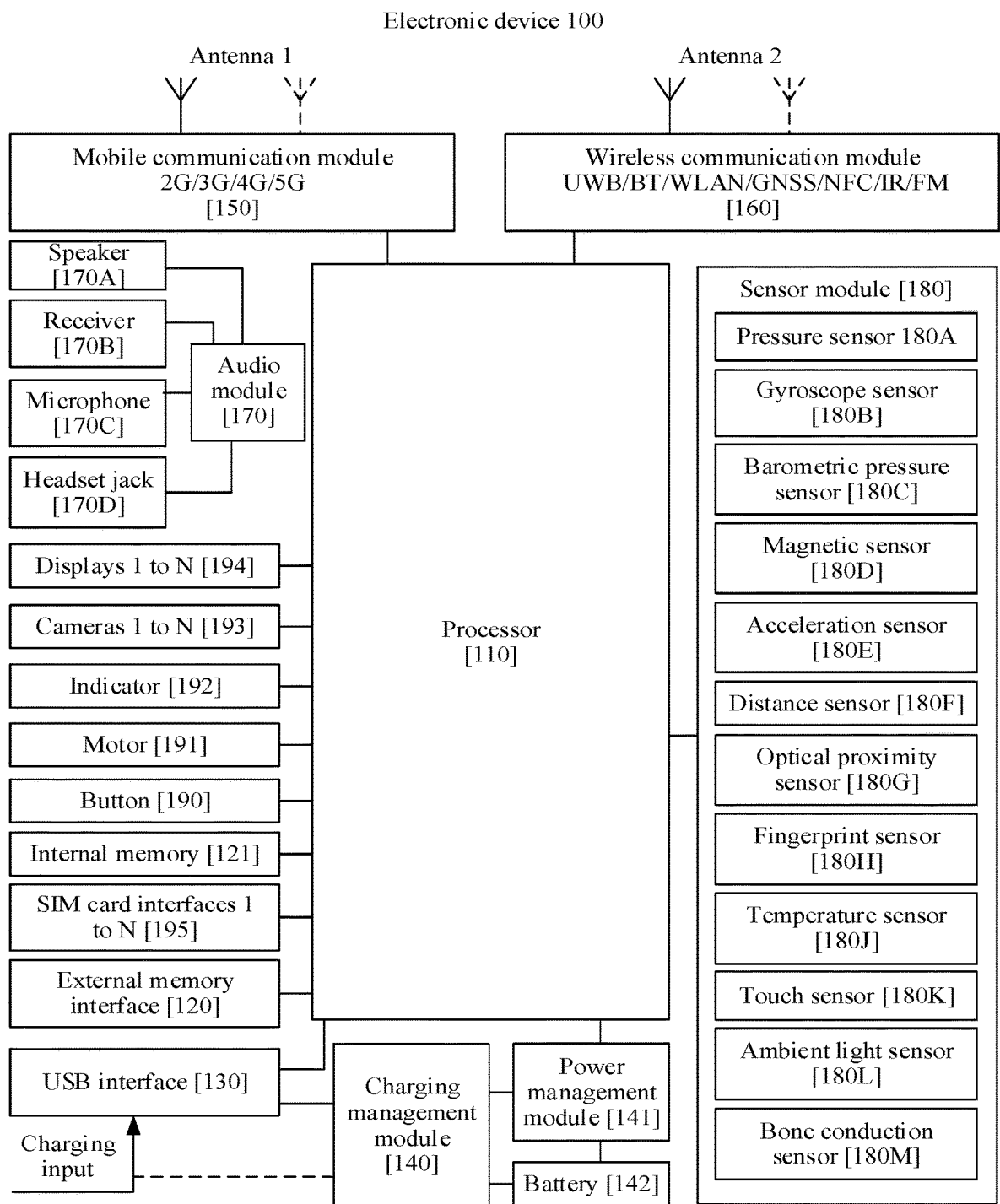
FIG. 2 is a schematic diagram of a structure of an electronic device according to an embodiment of this application.

For example, FIG. 2 is a schematic diagram of a structure of the electronic device 100 in the embodiments of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The processor 110 may simultaneously run a plurality of tasks (for example, applications) to provide a plurality of services and functions for a user.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a USB interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth (BT) headset.

The PCM interface may also be used for audio communication, and analog signal sampling, quantization, and coding. In some embodiments, the audio module 170 may be coupled to the wireless communication module 160 through a PCM bus interface. In some embodiments, the audio module 170 may alternatively transmit an audio signal to the wireless communication module 160 through the PCM interface to implement a function of answering a call through a BT headset. Both the I2S interface and the PCM interface can be used for video communication.

The UART interface is a universal serial data bus, and is configured to perform asynchronous communication. The bus may be a two-way communications bus. The bus converts to-be-transmitted data between serial communication and parallel communication. In some embodiments, the UART interface is usually used to connect the processor 110 to the wireless communication module 160. For example, the processor 110 communicates with a BT module in the wireless communication module 160 through the UART interface to implement a BT function. In some embodiments, the audio module 170 may transmit an audio signal to the wireless communication module 160 through the UART interface, to implement a function of playing music by using a BT headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be a mini USB interface, a micro USB interface, a USB Type C interface, or the like. The USB interface 130 may be configured to connect to a charger to charge the electronic device 100, or may be configured to transmit data between the electronic device 100 and a peripheral component, or may be configured to connect to a headset, to play audio by using the headset. The interface may be further configured to connect to another electronic device such as an augmented reality (AR) device.

It may be understood that an interface connection relationship between the modules that is shown in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charge management module 140 is configured to receive a charge input from the charger. The charger may be a wireless charger or a wired charger.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution for wireless communication including second generation (2G)/third generation (3G)/fourth generation (4G)/fifth generation (5G) or the like applied to the electronic device 100. The mobile communication module 150 may include at least one filter, a switch, a power amplifier, a low-noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same component as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same component as the mobile communication module 150 or another functional module.

The wireless communication module 160 may provide a wireless communication solution that is applied to the electronic device 100 and that includes a wireless local area network (WLAN) (for example, a Wi-Fi network), BT, a global navigation satellite system (GNSS), frequency modulation (FM), a near-field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a Global System for Mobile Communications (GSM), a General Packet Radio Service (GPRS), code-division multiple access (CDMA), wideband CDMA (WCDMA), time-division CDMA (TD-CDMA), Long-Term Evolution (LTE), BT, a GNSS, a WLAN, NFC, FM, an IR technology, and/or the like. The GNSS may include a global positioning system (GPS), a global navigation satellite system (GNSS), a BeiDou navigation satellite system (BDS), a quasi-zenith satellite system (QZSS), and/or satellite based augmentation systems (SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, or the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the digital signal processor (DSP) for processing. The DSP converts the digital image signal into an image signal in a standard format, for example, red, green, and blue (RGB) or luma, blue projection, and red projection (YUV). In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more types of video codecs. Therefore, the electronic device 100 may play or record videos in a plurality of coding formats, for example, Moving Picture Experts Group (MPEG)-1, MPEG-2, MPEG-3, and MPEG-4.

The NPU is a neural-network (NN) computing processor. The NPU quickly processes input information by referring a structure of a biological neural network, for example, by referring a transfer mode between human brain neurons, and may further continuously perform self-learning. The NPU can implement applications such as intelligent cognition of the electronic device 100, for example, image recognition, facial recognition, speech recognition, and text understanding.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121 to perform various function applications of the electronic device 100 and data processing. The internal memory 121 may include a program storage region and a data storage region.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic" is configured to convert a sound signal into an electrical signal. When making a call or sending speech information, a user may place the mouth of the user near the microphone 170C to make a sound, to enter a sound signal to the microphone 170C. At least one microphone 170C may be disposed in the electronic device 100.

The headset jack 170D is configured to connect to a wired headset. The headset jack 170D may be the USB interface 130, or may be a 3.5 millimeter (mm) Open Mobile Terminal Platform (OMTP) standard interface or a Cellular Telecommunications Industry Association (CTIA) standard interface.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing a Short Message Services (SMS) message is executed. When a touch operation whose touch operation intensity is greater than or equal to the first pressure threshold is performed on the Messages icon, an instruction for creating a new SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of the flip cover by using the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include an LED and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal.

The button 190 includes a power button, a volume button, and the like. The button 190 may be a mechanical button, or may be a touch button. The electronic device 100 may receive a button input, and generate a key signal input related to user settings and function control of the electronic device 100.

The motor 191 may generate a vibration prompt. The motor 191 may be configured to provide an incoming call vibration prompt and a touch vibration feedback.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100.

First, related concepts in the embodiments of this application are explained and described to facilitate understanding of a person skilled in the art.

Control: A control may be encapsulation of data and a method, and the control may have its own property and method. The property is a simple visitor of control data, and the method is some simple visible functions of the control. The control is a basic element of a user interface. For example, a type of the control may include but is not limited to a user interface control (a control used for developing and constructing a user interface, for example, a control for an interface element such as a window, a text box, a button, a drop-down menu, or the like), a chart control (a control used for developing a chart, which may implement data visualization and the like), a report control (a control used for developing a report, which implements functions such as browsing and viewing, designing, editing, and printing of a report), a table control (a control used for developing a table (CELL), which implements functions of processing and operating data in a grid), and the like. The type of the control in the embodiments of this application may further include a composite control (various existing controls are combined to form a new control to integrate performance of various controls), an extended control (a new control is derived based on an existing control to add new performance to the existing control or change performance of the existing control), a customized control, and the like.

In the embodiments of this application, the control may include but is not limited to visible interface elements such as a window, a scrollbar, a table view, a button, a menu bar, a text box, a navigation bar, a toolbar, an image, a static text, a widget, and the like.

Page: The term "page" in the specification, the claims, and the accompanying drawings of this application may also be referred to as a "user interface (UI)", which is a media interface for interaction and information exchange between an application or an operating system and a user, and implements conversion between an internal form of information and a form acceptable to the user. A user interface of an application is a source code written by using a specific computer language such as java, an extensible markup language (XML), and the like. The source code of the interface is parsed and rendered on a terminal device and finally presented as user-recognizable content, for example, controls such as a picture, a text, a button, and the like. A property and content of the control in the interface are defined by a label or a node, for example, XML specifies the control included in the interface through nodes such as <Textview>, <ImgView>, and <VideoView>. One node corresponds to one control or property in the interface, and the node is presented as user-visible content after being parsed and rendered. In addition, interfaces of many applications, such as an interface of a hybrid application, usually include web pages. A web page may be understood as a special control embedded in an application interface, and the web page is a source code written by using a specific computer language, such as a HyperText Markup Language (HTML), a Cascading Style Sheet (CSS), and a JavaScript (JS). The web page source code may be loaded and displayed as user-recognizable content by a browser or a web page display component having a function similar to that of the browser. Specific content included in the web page is also defined by using a label or node in the web page source code, for example, HTML defines an element and a property of the web page through <p>, <img>, <video>, and <canvas>.

Page module: A page may be divided into a plurality of consecutive page modules based on a layout and properties of controls on the page. A page module may carry one or more information types in a picture, a text, an operation button, a link, an animation, a sound, a video, and the like. A page module may be presented as a collection of one or more controls, may be presented as a card, or may be presented as a card and a collection of other controls.

The card may provide a service capability of a finer granularity than an application (APP). A service or content most concerned by a user is directly displayed to a user in a form of an interactable card. The card may be embedded in various APPs or interaction scenarios to better meet a user requirement. Various elements such as a picture, a text, an operation button, and a link of an application are integrated into a card, and the card may be associated with one or more user interfaces of the application. A user may perform an operation (such as a click operation) on the card to jump a display interface to a user interface of a corresponding application. With a card-type layout, different content can be displayed in distinguishing such that content in a display interface is presented more intuitively, and a user can perform an operation for different content more easily and more accurately.

In the embodiments of this application, different page modules may or may not overlap.

In some embodiments of this application, the display 194 of the electronic device 100 cannot display all content of a page, and display content that is of the page and that is displayed on the display 194 may include a part or all of one or more consecutive page modules of the page.

Figure 1A:
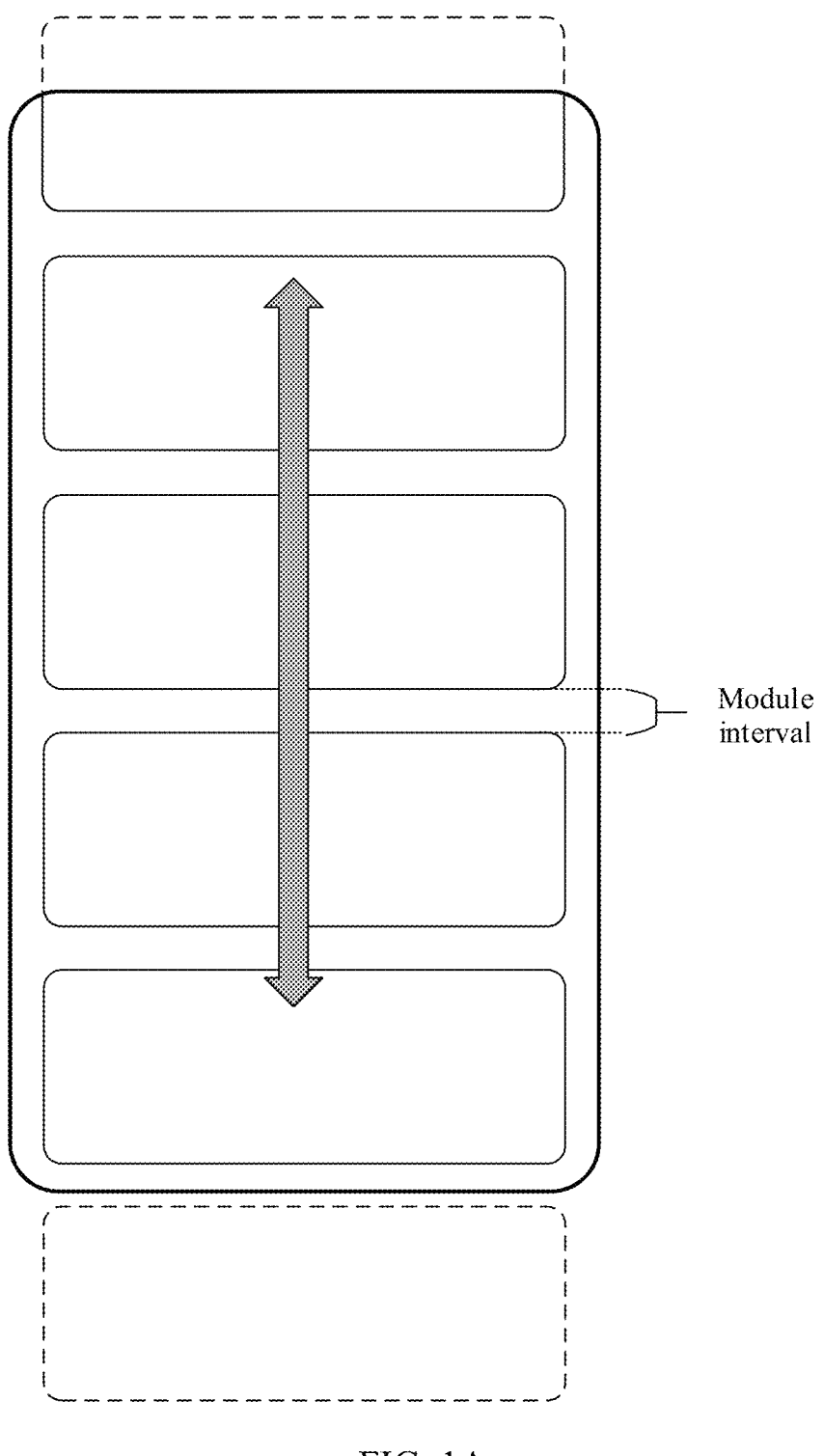
FIG. 1A to FIG. 1C are schematic diagrams of arranging page modules according to an embodiment of this application.
Figure 1B:
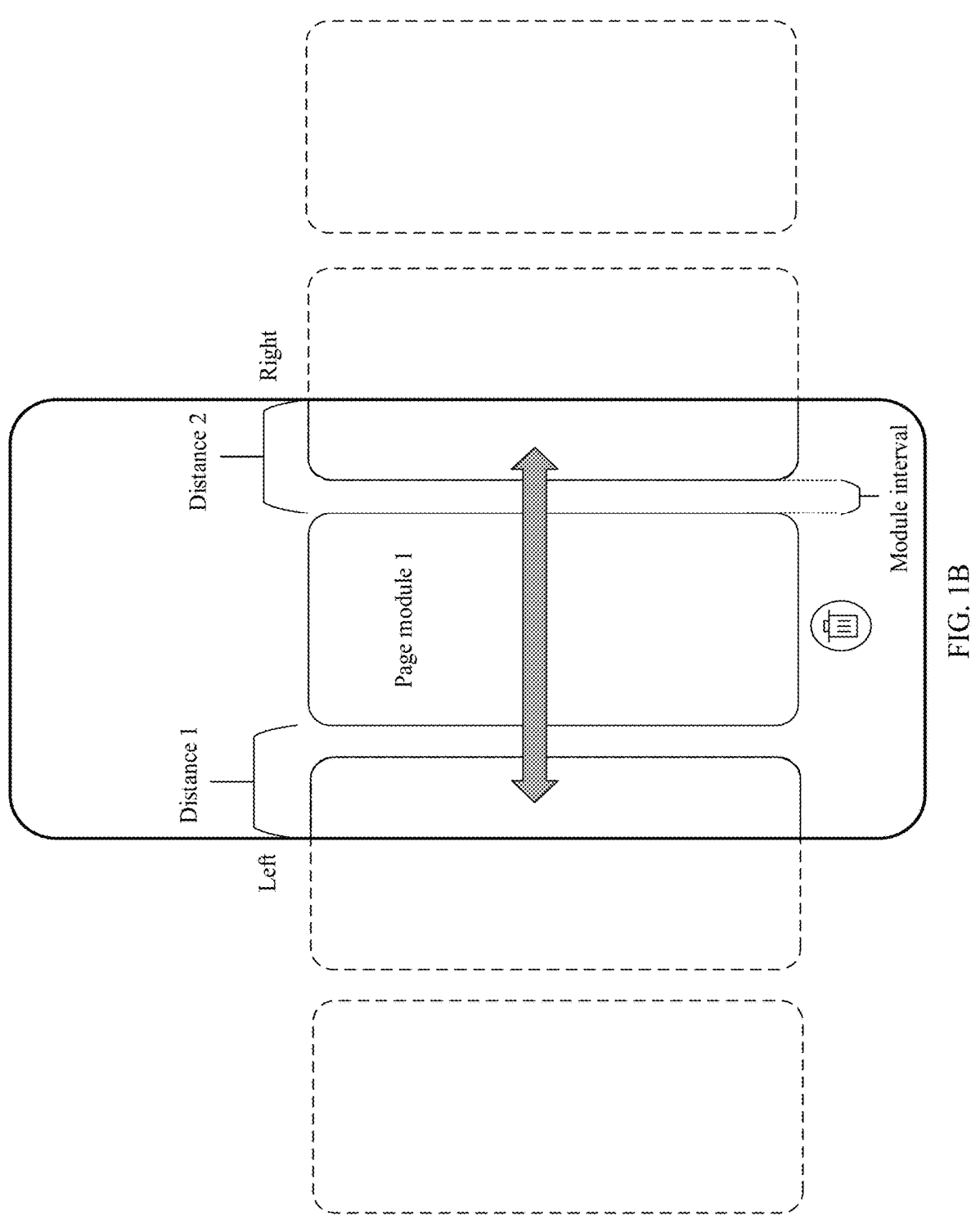
Figure 1C:
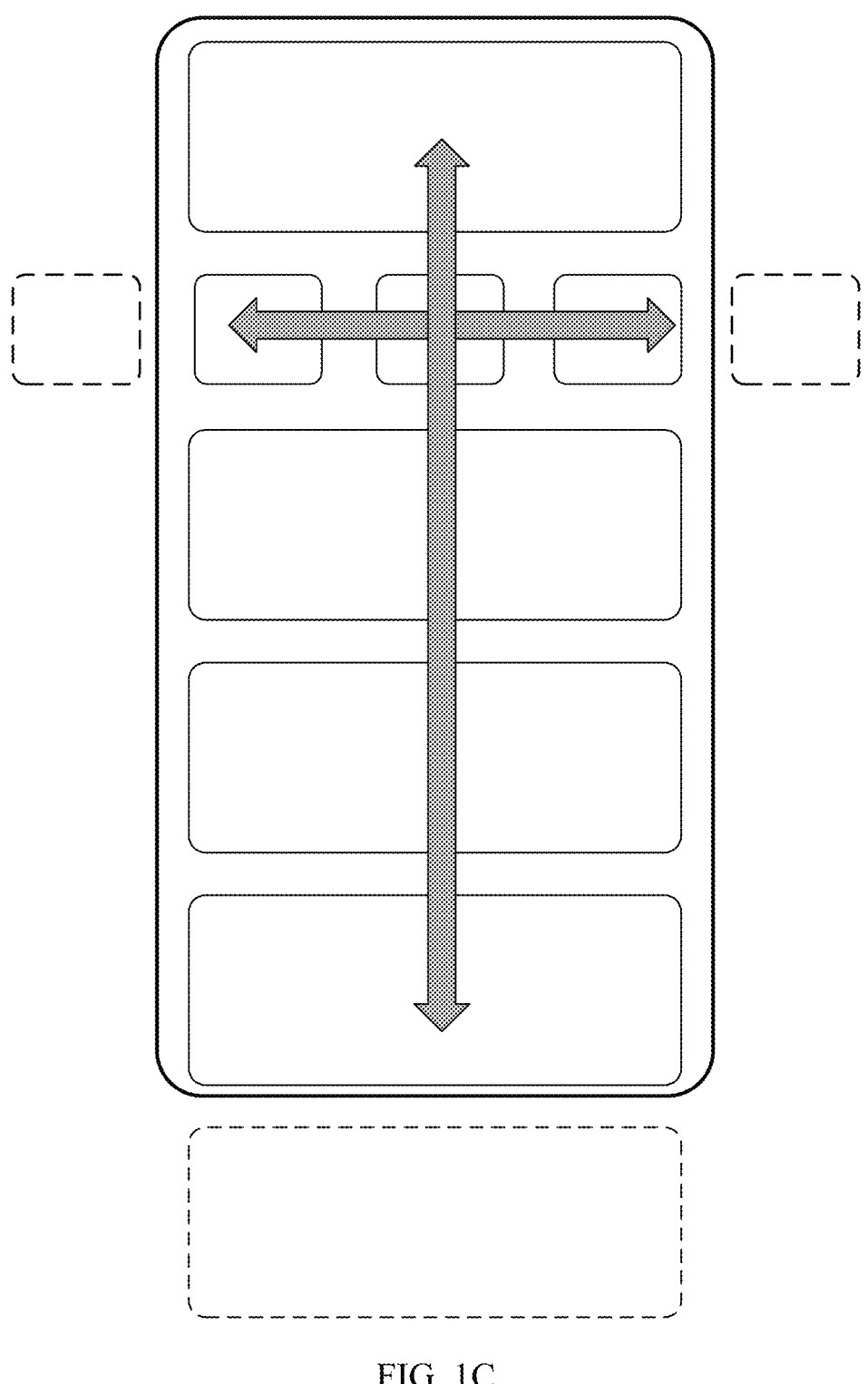

As shown in FIG. 1A, a page (such as a HiBoard page) of the electronic device 100 may include a plurality of vertically arranged page modules. For the vertically arranged page modules, a user may slide a finger upward/downward on the display 194 to move the page modules upward/downward, to view more page modules of the page. Alternatively, as shown in FIG. 1B, a page (such as a multi-task page) of the electronic device 100 may include a plurality of horizontally arranged page modules. For the horizontally arranged page modules, a user may slide a finger leftward/rightward on the display 194 to move the page modules leftward/rightward, to view more page modules of the page. Alternatively, as shown in FIG. 1C, a page (such as a home page of an application store) of the electronic device 100 may include both a plurality of vertically arranged page modules and a plurality of horizontally arranged page modules.

In the embodiments of this application, the first page mentioned in the embodiments of this application may be a HiBoard page, a multi-task page, or a home page of an application store, or may be another page including a plurality of page modules arranged in sequence.

It should be noted that, in addition to the vertical arrangement and the horizontal arrangement, page modules can be arranged in another direction on a display page of the electronic device 100. This is not specifically limited herein.

For example, a page 1 includes a plurality of consecutive page modules, and the display 194 of the electronic device 100 may display a part of content of the page. The electronic device may display more content of the page in response to an operation of sliding the page by a user. The electronic device 100 displays display content 1 of the page 1 in response to a received user operation 1, and the display content 1 includes a part or all of one or more consecutive page modules of the page. When displaying the display content 1, the electronic device 100 displays display content 2 of the page 1 in response to a received user operation 2, and the display content 2 includes a part or all of one or more consecutive page modules of the page.

For example, the page 1 is the HiBoard page shown in FIG. 1A, the user operation 1 is that a user's finger slides rightward on a home screen of the electronic device, and the user operation 2 is that the user's finger slides downward on the display.

In some embodiments of this application, in response to the received user operation 1, the electronic device 100 draws all content of the page 1 and stores the content in a buffer region. Then the electronic device 100 displays the display content 1 based on drawn image data of the display content 1 in the buffer region. In response to the received user operation 2, the electronic device 100 displays the display content 2 directly based on the drawn image data of the display content 2 in the buffer region.

In some embodiments of this application, in response to the received user operation 1, the electronic device 100 draws the display content 1 of the page 1 and stores the display content 1 in a buffer region. Then the electronic device 100 displays the display content 1 based on drawn image data of the display content 1 in the buffer region. In response to the received user operation 2, the electronic device 100 draws the display content 2 of the page 1 and stores the display content 2 in the buffer region. Then the electronic device 100 displays the display content 2 based on drawn image data of the display content 2 in the buffer region.

In some embodiments of this application, in response to the received user operation 1, the electronic device 100 draws the display content 1 of the page 1 and the display content of one or more page modules closest to the display content 1 of the page 1, and stores the display content 1 and the display content of the one or more page modules in a buffer region. Then the electronic device 100 displays the display content 1 based on drawn image data of the display content 1 in the buffer region. In response to the received user operation 2, when the electronic device 100 determines that drawn image data in the buffer region includes the display content 2, the electronic device 100 displays the display content 2 based on the drawn image data of the display content 2 in the buffer region. When the drawn image data in the buffer region includes a part of the display content 2, the electronic device draws the display content 2 based on the part of the content, stores the display content 2 in the buffer region, and then displays the display content 2 based on the drawn image data of the display content 2 in the buffer region. When the drawn image data in the buffer region does not include content of the display content 2, the electronic device draws the display content 2, stores the display content 2 in the buffer region, and then displays the display content 2 based on the drawn image data of the display content 2 in the buffer region.

In some embodiments, a display height of the page 1 on the display 194 is equal to a height of the display 194. In some embodiments, the display height of the page 1 on the display 194 is less than the height of the display 194. For example, the display height of the page 1 on the display 194 is equal to the height of the display 194 minus a height of a navigation bar. This is not limited in the embodiments of this application.

In addition, in the embodiments of this application, layouts of page modules may be divided into two types based on display locations of the page modules on the display 194. In one type of layout, one page module on a page is limited to be at a center location of a display interface, and this type of layout is referred to as a center layout in the embodiments of this application, for example, the multi-task interface shown in FIG. 1B. As shown in FIG. 1B, a page module 1 is at a center location of a user interface, which means that a distance 1 from a left edge of the page module 1 to a left edge of a display interface is equal to a distance 2 from a right edge of the page module 1 to a right edge of the display interface. In this type of card layout, a user performs sliding on the display 194 to move the page module in the display interface, and when the page stops moving, a page module stays in the center location of the user interface. In the other type of layout, it is unnecessary that one page module needs to be at a center location of a display interface, and this type of layout is referred to as a non-center layout in the embodiments of this application, for example, the HiBoard page shown in FIG. 1A.

Module interval: Refer to FIG. 1A. For the vertically arranged page modules, the module interval may refer to a shortest distance between two page modules in a direction of a long side of the electronic device 100. Refer to FIG. 1B. For the horizontally arranged page modules, the module interval may refer to a shortest distance between two page modules in a direction of a short side of the electronic device 100. In the embodiments of this application, a module interval between two static adjacent page modules is referred to as an initial interval between the two page modules, and initial intervals spaced between any two modules in a same page may be equal or unequal. In a process of sliding a page, a module interval between two adjacent page modules may be unequal to an initial interval between the two page modules. When the page stops sliding, the module interval between the two adjacent page modules is equal to the initial interval between the two page modules. An initial interval between adjacent page modules may be preset by the electronic device 100 or may be set by a user.

It should be noted that the top, bottom, left, right, and upward, downward, leftward, and rightward mentioned in the embodiments of this application are all opposite and are example descriptions in specific implementations, and constitute no limitation on the embodiments of this application.

The page sliding processing method in the embodiments of this application is described below in detail with reference to the accompanying drawings.

A HiBoard is used as an example below to describe the page sliding processing method in a non-center layout.

The HiBoard may be used to place some quick service functions and notification messages, such as quick entries for applications, instant messages and reminders (express information, travel information, schedule information, and the like), and followed information (a news flash, a sports live, and the like). A user can view the HiBoard by sliding rightward on a home screen of the electronic device 100.

Figure 3A:
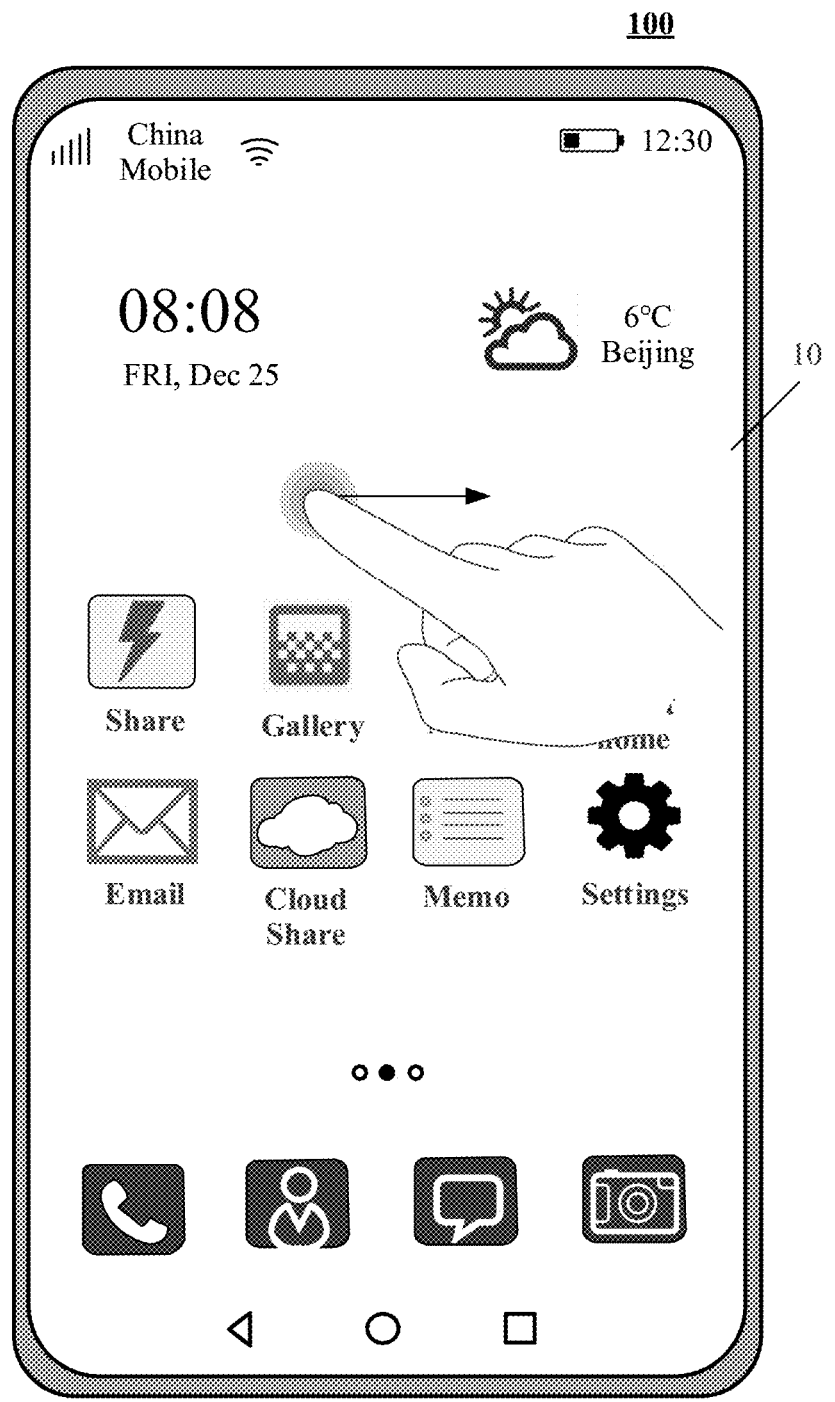
FIG. 3A is a schematic diagram of a home screen according to an embodiment of this application.

For example, as shown in FIG. 3A, the electronic device 100 displays a home screen 10 (Home screen). The home screen 10 may include a status bar, a navigation bar, a calendar indicator, and a weather indicator, and may further include icons of a plurality of applications, such as an icon of a gallery, an icon of music, and an icon of a smart household.

Figure 3B:
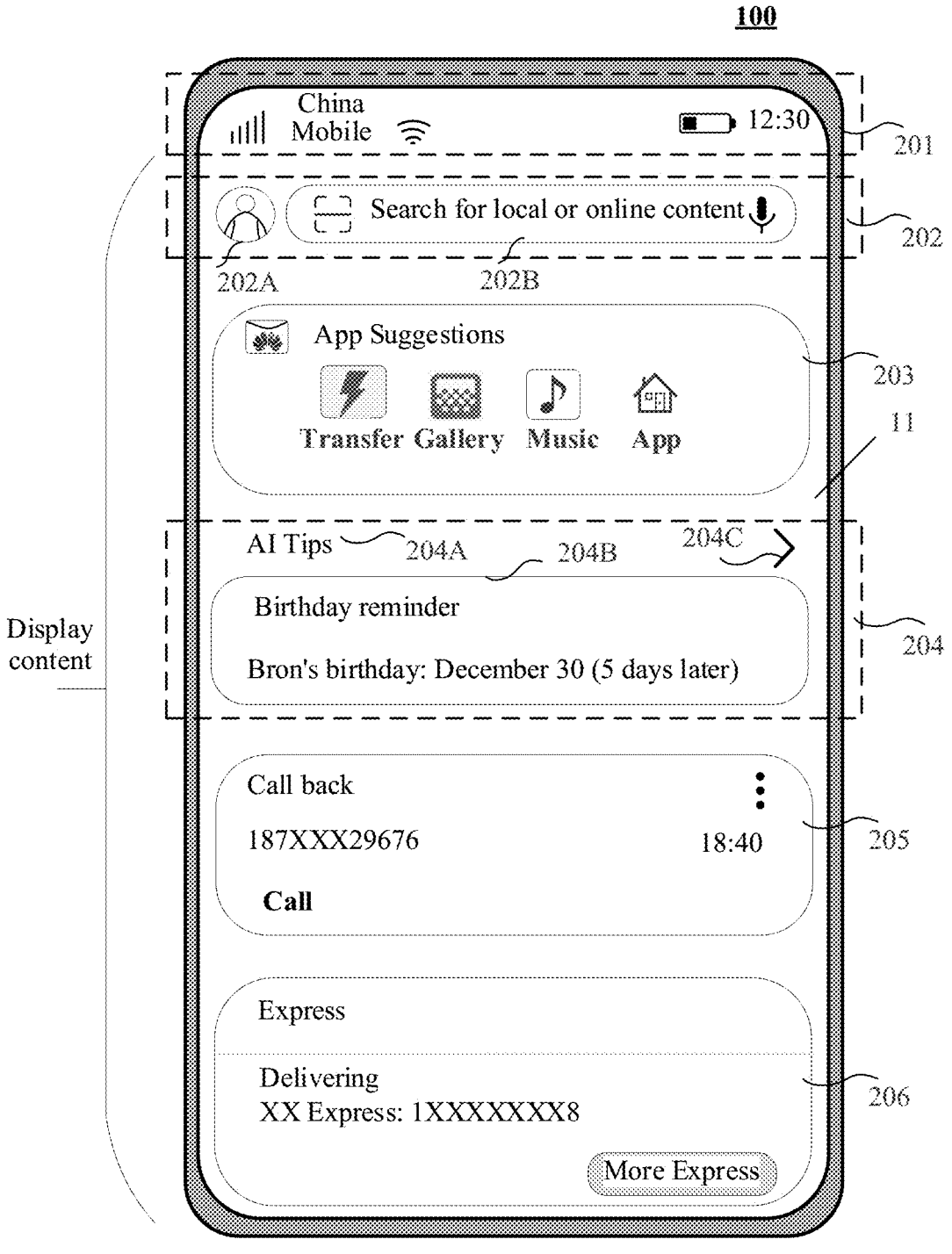
FIG. 3B is a schematic diagram of a HiBoard according to an embodiment of this application.

As shown in FIG. 3A and FIG. 3B, a user's finger slides rightward on the display 194. The electronic device 100 detects the user operation, and the electronic device 100 displays the HiBoard 11 in response to the user operation. The HiBoard 11 may include a status bar 201, and a page module 202, a page module 203, a page module 204, a page module 205, and a page module 206 that are of a HiBoard page. The page module 203, the page module 205, and the page module 206 each are presented as a card, the page module 203 includes an icon 202A and a search box 202B, and the page module 204 includes a title bar 204A, a control 204B, and a card 204C.

Figure 4A:
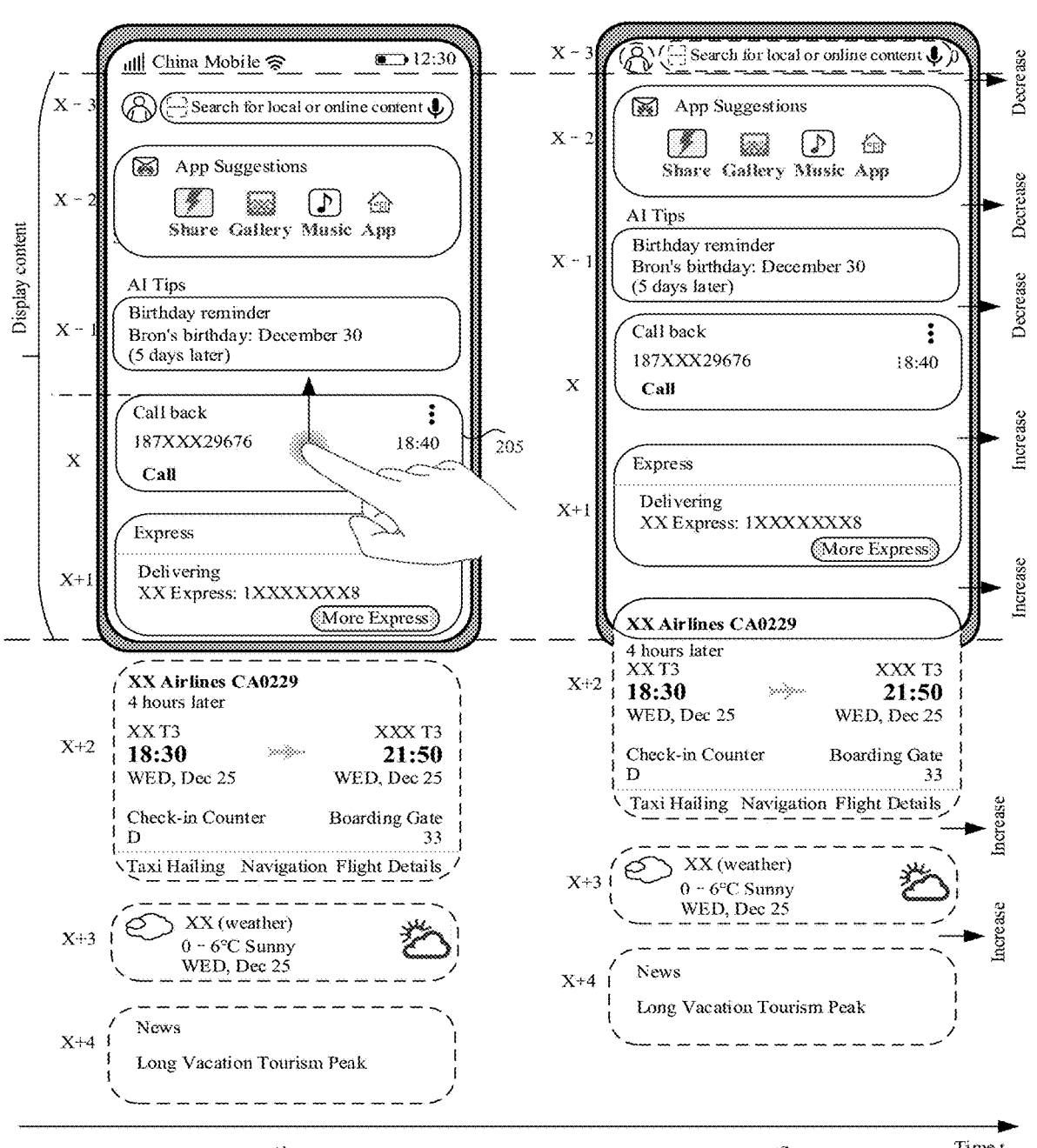
FIG. 4A to FIG. 4C are schematic diagrams of effects of sliding a HiBoard page according to an embodiment of this application.
Figure 4B:
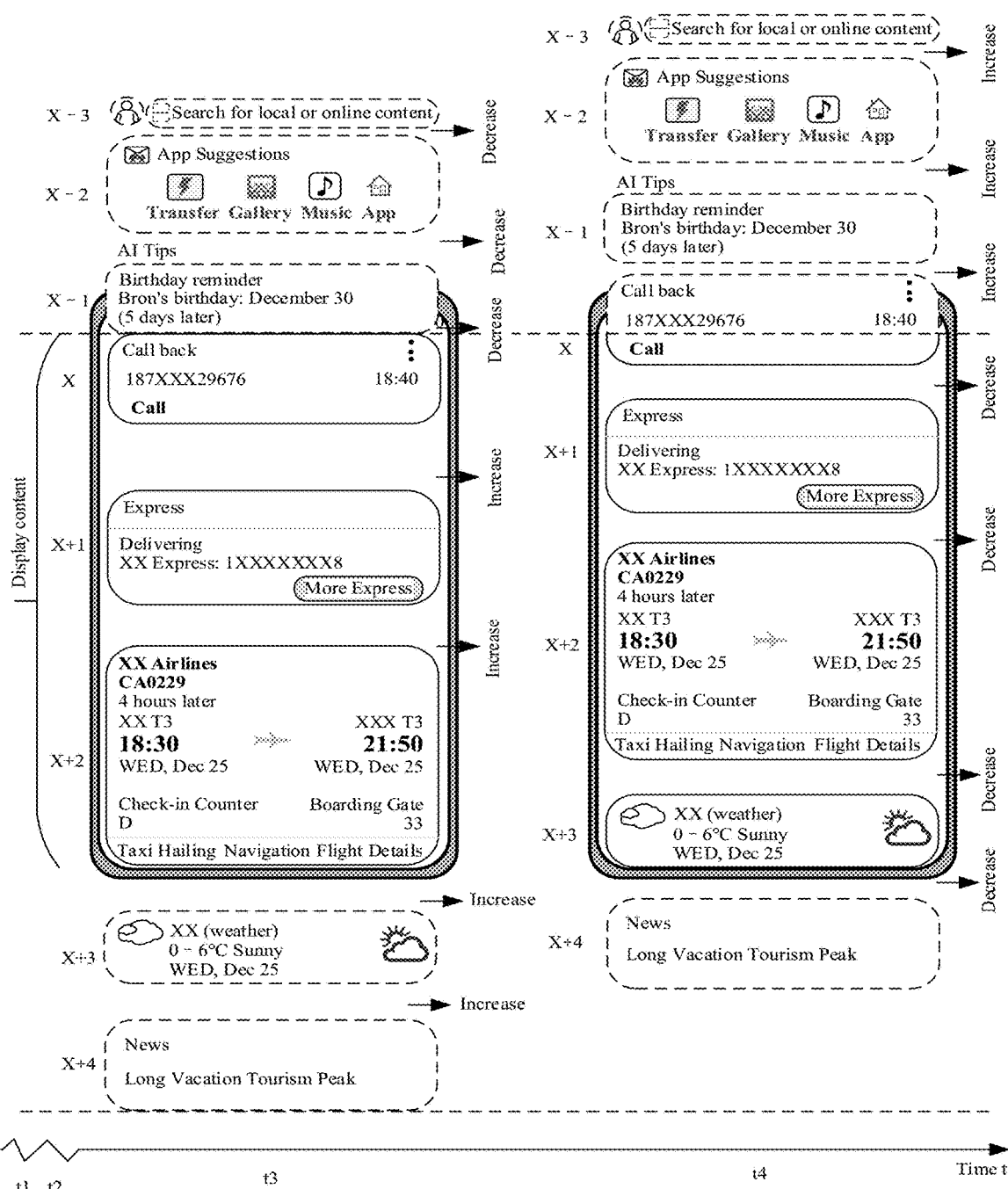
Figure 4C:
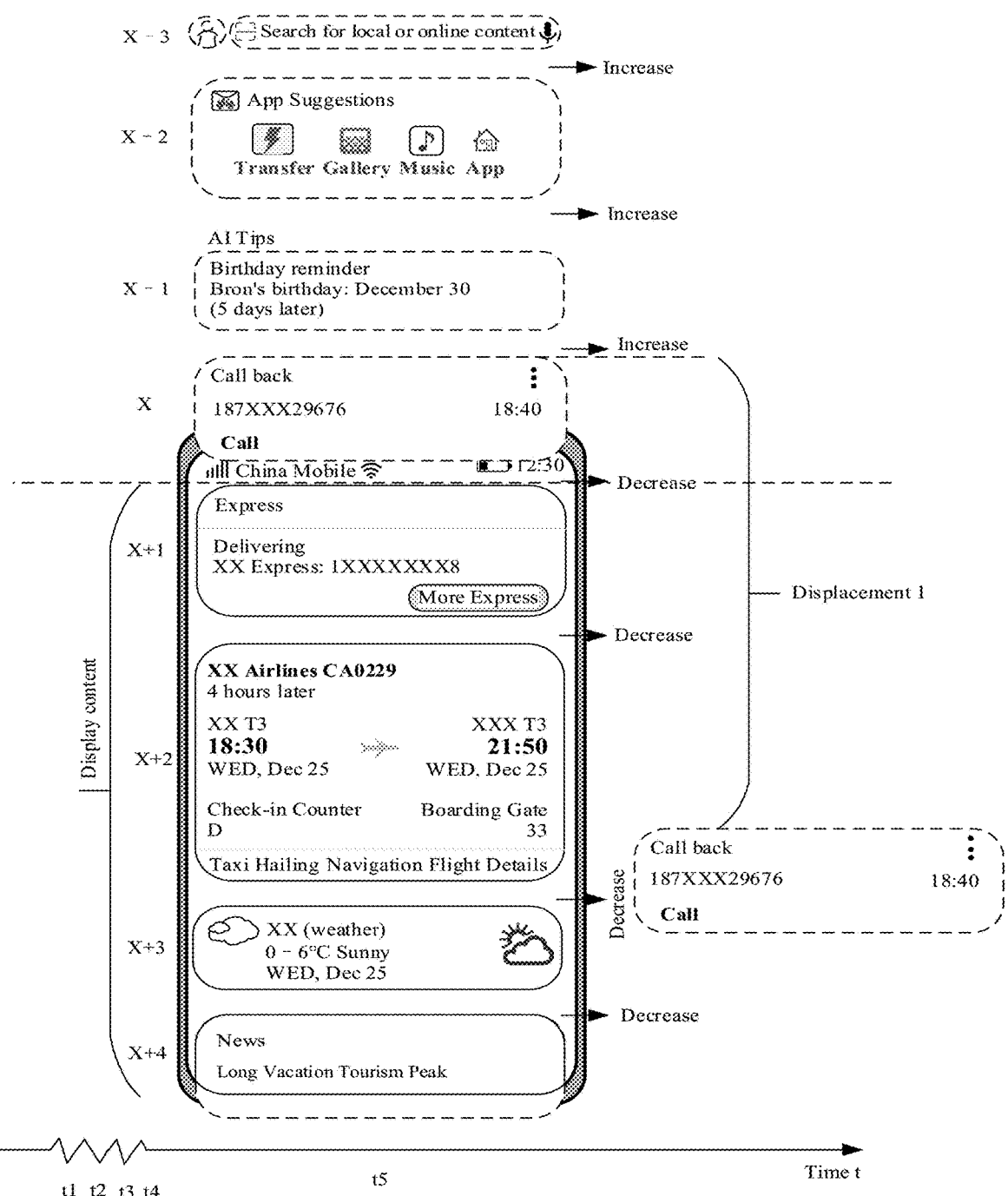

For example, FIG. 4A to FIG. 4C are schematic diagrams of page sliding effects using a HiBoard 10 as an example according to an embodiment of this application.

As shown in FIG. 4A, a HiBoard page includes a page module displayed on the display 194 and other page modules not displayed. In addition to the page module shown in FIG. 4A, the HiBoard page may further include other page modules, which are not specifically limited herein. As shown in FIG. 4A, at a moment t1, the user's finger slides upward by using the page module 205 as a start point. After detecting the user operation applied to the page module 205, the electronic device 100 controls each page module of the HiBoard page to slide upward.

For ease of description, in this embodiment of this application, the page module 205 applied when the user slides the page upward is referred to as a focus module, and the focus module is numbered X. Then other page modules are numbered by using the focus module as a reference. As shown in FIG. 4A, the page modules of the HiBoard page are respectively numbered X–3, X–2, X–1, X, X+1, X+2, X+3, and X+4 from top to bottom. In some embodiments, when a user slides the page, if a surface on which the user's finger is in contact with the display 194 simultaneously falls on two adjacent page modules, the electronic device 100 determines that a page module having a larger contact surface with the user's finger is the focus module X. In some embodiments, when a user slides the page, if a surface on which the user's finger (stylus) is in contact with the display 194 falls with a module interval between two adjacent page modules, the electronic device 100 determines that a page module closest to the contact surface of the user's finger is the focus module X.

Refer to FIG. 4A to FIG. 4C. A page module corresponding to a dashed-line box in the drawings provided in this embodiment of this application is a page module that is of the HiBoard page and that is not displayed on the display 194. The page module corresponding to the dashed-line box may also be displayed on the display 194 as the page module of the HiBoard page slides on the display. In some embodiments, if the display of the electronic device is large enough, the page module corresponding to the dashed-line box in FIG. 4A may also be displayed on the display 194. In another embodiment, display content in the dashed-line box is merely an example visual effect achieved when being displayed on a screen and may be not drawn before being displayed, and occupies no corresponding display resource.

As shown in FIG. 4A and FIG. 4B, during the moment t1 to a moment t3, the electronic device controls each page module to slide upward, a module interval between the module (X–n) and a module (X–n–1) decreases, and a module interval between the module (X+n) and a module (X+n–1) increases. The module interval between the module (X–n) and the module (X–n–1) includes a module interval between the module (X–1) and the module X, and a module interval between the module (X–2) and the module (X–1), or a module interval between the module (X–3) and the module (X–2). The module interval between the module (X+n) and the module (X+n–1) includes a module interval between the module X and the module (X+1), a module interval between the module (X+1) and the module (X+2), a module interval between the module (X+2) and the module (X+3), and a module interval between the module (X+3) and the module (X+4), where n is a positive integer.

As shown in FIG. 4B, during the moment t3 to a moment t4, the electronic device controls each page module to continue to slide upward, the module interval between the module (X–n) and the module (X–n–1) increases, and the module interval between the module (X+n) and the module (X+n–1) decreases. As shown in FIG. 4B and FIG. 4C, during the moment t4 to a moment t5, each page module stops sliding when a relative displacement of the page module in a sliding direction reaches a displacement 1, the module interval between the module (X–n) and the module (X–n–1) increases to an initial interval, and the module interval between the module (X+n) and the module (X+n–1) decreases to an initial interval. In some embodiments, the displacement 1 may be determined by the electronic device 100 based on at least one of a sliding speed and a sliding distance of a user. It should be noted that before and after page sliding, all module intervals on the page are initial intervals, and the relative displacements of the page modules are all equal. In this embodiment of this application, the relative displacement of each page module may also be referred to as a relative displacement of the page.

It can be learned from FIG. 4A to FIG. 4C that, when a user slides the page upward, a module interval in the sliding direction (that is, the module interval between the module (X–n) and the module (X–n–1)) first decreases from an initial interval and then increases to the initial interval, and a module interval in a direction opposite to the sliding direction (that is, the module interval between the module (X+n) and the module (X+n–1)) first increases from an initial interval and then decreases to the initial interval. Similarly, it can be learned that a module interval above the focus module X applied by the user when the user slides the page downward is applied first increases from an initial interval and then decreases to the initial interval, and a module interval below the focus module X first decreases from an initial interval and then increases to the initial interval.

In this embodiment of this application, the focus module X to which the sliding operation of the user is applied may be referred to as a first page module, a page module adjacent to the focus module X in a sliding direction of the user may be referred to as a second page module (such as the module (X–1) shown in FIG. 4A), and a page module adjacent to the focus module X in a direction opposite to the sliding direction of the user may be referred to as a third page module (such as the module (X+1) shown in FIG. 4A). There is a first interval between the first page module and the second page module, and there is a second interval between the first page module and the third page module. The first interval decreases in a first time period and increases in a second time period, and a start moment of the second time period is equal to a cutoff moment of the first time period. The second interval increases in a third time period and decreases in a fourth time period, and a start moment of the fourth time period is equal to a cutoff moment of the third time period.

For example, refer to FIG. 4A. The first interval may be the module interval between the module X and the module (X−1), and the second interval may be the module interval between the module X and the module (X+1). Refer to FIG. 4A to FIG. 4C. The first time period and the third time period may be a time period corresponding to the moment t1 to the moment t3, and the second time period and the fourth time period may be a time period corresponding to the moment t3 to the moment t5. In this embodiment of this application, the sliding direction of the user points from the first page module to the second page module. In response to the sliding operation of the user, a sliding direction of the first page module may be referred to as a first direction, and a direction opposite to the first direction may be referred to as a second direction. An initial interval between the first page module and the second page module may be a first value, and an initial interval between the first page module and the third page module may be a second value.

A page sliding effect is further described below by using a module (X−1), a module X, and a module (X+1) in FIG. 5A as examples. In this embodiment of this application, a module interval between a module (X+a) and a module (X+a−1) is defined as $L_{(X+a−1, X+a)}$, where a is an integer. To be specific, the module interval between the module (X−1) and the module X is $L_{(X−1, X)}$, and the module interval between the module (X+1) and the module X is $L_{(X+1, X)}$.

Figure 5A:
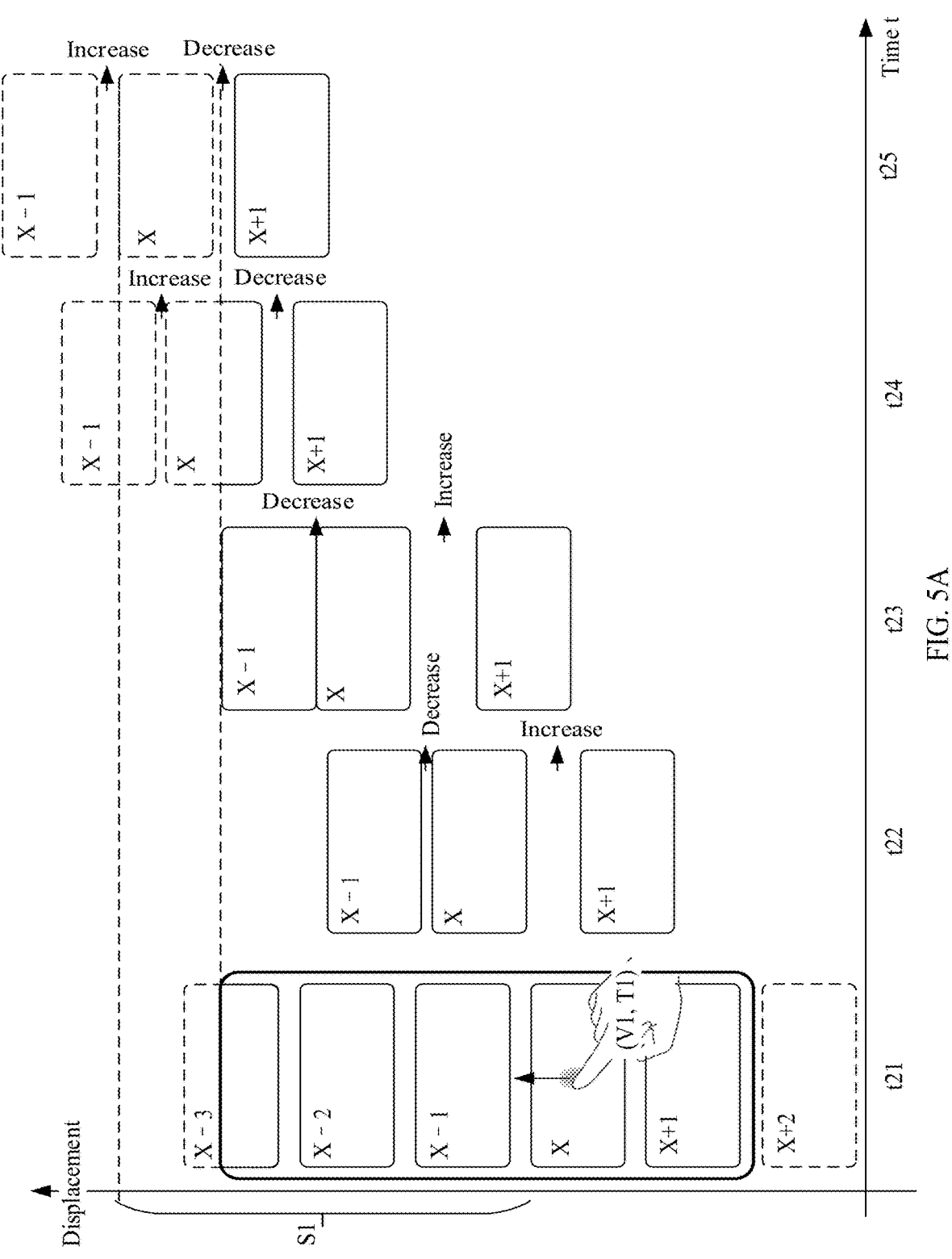
FIG. 5A to FIG. 5F are schematic diagrams of page sliding effects according to an embodiment of this application.

As shown in FIG. 5A, at a moment t21, the module interval $L_{(X−1, X)}$ is equal to an initial interval between the module (X−1) and the module X, and the module interval $L_{(X+1, X)}$ is equal to an initial interval between the module X and the module (X+1). Starting from the moment t21, the user's finger slides upward on the display 194 by using the focus module X as a start point. After detecting the user operation applied to the focus module X, the electronic device 100 controls each page module of the HiBoard page to slide upward. During the moment t21 to a moment t23, the module (X−1), the module X, and the module (X+1) slide upward. Compared with that at the moment t21, at a moment t22, the module interval $L_{(X−1, X)}$ decreases and the module interval $L_{(X, X+1)}$ increases. Compared with that at the moment t22, at the moment t23, the module interval $L_{(X−1, X)}$ continues to decrease and the module interval $L_{(X, X+1)}$ continues to increase. During the moment t23 to a moment t25, the module (X−1), the module X, and the module (X+1) continue to slide upward. Compared with that at the moment t23, at a moment t24, the module interval $L_{(X−1, X)}$ increases and the module interval $L_{(X+1, X)}$ decreases. Compared with that at the moment t24, at the moment t25, the module interval $L_{(X−1, X)}$ increases to the initial interval between the module (X−1) and the module X, and the module interval $L_{(X+1, X)}$ decreases to the initial interval between the module X and the module (X+1). After the moment t25, each page module shown in FIG. 5A stops sliding.

In some embodiments of this application, refer to FIG. 5A. The second page module may be the module (X−1), the third page module may be the module (X+1), the first interval may be the module interval $L_{(X−1, X)}$, and the second interval may be the module interval $L_{(X+1, X)}$. Refer to FIG. 5A. The first time period and the third time period may be a time period corresponding to the moment t21 to the moment t23, and the second time period and the fourth time period are a time period corresponding to the moment t23 to the moment t25. In FIG. 5A, a start moment of the first time period is the same as that of the third time period, and the cutoff moment of the first time period is also the same as that of the third time period.

In some embodiments, the start moment of the first time period may be earlier than the start moment of the third time period, for example, in FIG. 5A, a moment at which the module interval $L_{(X−1, X)}$ starts to decrease is earlier than a moment at which the module interval $L_{(X+1, X)}$ starts to increase. In some embodiments, the start moment of the first time period may be later than the start moment of the third time period, for example, in FIG. 5A, a moment at which the module interval $L_{(X+1, X)}$ starts to increase is earlier than a moment at which the module interval $L_{(X−1, X)}$ starts to decrease.

In some embodiments, the cutoff moment of the first time period may be later than the cutoff moment of the third time period, for example, in FIG. 5A, when the module interval $L_{(X−1, X)}$ decreases, the module interval $L_{(X, X+1)}$ has started changing from an increasing trend to a decreasing trend. In some embodiments, the cutoff moment of the first time period may be earlier than the cutoff moment of the third time period, for example, in FIG. 5A, when the module interval $L_{(X, X+1)}$ increases, the module interval $L_{(X−1, X)}$ has started changing from a decreasing trend to an increasing trend.

In some embodiments, the cutoff moment of the second time period may be earlier than a cutoff moment of the fourth time period. For example, in FIG. 5A, when the module interval $L_{(X−1, X)}$ increases to the initial interval between the module (X−1) and the module X, the module interval $L_{(X+1, X)}$ still continues to decrease until decreases to the initial interval between the module X and the module (X+1). In some embodiments, the cutoff moment of the second time period may be later than the cutoff moment of the fourth time period. For example, in FIG. 5A, when the module interval $L_{(X+1, X)}$ decreases to the initial interval between the module X and the module (X+1), the module interval $L_{(X−1, X)}$ still continues to increase until increases to the initial interval between the module (X−1) and the module X.

In some embodiments of this application, each page module is connected to a virtual spring, and a movement trend of each page module meets an elasticity movement trend of the spring.

Figure 5B:
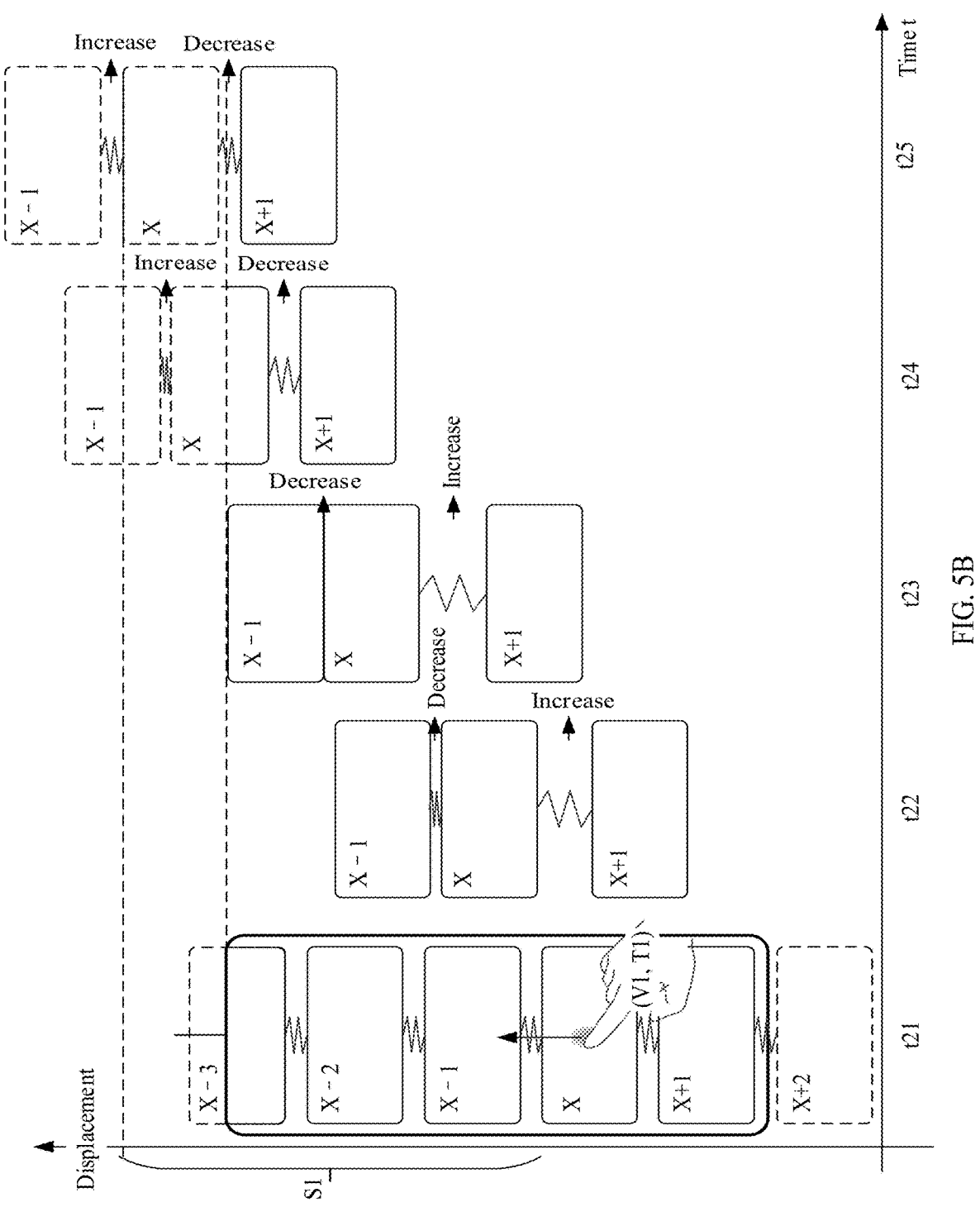

In some embodiments of this application, as shown in FIG. 5B, a chain connection with a spring property is used between adjacent page modules. In this embodiment of this application, a virtual spring between the module (X+a) and the module (X+a−1) is referred to as $Y_{(X+a−1, X+a)}$, where a is an integer. The module interval $L_{(X+a−1, X+a)}$ between the module (X+a) and the module (X+a−1) is a length of the virtual spring $Y_{(X+a−1, X+a)}$.

As shown in FIG. 5B, at the moment t21, the user's finger slides upward on the display 194 by using the focus module X as a start point, and the electronic device detects that a sliding speed of the user is V1. After the user stops sliding, the module X slides upward at the initial speed V1. During the moment t21 to the moment t22, the module interval $L_{(X-1,\ X)}$ decreases and the module interval $L_{(X+1,\ X)}$ increases. The chain connection with a spring property is used between adjacent modules. Because the module interval $L_{(X-1,\ X)}$ decreases, the module X is subject to elasticity that is of the virtual spring $Y_{(X,\ X-1)}$ and that points to the bottom of the electronic device 100, and the module (X–1) is also subject to elasticity that is of the virtual spring $Y_{(X,\ X-1)}$ and that points to the top of the electronic device 100. Based on the elasticity pointing to the top of the electronic device 100, the module (X–1) also moves toward the top of the electronic device 100. During the moment t21 to the moment t23, a movement speed of the module (X–1), is less than a movement speed of the module X, and the module interval $L_{(X-1,\ X)}$ gradually decreases. Because the module interval $L_{(X+1,\ X)}$ increases, the module X is subject to pulling force that is of the virtual spring $Y_{(X,\ X+1)}$ and that points to the bottom of the electronic device 100, and the module (X+1) is also subject to pulling force that is of the virtual spring $Y_{(X,\ X+1)}$ and that points to the top of the electronic device 100. Based on the pulling force pointing to the top of the electronic device 100, the module (X+1) also moves toward the top of the electronic device 100. During the moment t21 to the moment t23, a moving speed of the module (X+1) is less than the moving speed of the module X, and the module interval $L_{(X+1,\ X)}$ gradually increases. During the moment t21 to the moment t23, during sliding of the module X, the module X is subject to the elasticity pointing to the bottom of the electronic device 100, the pulling force pointing to the bottom of the electronic device 100, and friction f Therefore, an acceleration of the module X is negative during the moment t21 to the moment t25, and the speed of the module X gradually decreases from the initial speed V1. Starting from the moment t23, the speed of the module X is less than the speed of the module (X–1) and the speed of the module (X+1). During the moment t23 to the moment t25, the module interval $L_{(X-1,\ X)}$ gradually increases and the module interval $L_{(X+1,\ X)}$ gradually decreases.

In some embodiments, V1 may be an average speed at which the user slides on the display 194 in the sliding operation, or may be an instantaneous speed before the user's finger stops the sliding operation. The electronic device 100 may determine a relative displacement S1 of each page module based on the sliding speed V1 of the user.

In some embodiments, the module X slides upward starting from the moment t21. As a compression amount of the virtual spring $Y_{(X,\ X-1)}$ increases, the elasticity, subjected by the module (X–1), that is of the virtual spring $Y_{(X,\ X-1)}$ and that points to the top of the electronic device 100 also increases. The module (X–1) starts to move toward the top of the electronic device 100 only when the elasticity that is of the virtual spring $Y_{(X,\ X-1)}$ and that points to the top of the electronic device 100 is greater than the friction subjected by the module (X–1). Sliding time of the module (X–1) is later than that of the module X. Similarly, the module X slides upward starting from the moment t21. As a pulling amount of the virtual spring $Y_{(X,\ X+1)}$ increases, the module (X+1) is subject to increased pulling force that is of the virtual spring $Y_{(X,\ X+1)}$ and that points to the top of the electronic device 100. The module (X+1) starts to move toward the top of the electronic device 100 only when the pulling force that is of the virtual spring $Y_{(X,\ X+1)}$ and that points to the top of the electronic device 100 is greater than the friction subjected by the module (X+1). Sliding time of the module (X+1) is later than that of the module X.

In some embodiments, the module (X–1), the module X, and the module (X+1) are not subject to friction during sliding. The module X slides upward starting from the moment t21. When the virtual spring $Y_{(X,\ X-1)}$ is compressed, the module (X–1) is subject to the elasticity that is of the virtual spring $Y_{(X,\ X-1)}$ and that points to the top of the electronic device 100, and immediately moves toward the top of the electronic device 100. The module X slides upward starting from the moment t21. When the virtual spring $Y_{(X,\ X+1)}$ is pulled, the module (X+1) is subject to the pulling force that is of the virtual spring $Y_{(X,\ X+1)}$ and that points to the top of the electronic device 100, and immediately moves toward the top of the electronic device 100.

A page sliding effect is further described below by using a page module shown in FIG. 5C as an example. For sliding effects of a module (X–1), a module X, and a module (X+1) in FIG. 5C, refer to the sliding effects of the module (X–1), the module X, and the module (X+1) in FIG. 5A.

Figure 5C:
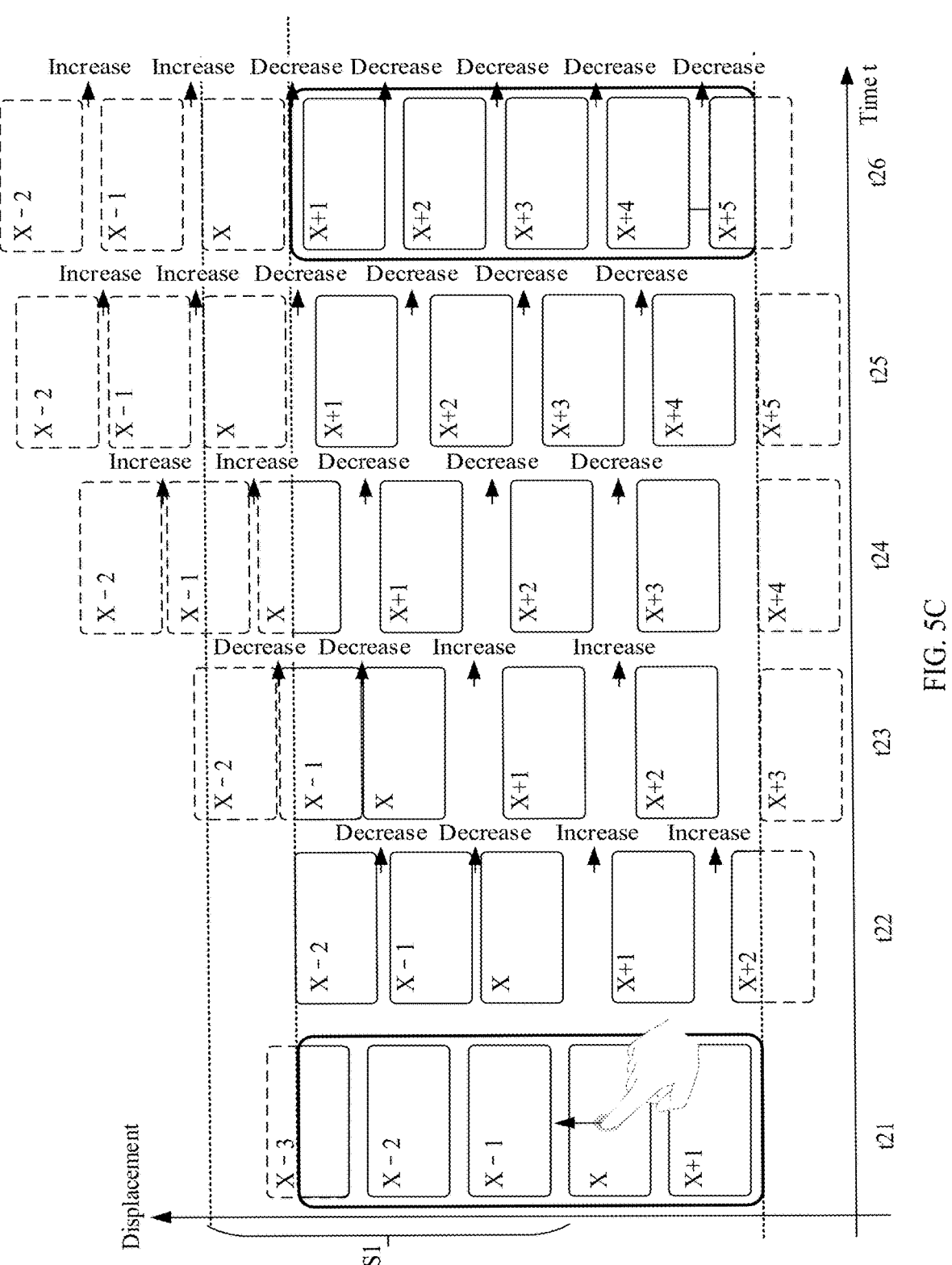

As shown in FIG. 5C, at a moment t21, a module interval $L_{(X-n-1,\ X-n)}$ is equal to an initial interval between a module (X–n) and a module (X–n–1), and a module interval $L_{(X+n-1,\ X+n)}$ is equal to an initial interval between a module (X+n–1) and a module (X+n). Starting from the moment t21, the user's finger slides upward on the display 194 by using the focus module X as a start point. After detecting the user operation applied to the focus module X, the electronic device 100 controls each page module to slide upward. During the moment t21 to a moment t23, each page module slides upward. Compared with that at the moment t21, at a moment t22, the module interval $L_{(X-n-1,\ X-n)}$ decreases and the module interval $L_{(X+n-1,\ X+n)}$ increases. Compared with that at the moment t22, at the moment t23, the module interval $L_{(X-n-1,\ X-n)}$ continues to decrease and the module interval $L_{(X+n-1,\ X+n)}$ continues to increase. During the moment t23 to a moment t25, each page module continues to slide upward. Compared with that at the moment t23, at a moment t24, the module interval $L_{(X-n-1,\ X-n)}$ increases and the module interval $L_{(X+n-1,\ X+n)}$ decreases. Compared with that at the moment t24, at the moment t25, the module interval $L_{(X-n-1,\ X-n)}$ increases to the initial interval between the module (X–n) and the module (X–n–1) and the module interval $L_{(X+n-1,\ X+n)}$ decreases to the initial interval between the module (X+n–1) and the module (X+n). After the moment t25, each page module shown in FIG. 5A stops sliding.

In some embodiments of this application, at the moment t22, a module interval $L_{(X-1,\ X)}$ is less than a module interval $L_{(X-2,\ X-1)}$, and a module interval $L_{(X,\ X+1)}$ is greater than a module interval $L_{(X+1,\ X+2)}$. At the moment t23, the module interval $L_{(X-1,\ X)}$ is less than or equal to the module interval $L_{(X-2,\ X-1)}$, the module interval $L_{(X+1,\ X)}$ is greater than the module interval $L_{(X+1,\ X+2)}$, and the module interval $L_{(X+1,\ X+2)}$ is greater than a module interval $L_{(X+2,\ X+3)}$. In an implementation, at the moment t24, the module interval $L_{(X-1,\ X)}$ is greater than the module interval $L_{(X-2,\ X-1)}$, the module interval $L_{(X,\ X+1)}$ is less than the module interval $L_{(X+1,\ X+2)}$, and the module interval $L_{(X+1,\ X+2)}$ is less than the module interval $L_{(X+2,\ X+3)}$. In another implementation, at the moment t24 and the moment t25, the module interval $L_{(X-1,\ X)}$ is less than the module interval $L_{(X-2,\ x-1)}$, the module interval $L_{(X,\ X+1)}$ is greater than the module interval $L_{(X+1,\ X+2)}$, and the module interval $L_{(X+1,\ X+2)}$ is greater than the module interval $L_{(X+2,\ X+3)}$. In another implementation, at the moment t24, the module interval $L_{(X-1,\ X)}$ is greater than the module interval $L_{(X-2,\ X-1)}$, the module interval $L_{(X+1, X)}$ is less than the module interval $L_{(X+1, X+2)}$, and the module interval $L_{(X+1, X+2)}$ is greater than the module interval $L_{(X+2, X+3)}$.

In some embodiments of this application, at any moment from the moment t21 to the moment t25, the module interval $L_{(X-1, X)}$ is equal to the module interval $L_{(X-2, X-1)}$, and the module interval $L_{(X+1, X)}$ is equal to the module interval $L_{(X+1, X+2)}$, the module interval $L_{(X+2, X+3)}$, a module interval $L_{(X+3, X+4)}$, and a module interval $L_{(X+4, X+5)}$. In other words, change trends of module intervals $L_{(X-n, X-n-1)}$ are the same, and change trends of module intervals $L_{(X+n, X+n-1)}$ are the same.

In some embodiments of this application, compared with that at the moment t21, at the moment t22, a decrease amplitude of the module interval $L_{(X-2, X-1)}$ is less than a decrease amplitude of the module interval $L_{(X-1, X)}$, and an increase amplitude of the module interval $L_{(X+1, X+2)}$ is less than an increase amplitude of the module interval $L_{(X, X+1)}$. The moment t22 may also be referred to as a first time and/or a second time.

In some embodiments of this application, compared with that at the moment t21, at the moment t22, the decrease amplitude of the module interval $L_{(X-2, X-1)}$ is equal to the decrease amplitude of the module interval $L_{(X-1, X)}$, and the increase amplitude of the module interval $L_{(X+1, x+2)}$ is equal to the increase amplitude of the module interval $L_{(X, X+1)}$.

In some embodiments of this application, at any moment from the moment t21 to the moment t25, a distance between the module (X−n) and the module (X+n) remains unchanged. For example, a distance between the module (X−1) and the module (X+1) remains unchanged, to be specific, a distance between the module X and the module (X+1) is less than or equal to the module interval $L_{(X-1, X)}$ plus the module interval $L_{(X+1, X)}$, and a distance between the module X and the module (X−1) is greater than or equal to zero. For example, a distance between a module (X−2) and a module (X+2) remains unchanged.

In some embodiments of this application, a change trend in a process in which a module interval decreases (or increases) may be a linear change or may be a non-linear change. The process in which a module interval decreases (or increases) may be continuous or discontinuous. For example, a time period from the moment t22 to the moment t23 includes a time period 1 and a time period 2. The module interval $L_{(X-1, X)}$ presents a decreasing trend as a whole in the time period from the moment t22 to the moment t23, and the module interval $L_{(X-1, X)}$ may remain unchanged in the time period 1 and decrease in the time period 2. A sequence of the time period 1 and the time period 2 is not specifically limited herein.

In some embodiments of this application, another page module adjacent to the second page module may also be referred to as a fourth page module, and another page module adjacent to the third page module may also be referred to as a fifth page module. There is a third interval between the second page module and the fourth page module, and there is a fourth interval between the third page module and the fifth page module. The third interval decreases in the first time period and increases in the second time period, and the fourth interval increases in the third time period and decreases in the fourth time period. For example, refer to FIG. 5C, the fourth page module may be the module (X−2), and the fifth page module may be the module (X+2). The third interval may be the module interval $L_{(X-2, X-1)}$, and the fourth interval may be the module interval X+2).

In some embodiments of this application, there is a time difference between sliding start moments of page modules. The electronic device 100 detects an upward sliding operation applied to the focus module X, and in response to the sliding operation, the electronic device 100 controls each page module to slide upward, and there is a time difference between sliding start moments of two adjacent page modules on a same side of the focus module X, where a module closer to the focus module X first slides. Further, a sliding start moment of the module (X−n) is the same as that of the module (X+n).

Figure 5D:
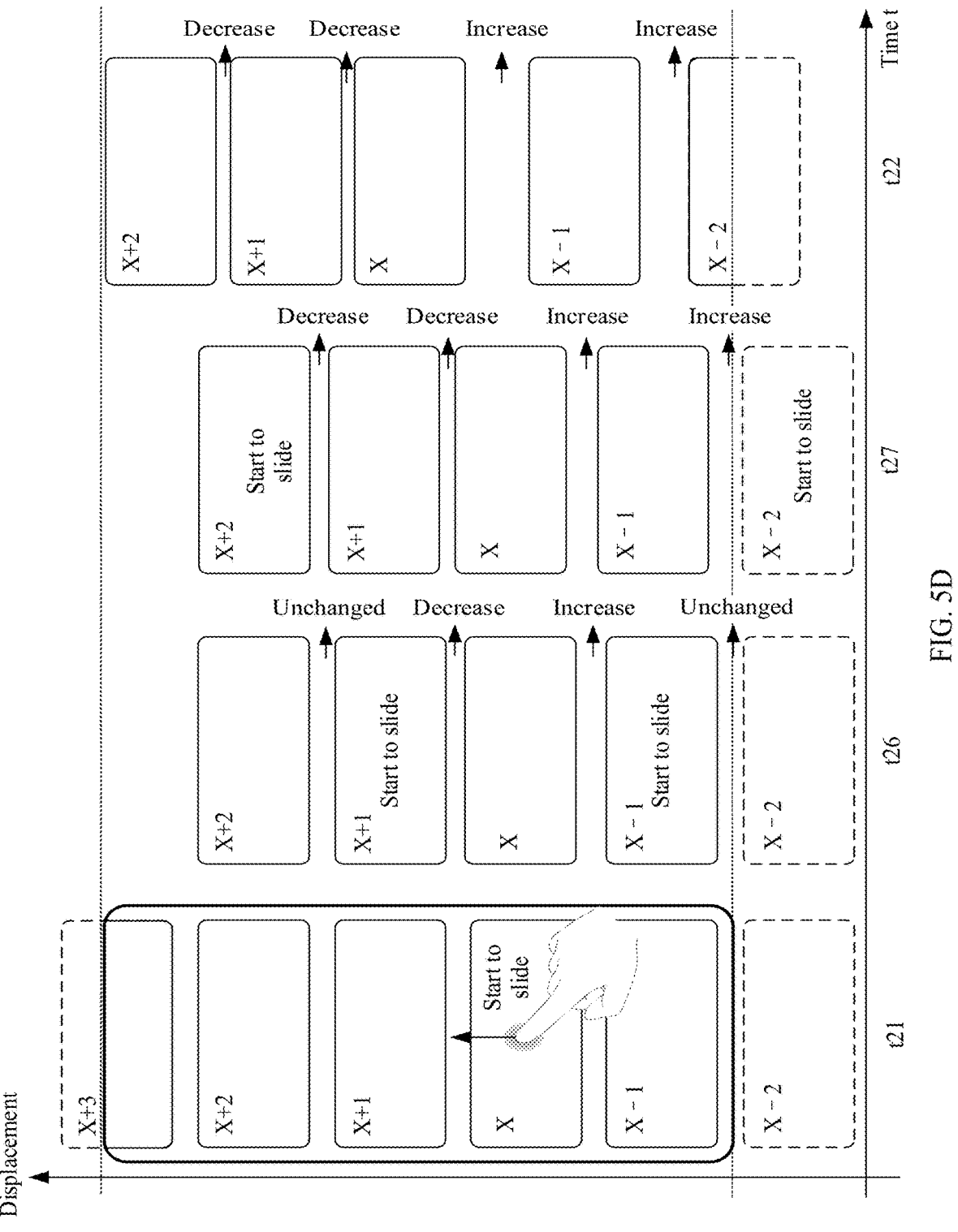

For example, as shown in FIG. 5D, a moment t26 and a moment t27 may also be included between the moment t21 and the moment t22. The electronic device 100 detects the upward sliding operation applied to the focus module X, and the electronic device 100 controls each page module to slide upward. During the moment t21 to the moment t26, the module X slides upward, and locations of all other modules remain unchanged. Compared with that at the moment t21, at the moment t26, the module interval $L_{(X-1, X)}$ decreases, the module interval $L_{(X+1, X)}$ increases, the module interval $L_{(X-2, X-1)}$ and the module interval $L_{(X+1, X+2)}$ remain unchanged. During the moment t26 to the moment t27, the module X continues to slide upward, the module (X−1) and the module (X+1) start to slide upward, and locations of other modules remain unchanged. Compared with that at the moment t26, at the moment t27, the module interval $L_{(X-2, X-1)}$ and the module interval $L_{(X-1, X)}$ decrease, and the module interval $L_{(X, X+1)}$ and the module interval $L_{(X+1, X+2)}$ increase. A difference between sliding start moments of the module (X−1) and the module X is a time difference 1, that is, a time difference between the moment t21 and the moment t26, and a difference between sliding start moments of the module (X−2) and the module (X−1) is a time difference 2, that is, a time difference between the moment t26 and the moment t22. The time difference 1 and the time difference 2 may be set by default by the electronic device 100, may be preset by a user, or may be determined by the electronic device based on friction of the page module. The time difference 1 and the time difference 2 may be equal or unequal.

Figure 5E:
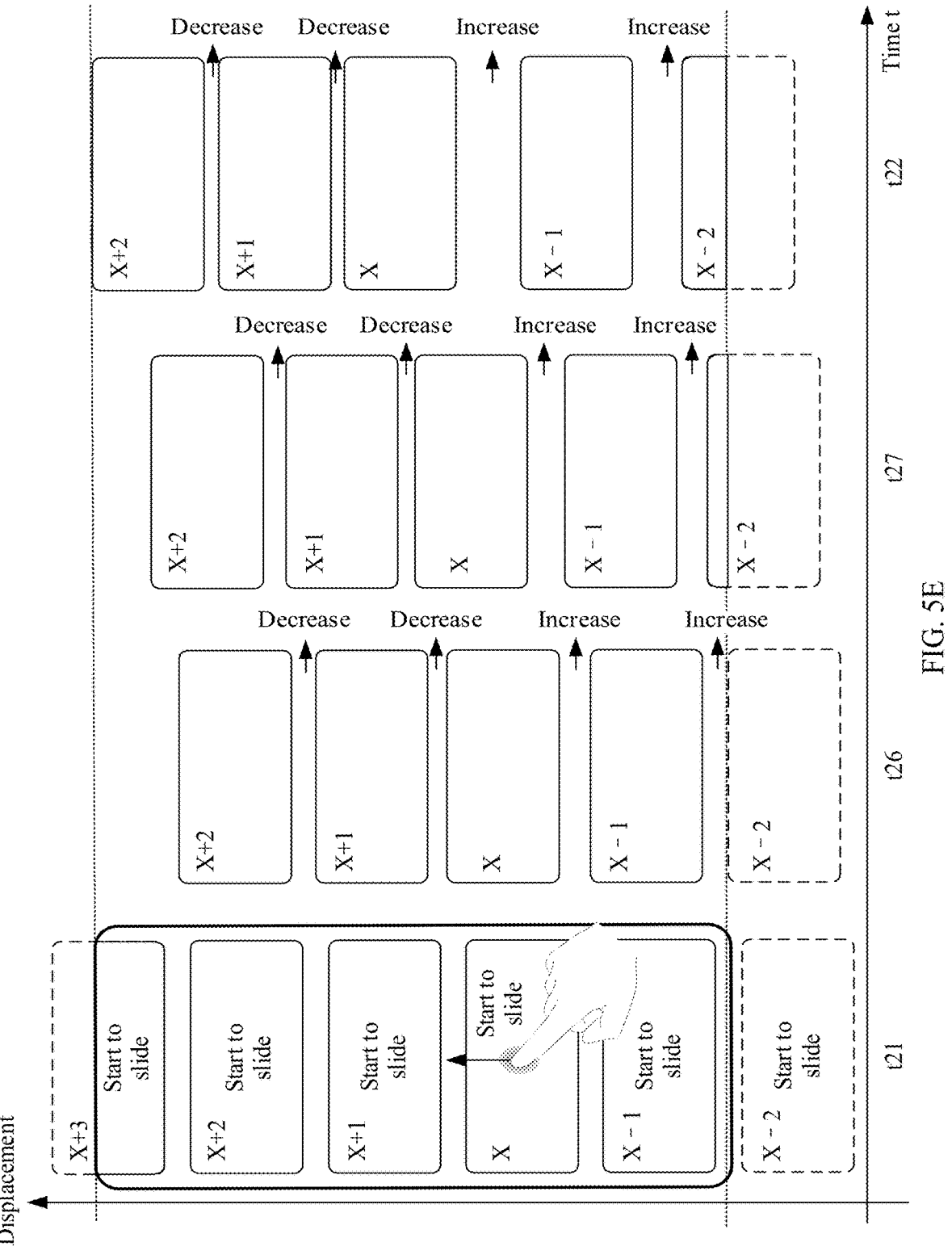

In some embodiments of this application, there is no time difference between sliding start moments of page modules. For example, as shown in FIG. 5E, the electronic device 100 detects an upward sliding operation applied to the focus module X, and the electronic device 100 controls the page modules to slide upward at the same time. Starting from the moment t21, each page module slides upward. Compared with that at the moment t21, at the moment t26, the module interval $L_{(X-n-1, X-n)}$ decreases and the module interval $L_{(X+n-1, X+n)}$ increases. During the moment t26 to the moment t27, each page module continues to slide upward. Compared with that at the moment t26, at the moment t27, the module interval $L_{(X-n-1, X-n)}$ continues to decrease and the module interval $L_{(X+n-1, X+n)}$ continues to increase.

In some embodiments of this application, there is a time difference between sliding stop moments of page modules. There is a time difference between sliding stop moments of two adjacent page modules on a same side of the focus module X, where a module closer to the focus module X first stops sliding. Further, a sliding stop moment of the module (X−n) is the same as that of the module (X+n).

Figure 5F:
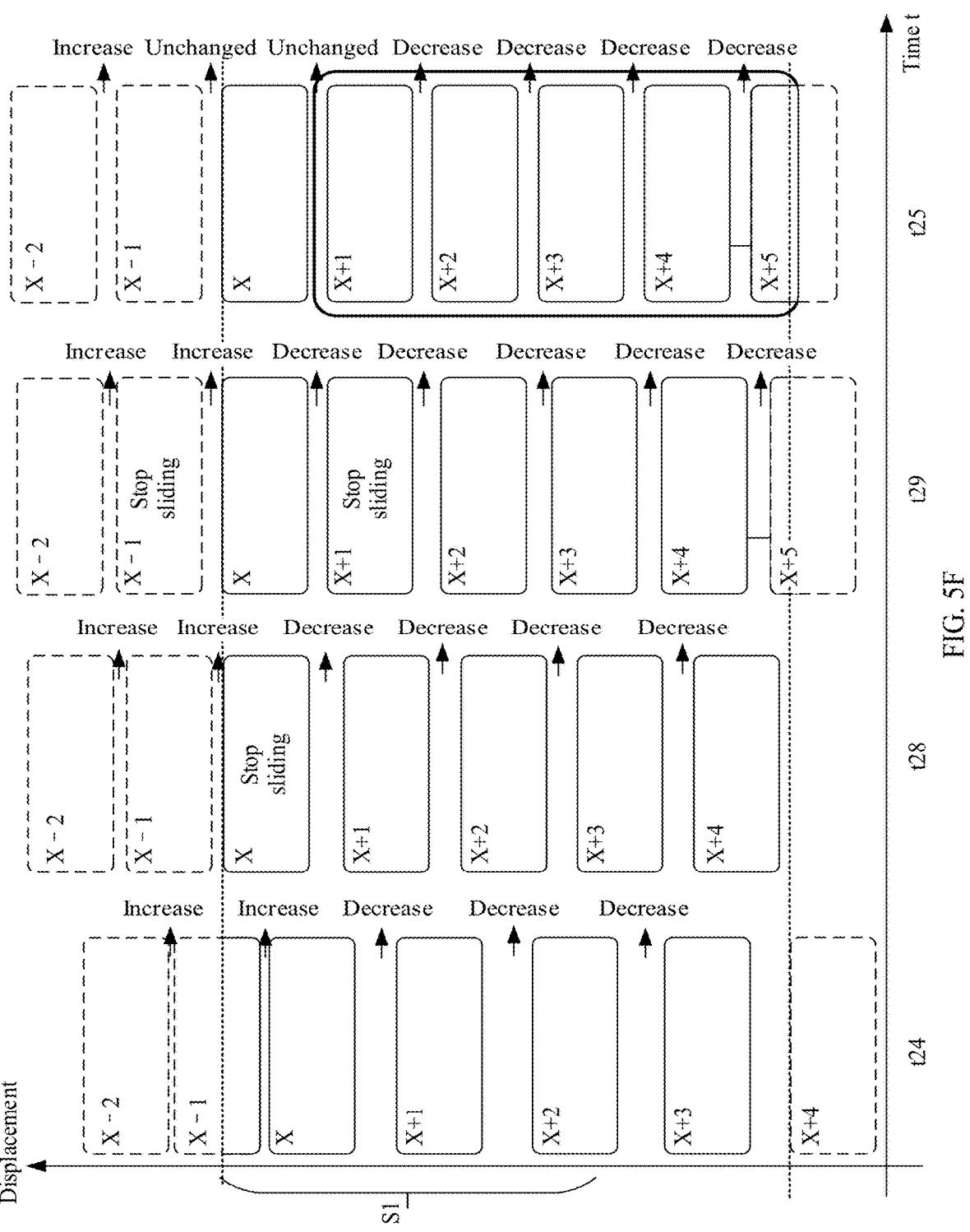

For example, as shown in FIG. 5F, a moment t28 and a moment t29 may further be included between the moment t24 and the moment t25. During the moment t24 to the moment t28, each page module slides upward, the module interval $L_{(X-n-1, X-n)}$ increases, and the module interval $L_{(X+n-1,\ X+n)}$ decreases. At the moment t28, the module X starts to stop sliding, and at the moment t29, the module (X−1) and the (module X+1) start to stop sliding. During the moment t28 to the moment t29, a location of the module X remains unchanged, and other modules continue to slide upward. Compared with that at the moment t28, at the moment t29, the module interval $L_{(X-n-1,\ X-n)}$ continues to increase and the module interval $L_{(X+n-1,\ X+n)}$ continues to decrease. The module interval $L_{(X-1,\ X)}$ increases to an initial interval, and the module interval $L_{(X+1,\ X)}$ decreases to an initial interval. During the moment t29 to the moment t25, locations of the module X, the module (X−1), and the module (X+1) remain unchanged, and other modules continue to slide upward. Compared with that at the moment t29, at the moment t25, the module interval $L_{(X-1,\ X)}$ and the module interval $L_{(X+1,\ X)}$ remain unchanged, the module interval $L_{(X-n-1,\ X-n)}$ other than the module interval $L_{(X-1,\ X)}$ increases to an initial interval, and the module interval $L_{(X+n-1,\ X+n)}$ other than the module interval $L_{(X+1,\ X)}$ decreases to an initial interval. A difference between sliding stop moments of the module (X−1) and the module X is a time difference 3, that is, a time difference between the moment t27 and the moment t28, and a difference between sliding stop moments of the module (X−2) and the module (X−1) is a time difference 4. The time difference 3 and the time difference 4 may be set by default by the electronic device 100, or may be preset by a user. The time difference 3 and the time difference 4 may be equal or unequal.

In an implementation, a chain connection with a spring property is used between adjacent page modules. The module (X−n) starts to slide toward the top of the electronic device 100 only when elasticity that points to the top of the electronic device 100 and that is subjected by the module (X−n) is greater than sliding friction of the module (X−n). During the moment t21 to the moment t22, a sliding speed of the module (X−n) is less than or equal to that of the module (X−n−1), and sliding time of the module (X−n−1) is later than that of the module (X−n). Therefore, compared with that at the moment t21, at the moment t22, the module interval $L_{(X-2,\ X-1)}$ decreases and is less than the module interval $L_{(X-1,\ X)}$. Similarly, the module (X+n) starts to slide toward the top of the electronic device 100 only when elasticity that points to the top of the electronic device 100 and that is subjected by the module (X+n) is greater than sliding friction of the module (X+n). During the moment t21 to the moment t22, a sliding speed of a module (X+n+1) is less than that of the module (X+n), and sliding time of the module (X+n+1) is later than that of the module (X+n). Therefore, compared with that at the moment t21, at the moment t22, the module interval $L_{(X+1,\ X+2)}$ increases and is less than the module interval $L_{(X,\ X+1)}$.

The page shown in FIG. 5C may also include another page module. Based on the foregoing embodiment, similarly, sliding effects of any module (X−n) and any module (X+n) may be derived, and details are not described herein.

Figure 6A:
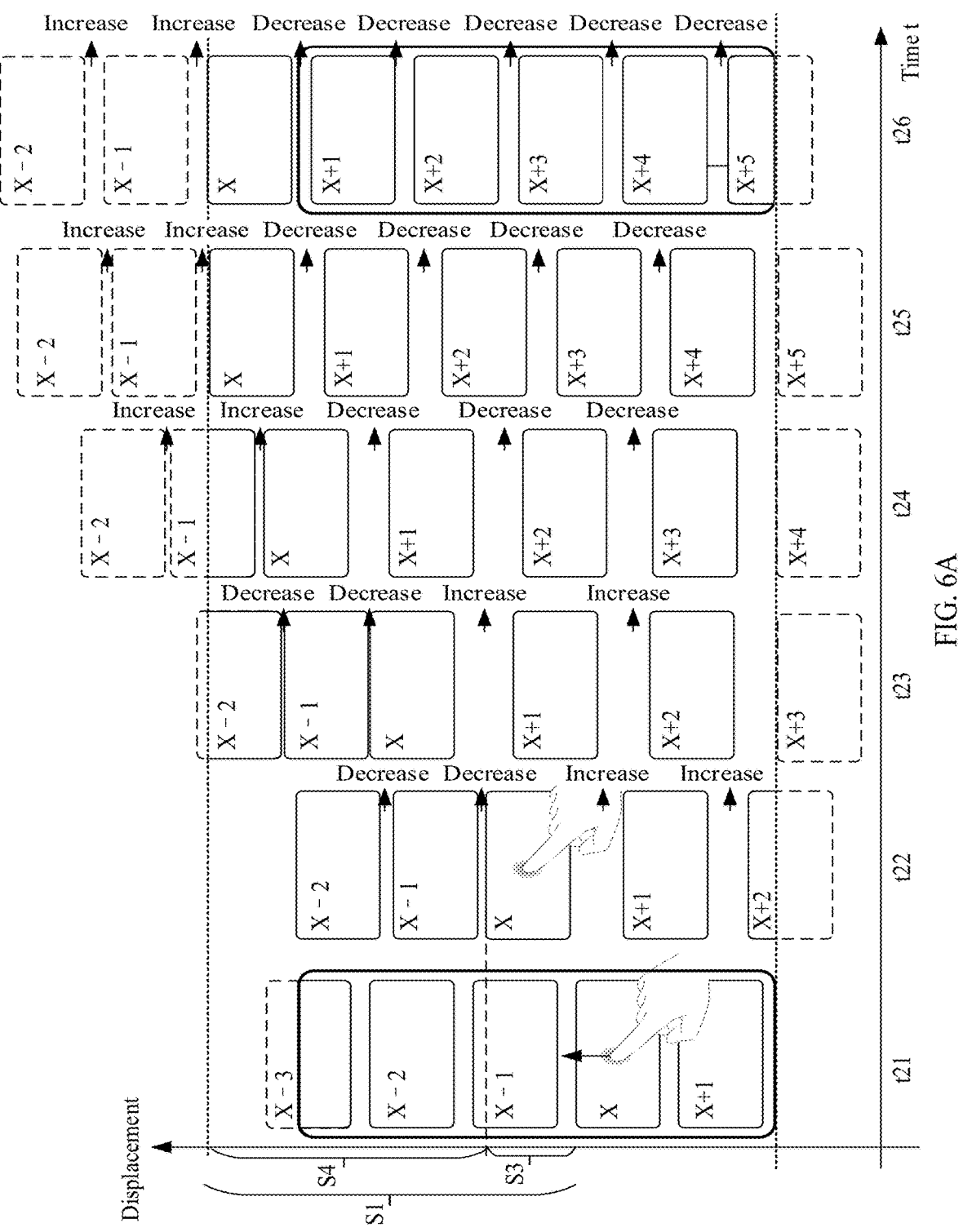
FIG. 6A to FIG. 6C are schematic diagrams of page sliding effects according to an embodiment of this application.
Figure 6B:
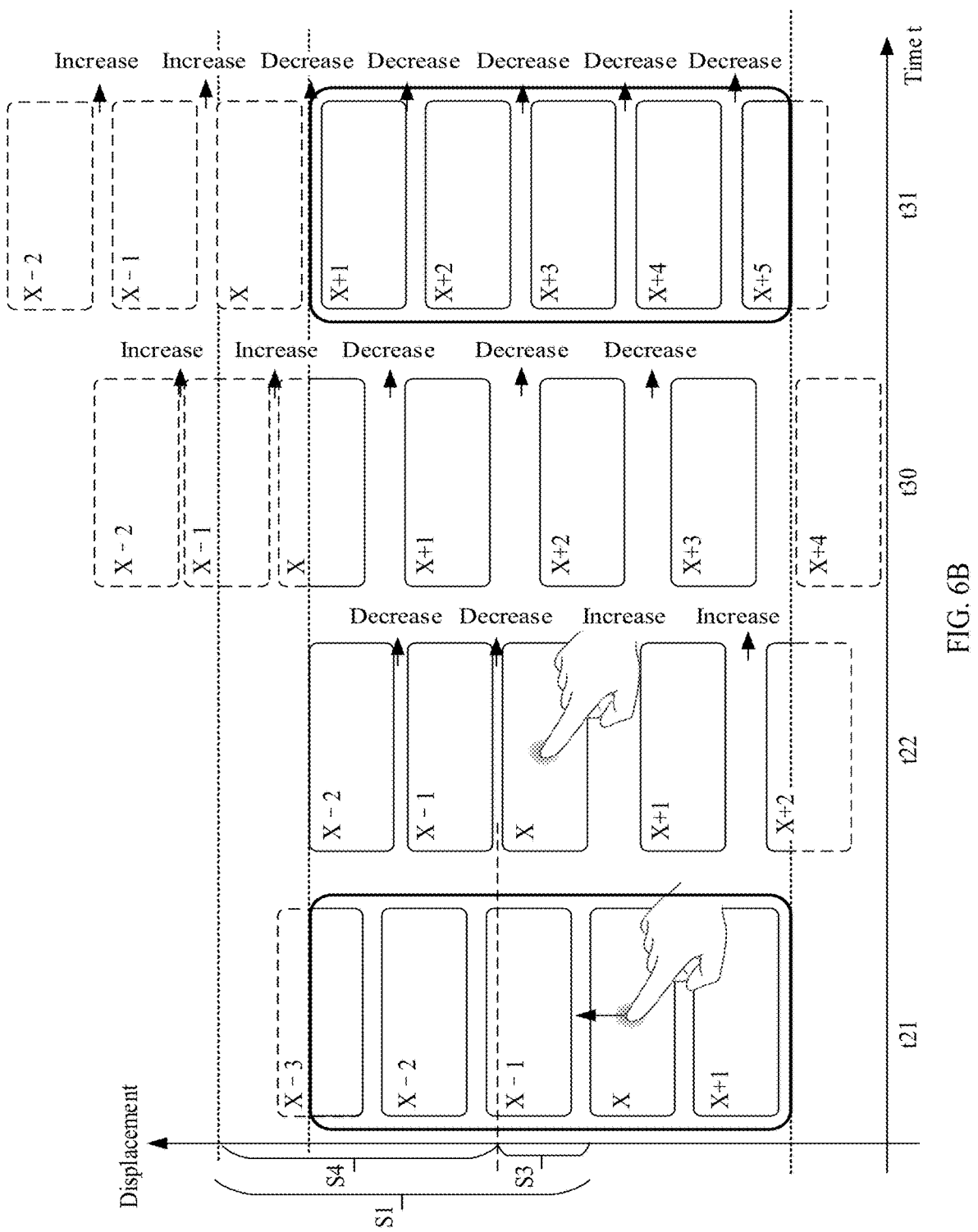
Figure 6C:
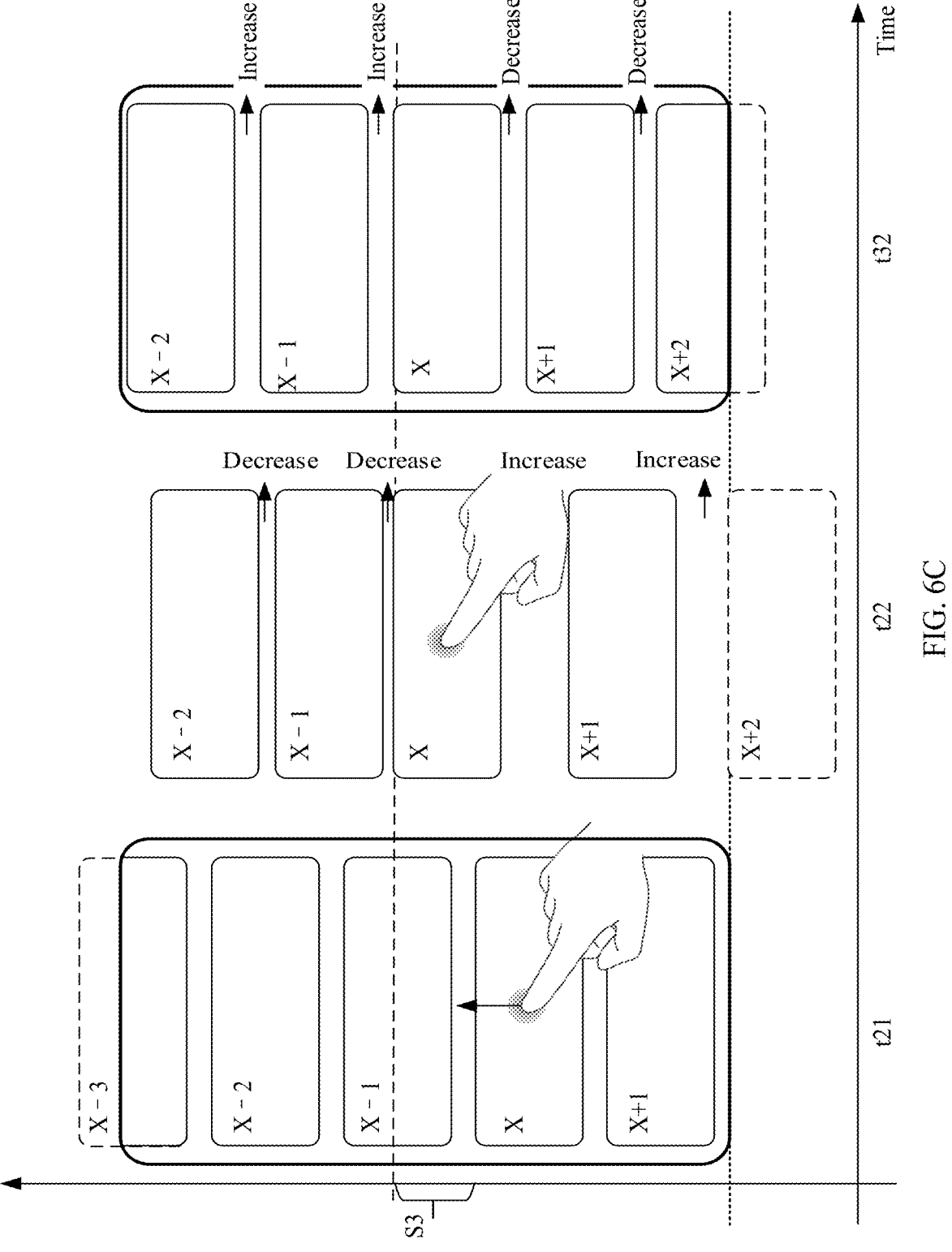

FIG. 6A to FIG. 6C show several page sliding effects provided in an embodiment of this application based on sliding of a user's finger on the display 194.

As shown in FIG. 6A and FIG. 6B, starting from the moment t21, the user's finger slides upward by S3 on the display 194 by using the focus module X as a start point. After detecting the user operation, the electronic device 100 controls each page module to slide upward. The module interval $L_{(X-n-1,\ X-n)}$ decreases and the module interval $L_{(X+n-1,\ X+n)}$ increases. At the moment t22, the user's finger leaves the display 194. Based on a sliding speed before the user's finger leaves, the electronic device 100 uses a friction model to determine a relative displacement S4 of the module X after the moment t22 and a relative displacement S3+S4 of other modules after the moment t21, and controls each page module to slide upward. In an implementation, refer to FIG. 6A. After the moment t22, during the moment t22 to the moment t26, the module interval $L_{(X-n-1,\ X-n)}$ decreases and the increases to an initial interval, and the module interval $L_{(X+n-1,\ X+n)}$ increases and then decreases to an initial interval. In another implementation, refer to FIG. 6B. t30 and t31 are further included after the moment t22. During the moment t22 to the moment t31, the module interval $L_{(X-n-1,\ X-n)}$ increases to the initial interval and the module interval $L_{(X+n-1,\ X+n)}$ decreases to the initial interval.

As shown in FIG. 6C, during the moment t21 to the moment t22, the user's finger slides upward by S3 on the display 194 by using the focus module X as a start point. After detecting the user operation, the electronic device 100 controls each page module to slide upward. The module interval $L_{(X-n-1,\ X-n)}$ decreases and the module interval $L_{(X+n-1,\ X+n)}$ increases. After the moment t22, the user's finger leaves the display 194, the module X stops sliding, and the electronic device 100 determines that a relative displacement of each page module is S3. During the moment t22 to the moment t28, the module interval $L_{(X-n-1,\ X-n)}$ increases to the initial interval and the module interval $L_{(X+n-1,\ X+n)}$ decreases to the initial interval.

In this embodiment of this application, the user performs a sliding operation in a sixth time period. Refer to FIG. 6A to FIG. 6C. The sixth time period may be a time period corresponding to the moment t21 to the moment t22. In some embodiments, the cutoff moment of the first time period is later than a cutoff moment of the sixth time period. For example, as shown in FIG. 6A, the first time period and the third time period may be a time period corresponding to the moment t21 to the moment t23, and the second time period and the fourth time period may be a time period corresponding to the moment t23 to the moment t25.

In some embodiments, the cutoff moment of the first time period is equal to the cutoff moment of the sixth time period. For example, as shown in FIG. 6B, the first time period and the third time period may be a time period corresponding to the moment t21 to the moment t22, and the second time period and the fourth time period may be a time period corresponding to the moment t22 to the moment t31. For example, as shown in FIG. 6C, the first time period and the third time period may be a time period corresponding to the moment t21 to the moment t22, and the second time period and the fourth time period may be a time period corresponding to the moment t22 to a moment t32.

In some embodiments, the cutoff moment of the first time period may be earlier than the cutoff moment of the sixth time period.

Another page sliding effect provided in an embodiment of this application is described below by using a page module shown in FIG. 7A as an example. In the page sliding effect shown in FIG. 7A, a size of a page module may vary with sliding of the page module.

Figure 7A:
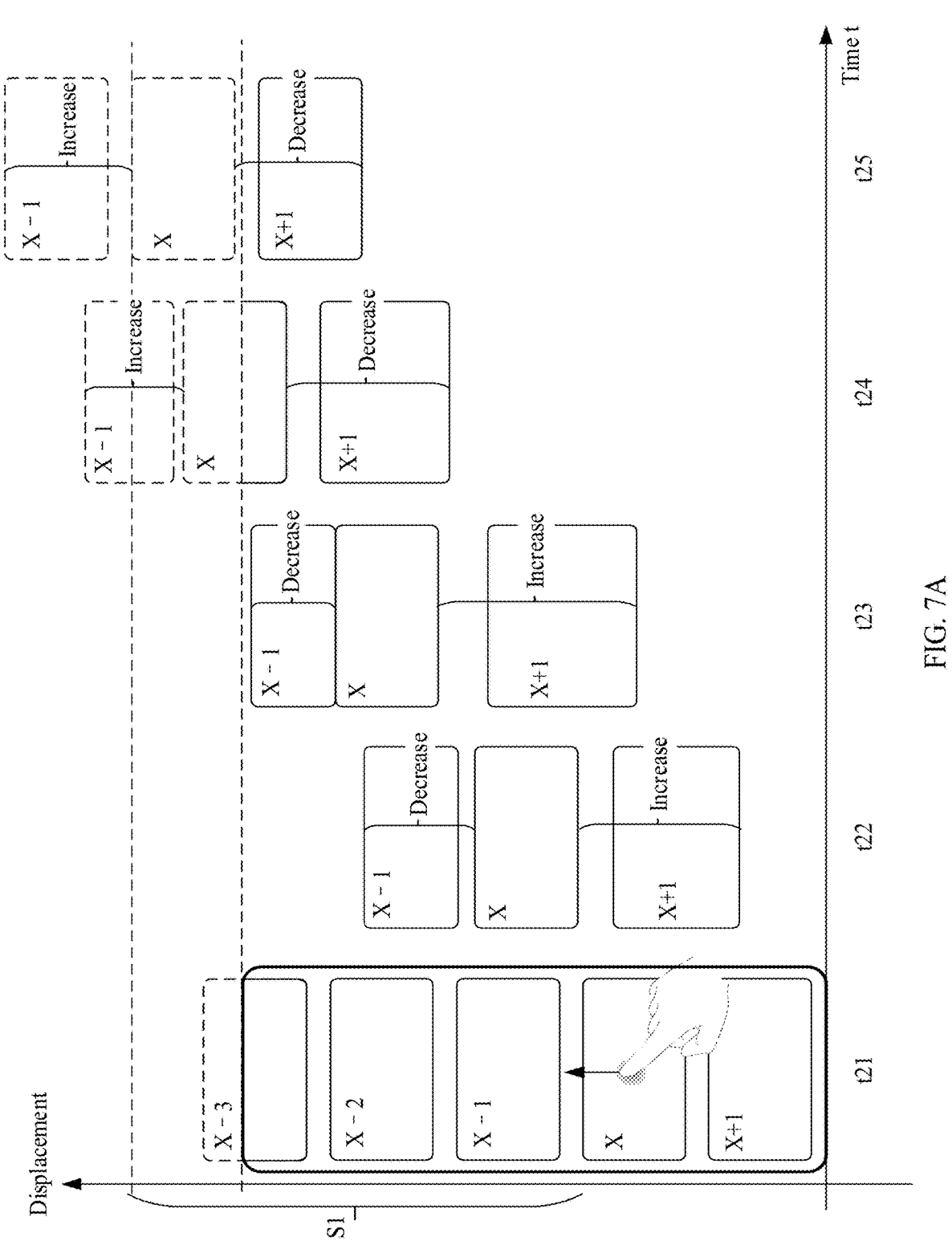
FIG. 7A to FIG. 7C are schematic diagrams of page sliding effects according to an embodiment of this application.

Refer to FIG. 7A. A user slides upward by using a focus module X as a start point. After detecting the user operation, the electronic device 100 controls a page to slide upward. During page sliding, a width of a module (X−n) in a sliding direction of the module X and a module interval $L_{(X-n,\ X-n-1)}$ first decrease and then increase, and a width of a module (X+n) in a direction opposite to the sliding direction of the module X and the module interval $L_{(X-n,\ X-n-1)}$ first increase and then decrease. In this embodiment of this application, a width of a page module (X+a) before page sliding is defined as an initial width of the module (X+a).

As shown in FIG. 7A, at a moment t21, a width of a module (X−1) is an initial width of the module (X−1), a width of the module X is an initial width of the module X, a module interval $L_{(X-1, X)}$ is equal to an initial interval between the module (X−1) and the module X, and a module interval $L_{(X, X+1)}$ is equal to an initial interval between the module X and a module (X+1). Starting from the moment t21, the user's finger slides upward on the display 194 by using the focus module X as a start point. During the moment t21 to a moment t23, the module (X−1), the module X, and the module (X+1) slide upward. Compared with that at the moment t21, at a moment t22, the width of the module (X−1) and the module interval $L_{(X-1, X)}$ decrease, and a width of the module (X+1) and the module interval $L_{(X+1, X)}$ increase. Compared with that at the moment t22, at the moment t23, the width of the module (X−1) and the module interval $L_{(X-1, X)}$ continue to decrease, and the width of the module (X+1) and the module interval $L_{(X+1, X)}$ continue to increase. During the moment t23 to a moment t25, the module (X−1), the module X, and the module (X+1) continue to slide upward. Compared with that at the moment t23, at a moment t24, the width of the module (X−1) and the module interval $L_{(X-1, X)}$ increase, and the width of the module (X+1) and the module interval $L_{(X+1, X)}$ decrease. Compared with that at the moment t24, at the moment t25, the width of the module (X−1) increases to the initial width of the module (X−1), the module interval $L_{(X-1, X)}$ increases to an initial interval between the module (X−1) and the module X, the width of the module (X+1) decreases to an initial width of the module (X+1), and the module interval $L_{(X+1, X)}$ decreases to an initial interval between the module X and the module (X+1). After the moment t25, each page module shown in FIG. 7A stops sliding.

In an implementation, during page sliding during the moment t21 to a moment t26, the width of the module (X−1) and the module interval $L_{(X-1, X)}$ increase or decrease by a same ratio, and the width of the module (X+1) and the module interval $L_{(X+1, X)}$ also increase or decrease by a same ratio. For example, compared with that at the moment t21, at the moment t22, the width of the module (X−1) and the module interval $L_{(X-1, X)}$ decrease, and the width of the module (X+1) and the module interval $L_{(X+1, X)}$ increase. At the moment t22, a ratio of the width of the module (X−1) to the initial width of the module (X−1) is a ratio 1, and a ratio of the module interval $L_{(X-1, X)}$ to an initial interval between two modules (that is, the initial interval between the module (X−1) and the module X) is also the ratio 1. At the moment t22, a ratio of the width of the module (X+1) to the initial width of the module (X+1) is a ratio 2, and a ratio of the module interval $L_{(X+1, X)}$ to an initial interval between two modules (that is, the initial interval between the module (X+1) and the module X) is also the ratio 2. In another implementation, during page sliding during the moment t21 to the moment t26, the width of the module (X−1) and the module interval $L_{(X-1, X)}$ increase or decrease by different ratios, and the width of the module (X+1) and the module interval $L_{(X, X+1)}$ also increase or decrease by different ratios.

Another page sliding effect provided in an embodiment of this application is described below by using a page shown in FIG. 7B as an example. In the page sliding effect shown in FIG. 7B, a size of a page module affects a change trend of a module interval.

Figure 7B:
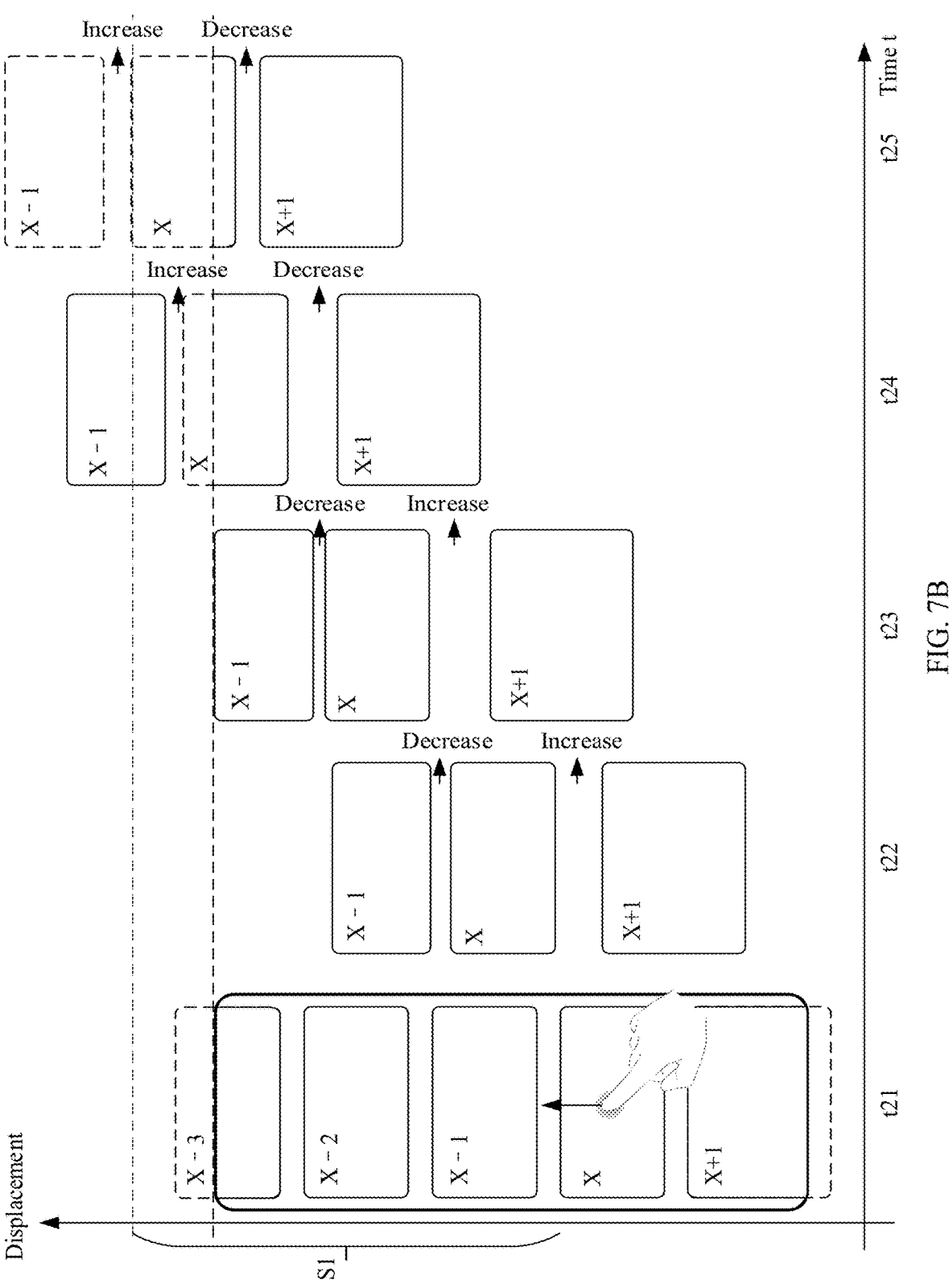

As shown in FIG. 7B, an initial width of a module (X−1) shown in FIG. 7B is smaller than that of the module (X−1) shown in FIG. 5A, and an initial width of a module (X+1)

shown in FIG. 7B is smaller than that of the module (X+1) shown in FIG. 5A. At a moment t21, a user slides upward by using a focus module X as a start point. After detecting the user operation, the electronic device 100 controls a page to slide upward. Similar to the page sliding effect shown in FIG. 5A, a module interval $L_{(X-1, X)}$ first decreases and then increases, and a module interval $L_{(X+1, X)}$ first increases and then decreases. Compared with that in FIG. 5A, in FIG. 7B, the module interval $L_{(X-1, X)}$ and the module interval $L_{(X, X+1)}$ are larger at a moment t22 and a moment t23.

In an implementation, a chain connection with a spring property is used between adjacent page modules. A page module with a larger area has large mass, and the page module is subject to larger friction. As shown in FIG. 7B, the module X slides upward starting from the moment t21. As a compression amount of a virtual spring $Y_{(X, X-1)}$ increases, the module (X−1) is subject to increased elasticity that is of the virtual spring $Y_{(X, X-1)}$ and that points to the top of the electronic device 100. The module (X−1) starts to move toward the top of the electronic device 100 only when the elasticity that is of the virtual spring $Y_{(X, X-1)}$ and that points to the top of the electronic device 100 is greater than the friction subjected by the module (X−1). When the module (X−1) has a smaller area, the module (X−1) is subject to smaller friction, so that the module (X−1) requires smaller elasticity to slide upward, that is, a required spring compression amount is smaller. Therefore, compared with that in FIG. 5A, the module interval $L_{(X-1, X)}$ is larger at the moment t22 and the moment t23. The module X slides upward starting from the moment t21. As a pulling amount of a virtual spring $Y_{(X, X+1)}$ increases, the module (X+1) is subject to increased pulling force that is of the virtual spring $Y_{(X, X+1)}$ and that points to the top of the electronic device 100. The module (X+1) starts to move toward the top of the electronic device 100 only when the pulling force that is of the virtual spring $Y_{(X, X+1)}$ and that points to the top of the electronic device 100 is greater than the friction subjected by the module (X+1). When the module (X+1) has a larger area, the module (X+1) is subject to larger friction, so that the module (X+1) requires larger pulling force to slide upward, that is, a required spring pulling amount is larger. Therefore, compared with that in FIG. 5A, the module interval $L_{(X+1, X)}$ is larger at the moment t22 and the moment t23.

In some embodiments of this application, a width of the module (X−1) is unequal to that of the module (X+1), and a distance between the module (X−1) and the module (X+1) increases during the moment t21 to the moment t23.

Figure 7C:
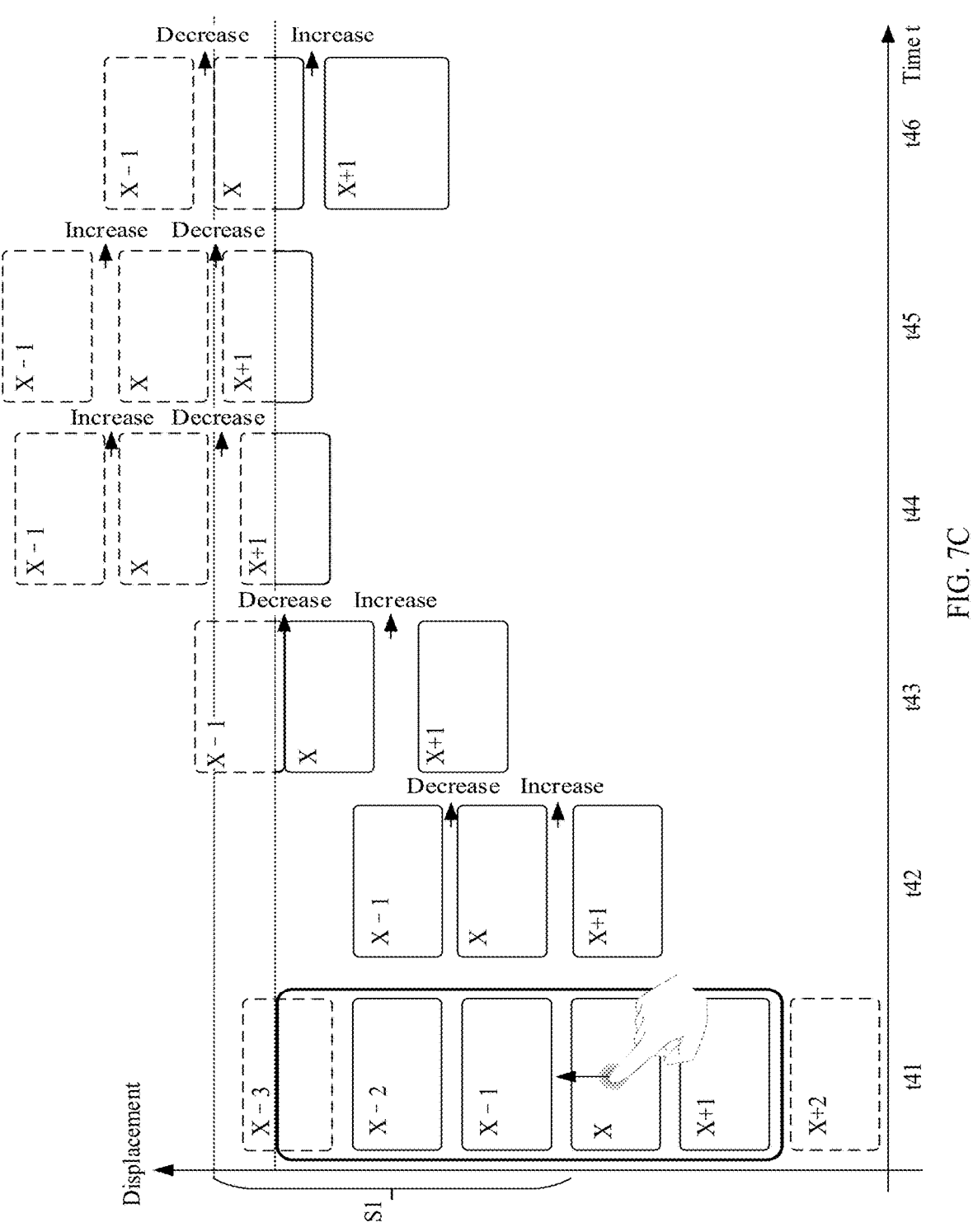

Another page sliding effect provided in an embodiment of this application is described below by using a page shown in FIG. 7C as an example. FIG. 7C provides a page sliding effect of page rebounding.

As shown in FIG. 7C, starting from a moment t41, the user's finger slides upward on the display 194 by using the focus module X as a start point. After detecting the user operation applied to the focus module X, the electronic device 100 controls each page module to slide upward. During the moment t41 to a moment t43, a module (X−1), a module X, and a module (X+1) slide upward. Compared with that at the moment t41, at a moment t42, a module interval $L_{(X-1, X)}$ decreases and a module interval $L_{(X+1, X)}$ increases. Compared with that at the moment t42, at the moment t43, the module interval $L_{(X-1, X)}$ continues to decrease and the module interval $L_{(X+1, X)}$ continues to increase. During the moment t43 to a moment t44, the module (X−1), the module X, and the module (X+1) continue to slide upward. Compared with that at the moment t43, at the moment t44, the module interval $L_{(X-1, X)}$ increases and the module interval $L_{(X+1, X)}$ decreases. During the moment t44 to a moment t45, the module X stops sliding, and the module (X−1) and the module (X+1) continue to slide upward. Compared with that at the moment t44, at the moment t45, the module interval $L_{(X−1, X)}$ continues to increase and the module interval $L_{(X+1, X)}$ continues to decrease. During the moment t45 to a moment t46, the module (X−1), the module X, and the module (X+1) slide downward. Compared with that at the moment t45, at the moment t46, the module interval $L_{(X−1, X)}$ decreases to an initial interval between the module (X−1) and the module X, and the module interval $L_{(X, X+1)}$ increases to an initial interval between the module X and the module (X+1). After the moment t46, the page module shown in FIG. 7C stops sliding.

In some embodiments of this application, a movement trend of the page module shown in FIG. 7C meets a light damping movement state of a spring. As shown in FIG. 7C, a sliding distance of the page is S1. During page sliding, a relative displacement of the page module first exceeds S1 and then rebounds to S1. In some embodiments, sliding of the page module may rebound a plurality of times during page sliding. This is not specifically limited herein.

In some embodiments of this application, refer to FIG. 7C. The second page module may be the module (X−1), the third page module may be the module (X+1), the first interval may be the module interval $L_{(X−1, X)}$, and the second interval may be the module interval $L_{(X+1, X)}$. Refer to FIG. 7C. The first time period and the third time period may be a time period corresponding to the moment t41 to the moment t43, and the second time period and the fourth time period are a time period corresponding to the moment t43 to the moment t45.

In some embodiments of this application, the first interval decreases to an initial interval in a seventh time period after the second time period, and the second interval increases to an initial interval in an eighth time period after the fourth time period. A start moment of the seventh time period is equal to the cutoff moment of the second time period, and a start moment of the eighth time period is equal to the cutoff moment of the fourth time period. Refer to FIG. 7C. The seventh time period and the eighth time period may be a time period corresponding to the moment t45 to a moment t46.

Figure 8A:
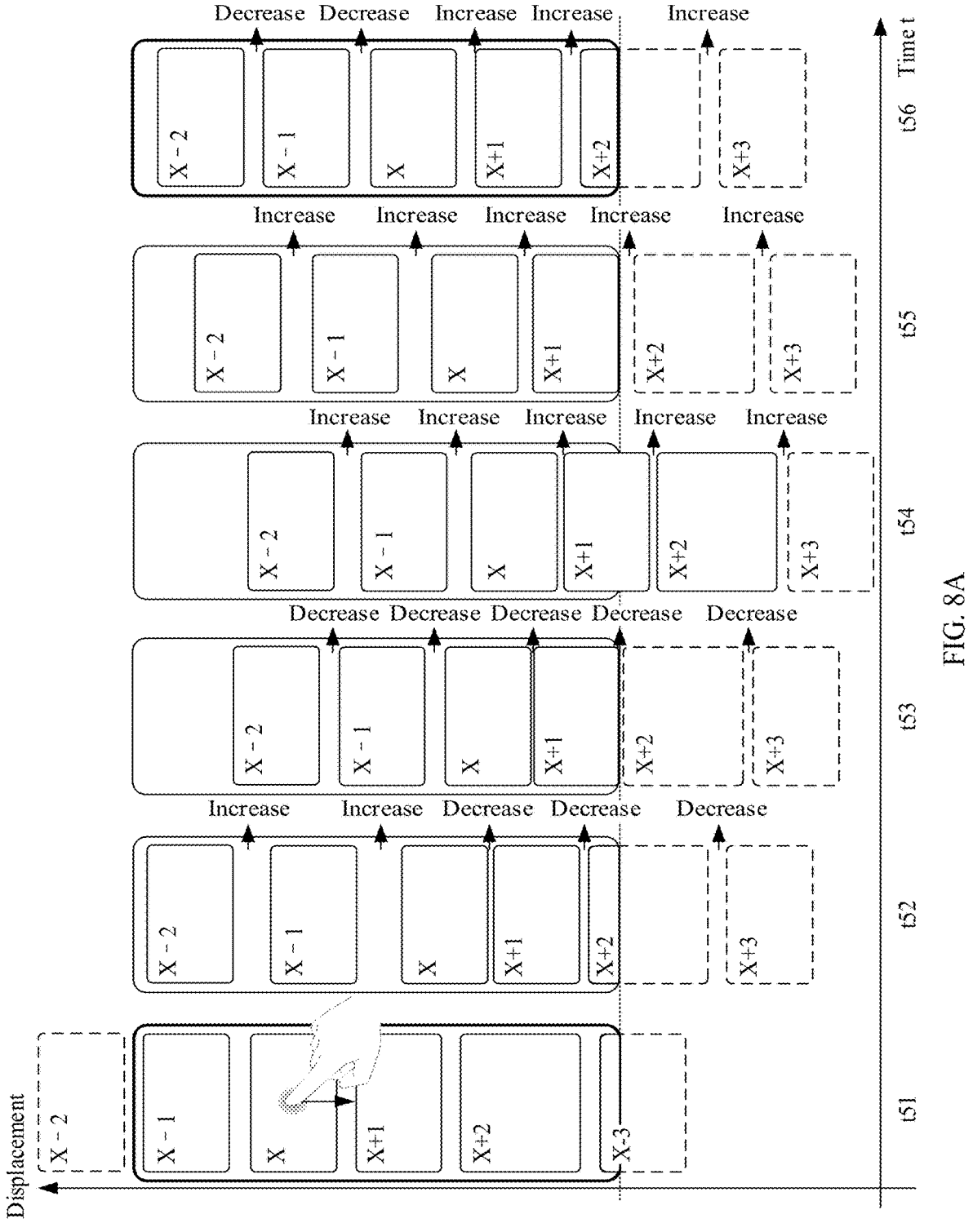
FIG. 8A to FIG. 8C are schematic diagrams of page sliding effects according to an embodiment of this application.

Another page sliding effect provided in an embodiment of this application is described below by using a page shown in FIG. 8A as an example. As shown in FIG. 8A, a module (X−2) is an edge module of the page shown in FIG. 8A. One side of the module (X−2) is connected to a module (X−1), and the other side is connected to no page module. Refer to FIG. 8A. When a user slides the page downward, from a moment t53 to a moment t56, the module (X−2) is displayed on the display 194, and a distance between an upper edge of the module (X−2) and an upper edge of a display interface is greater than a preset value 1. This case is referred to as page overstepping in this embodiment of this application. For this case, this embodiment of this application provides a page sliding effect of overstepping rebounding.

As shown in FIG. 8A, starting from a moment t51, the user's finger slides downward on the display 194 by using a focus module X as a start point. After detecting the user operation applied to the focus module X, the electronic device 100 controls each page module to slide. During the moment t51 to a moment t52, each page module slides downward. Compared with that at the moment t51, at the moment t52, a module interval $L_{(X−n−1, X−n)}$ increases and a module interval $L_{(X+n−1, X+n)}$ decreases. During the moment t52 to the moment t53, each page module continues to slide downward. Compared with that at the moment t52, at the moment t53, the module interval $L_{(X−n−1, X−n)}$ decreases and the module interval $L_{(X+n−1, X+n)}$ continues to decrease. During the moment t53 to a moment t54, each page module continues to slide downward. Compared with that at the moment t53, at the moment t54, the module interval $L_{(X−n−1, X−n)}$ increases and the module interval $L_{(X+n−1, X+n)}$ also increases. During the moment t54 to a moment t55, each page module slides upward. Compared with that at the moment t54, at the moment t55, the module interval $L_{(X−n−1, X−n)}$ continues to increase, the module interval $L_{(X+n−1, X+n)}$ also continues to increase, and the module interval $L_{(X+n−1, X+n)}$ is greater than an initial interval between a module (X+n−1) and a module (X+n). During the moment t55 to the moment t56, each page module continues to slide upward. Compared with that at the moment t55, at the moment t56, the edge module (X−2) slides to the top of the display 194, the module interval $L_{(X−n−1, X−n)}$ decreases to an initial interval between a module (X−n) and a module (X−n−1), and the module interval $L_{(X+n−1, X+n)}$ increases to the initial interval between a module (X+n−1) and a module (X+n). After the moment t56, the page module shown in FIG. 8A stops sliding.

Figure 8B:
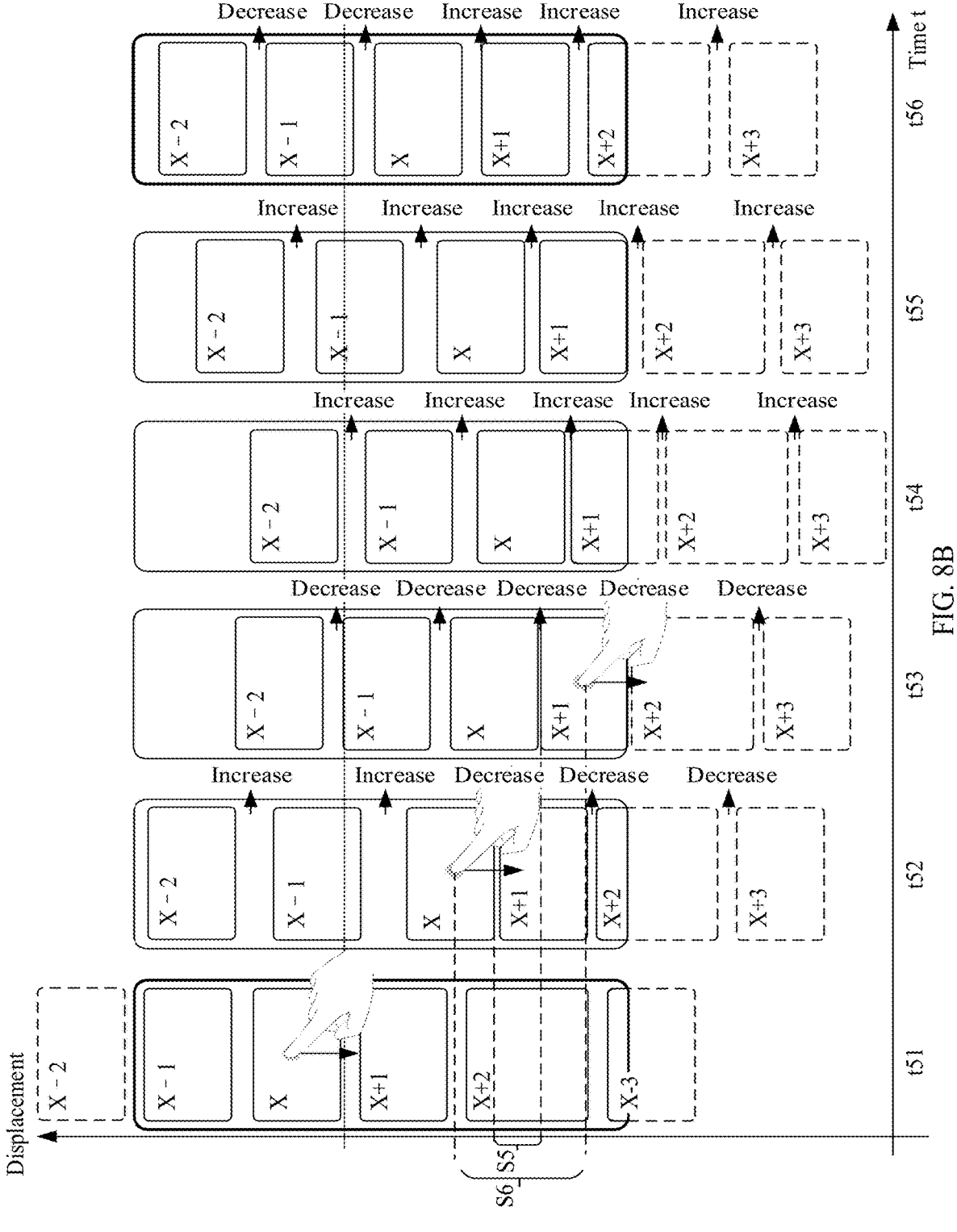

In some embodiments of this application, refer to FIG. 8B. During the moment t51 to the moment t53, the user's finger slides on the display 194 by using the focus module as a start point. The electronic device 100 detects the user operation, and controls the page module to slide downward with the finger. During the moment t51 to the moment t52, the page is not overstepped, and the electronic device 100 controls a sliding distance of the module X to be the same as a sliding distance 1 of the finger along a long side of the electronic device 100. During the moment t52 to the moment t53, the page is overstepped, that is, the distance between the upper edge of the edge module (X−2) and the upper edge of the display interface is greater than the preset value 1, and the electronic device 100 controls a sliding distance S5 of the module X to be shorter than a sliding distance S6 of the finger along the long side of the electronic device 100.

In an implementation, a ratio between S5 and S6 is a ratio 2. The ratio 2 is less than 1, for example, the ratio 2 is equal to 0.4. For example, the preset value 1 is 0 mm or 5 mm. It can be understood that a sliding speed of the module X is the same as that of the finger when the page is not overstepped, and the sliding speed of the module X is lower than the sliding speed of the finger when the page is overstepped.

Refer to FIG. 8B. The finger leaves the display 194 at the moment t53. The electronic device 100 controls, based on a sliding speed before the user's finger leaves, the module X to continue to slide downward from moment t53 to the moment t54, and controls each page module to rebound upward after the moment t54. During the moment t54 to the moment t56, each page module slides upward, the edge module (X−2) slides to the top of the display 194 of the electronic device 100, the module interval $L_{(X−n−1, X−n)}$ first increases and then decreases to the initial interval, and the module interval $L_{(X+n−1, X+n)}$ increases to the initial interval. In an implementation, based on the sliding speed before the user's finger leaves, the electronic device 100 uses a friction model to determine a distance by which the module X slides downward from the moment t53 to the moment t54.

Figure 8C:
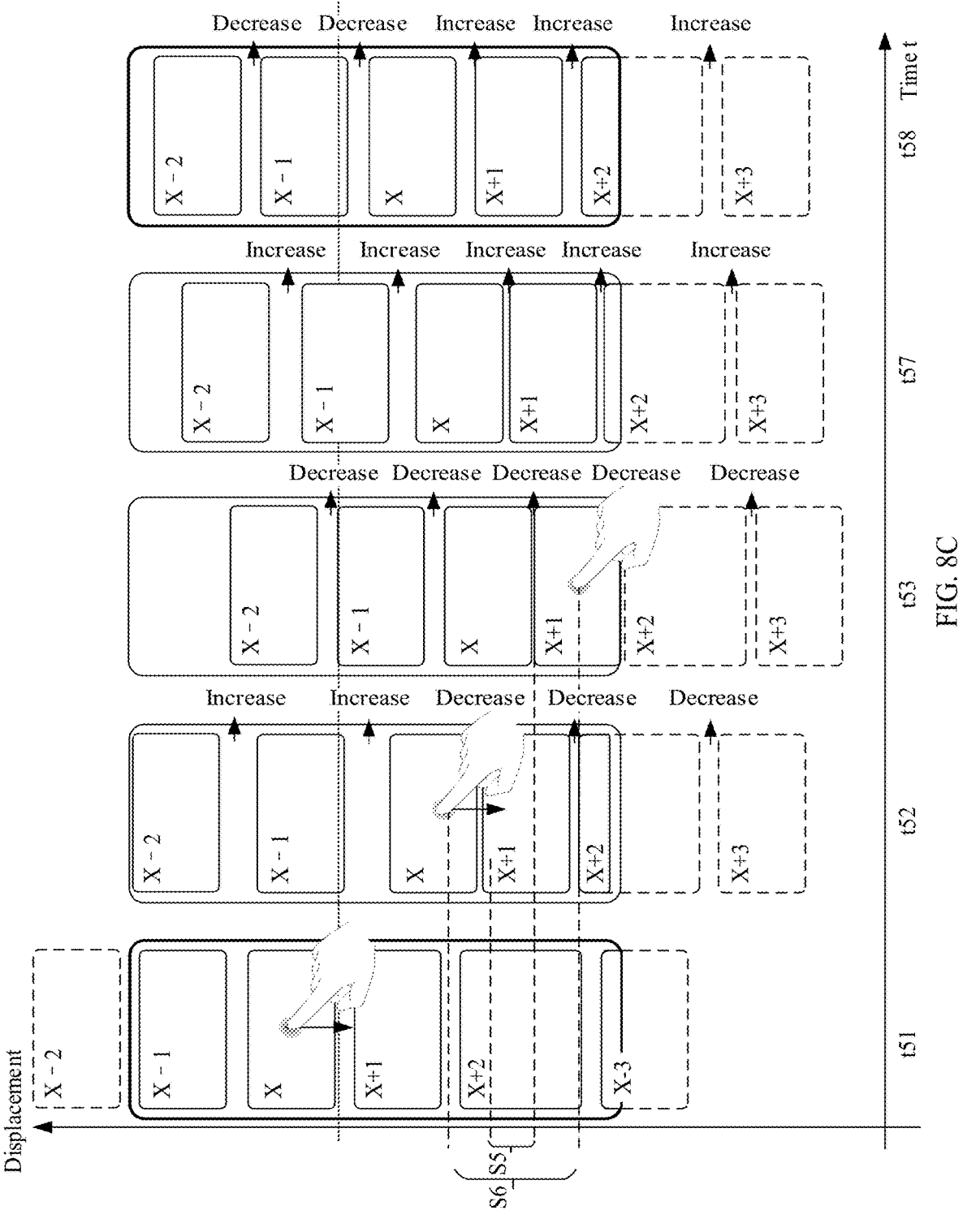

In some embodiments of this application, refer to FIG. 8C. A moment t57 and a moment t58 are further included after the moment t53. After the moment t53, the user's finger leaves the display 194, and the electronic device 100 immediately controls each page module to rebound upward. During the moment t53 and the moment t57, each page module slides upward, the module interval $L_{(X-n-1, \ X-n)}$ increases, and the module interval $L_{(X+n-1, \ X+n)}$ also increases. During the moment t57 to the moment t58, the edge module (X–2) slides to the top of the display 194 of the electronic device 100, the module interval $L_{(X-n-1, \ X-n)}$ decreases to the initial interval, and the module interval $L_{(X+n-1, \ X+n)}$ increases to the initial interval.

In some embodiments of this application, refer to FIG. 8A to FIG. 8C. The second page module may be a module (X+1), the third page module may be the module (X–1), the first interval may be a module interval $L_{(X+1, \ X)}$, and the second interval may be a module interval $L_{(X-1, \ X)}$. Refer to FIG. 8A and FIG. 8B. The first time period may be a time period corresponding to the moment t51 to the moment t53, the second time period may be a time period corresponding to the moment t53 to the moment t56, the third time period may be a time period corresponding to the moment t51 to the moment t52, and the fourth time period may be a time period corresponding to the moment t52 to the moment t53. Refer to FIG. 8B. The second time period and the fourth time period may be a time period corresponding to the moment t53 to the moment t56. Refer to FIG. 8A and FIG. 8B. The first time period may be a time period corresponding to the moment t51 to the moment t53, the first time period may be a time period corresponding to the moment t53 to the moment t58, the third time period may be a time period corresponding to the moment t51 to the moment t52, and the fourth time period may be a time period corresponding to the moment t52 to the moment t53.

In some embodiments of this application, the second interval increases to an initial interval in a ninth time period after the fourth time period. A start moment of the ninth time period is later than or equal to the cutoff moment of the fourth time period, and the start moment of the ninth time period is earlier than the cutoff moment of the second time period.

In some embodiments of this application, the second interval increases in a tenth time period after the fourth time period, and the second interval decreases to an initial interval in an eleventh time period after the tenth time period. A cutoff moment of the tenth time period is equal to a start moment of the eleventh time period, a start moment of the tenth time period is later than or equal to the cutoff moment of the fourth time period, and the start moment of the eleventh time period is earlier than the cutoff moment of the second time period. Refer to FIG. 8A and FIG. 8B. The tenth time period may be a time period corresponding to the moment t53 to the moment t55, and the eleventh time period may be a time period corresponding to the moment t55 to the moment t56. Refer to FIG. 8C. The tenth time period may be a time period corresponding to the moment t53 to the moment t57, and the eleventh time period may be a time period corresponding to the moment t57 to the moment t58.

A multi-task interface is used as an example below to describe a page sliding processing method in a center layout.

As a user uses increasingly more applications, the user often needs to switch between different applications to use different services and functions provided by different applications. The multi-task interface may include page modules corresponding to a plurality of applications that are started by the electronic device 100 to run, and the user can quickly switch between different applications through the page modules in the multi-task interface.

Figure 9A:
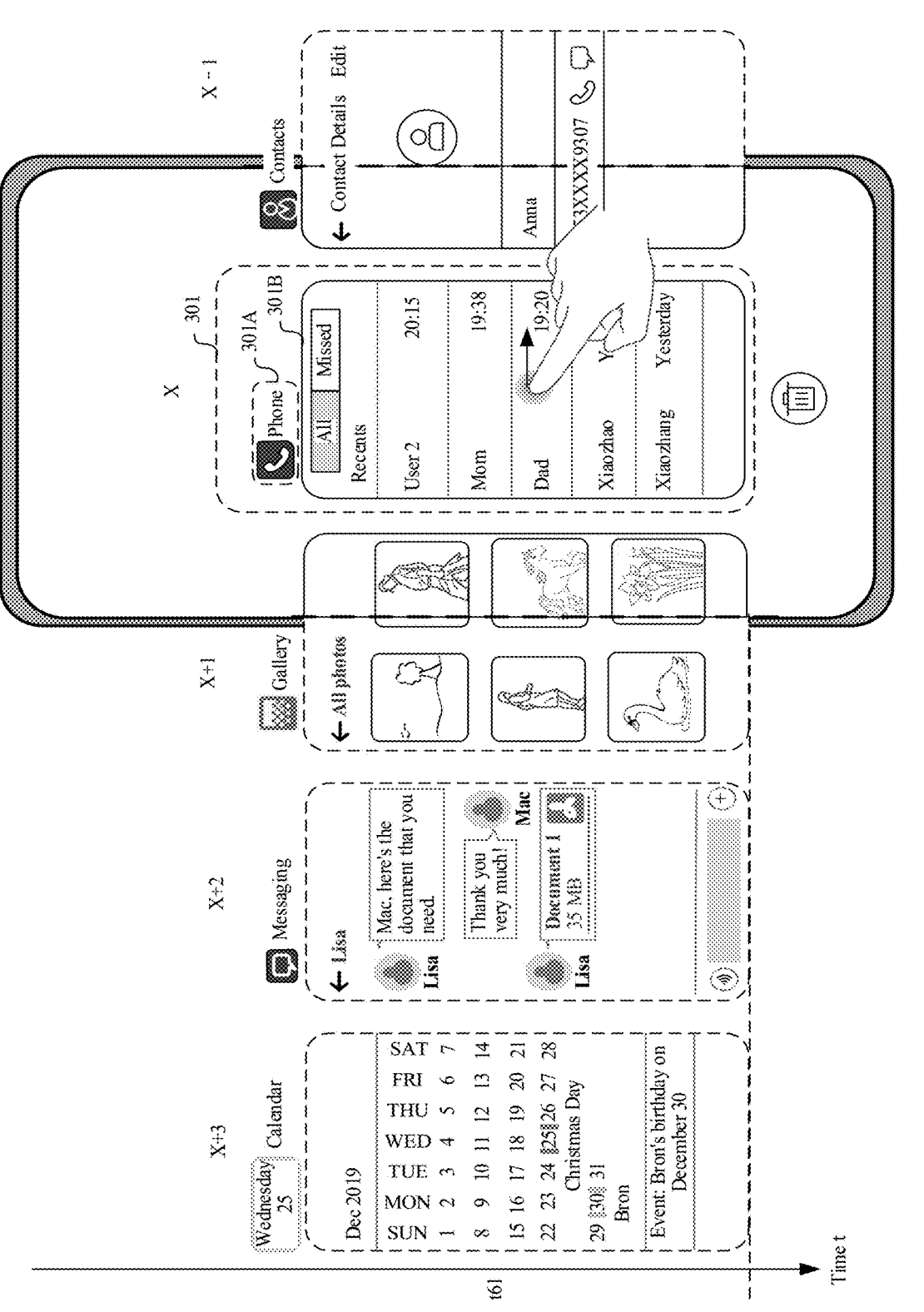
FIG. 9A to FIG. 9D are schematic diagrams of effects of sliding a multi-task page according to an embodiment of this application.

For example, FIG. 9A shows a multi-task page according to an embodiment of this application. As shown in FIG. 9A, applications started by the electronic device 100 include applications such as Calendar, Short Message, Album, Call, and Contacts. The multi-task page of the electronic device 100 includes page modules respectively corresponding to the foregoing plurality of applications. The plurality of page modules may be arranged on a multi-task page based on a plurality of sorting policies, which are not specifically limited herein. In an implementation, the electronic device 100 sorts the plurality of page modules based on most recent foreground runtime of the started applications.

As shown in FIG. 9A, a page module 301 that corresponds to the call application and that is displayed by the electronic device 100 includes a title bar 301A and a card 301B. The title bar 301A may be used to display a name and an icon of the application, and the card 301B may display interface content of the application.

For example, refer to FIG. 9A to FIG. 9D. Another page sliding effect provided in an embodiment of this application is described below.

As shown in FIG. 9A, at a moment t61, a user's finger slides rightward by using the page module 301 as a start point. After detecting the user operation applied to the page module 301, the electronic device 100 slides each page module of the multi-task page rightward. For ease of description, in this embodiment of this application, the page module 301 applied when the user slides the page rightward is referred to as a focus module, and the focus module is numbered X. Then other page modules are numbered by using the focus module as a reference. As shown in FIG. 9A, the page modules of a multi-task page are respectively numbered X–1, X–2, X–3, X, and X+1, from left to right.

As shown in FIG. 9A, during the moment t61 to a moment t62, in the process of sliding the page rightward, a module interval $L_{(X-1, \ X)}$ between the module X and the module (X–1) decreases, and a module interval $L_{(X+n-1, \ X+n)}$ between a module (X+n) and a module (X+n–1) increases. The module interval $L_{(X+n-1, \ X+n)}$ includes an interval $L_{(X, \ X+1)}$ between the module X and the module (X+1), an interval $L_{(X+1, \ X+2)}$ between the module (X+1) and a module (X+2), and an interval $L_{(X+2, \ X+3)}$ between the module (X+2) and a module (X+3), where n is a positive integer.

Figure 9B:
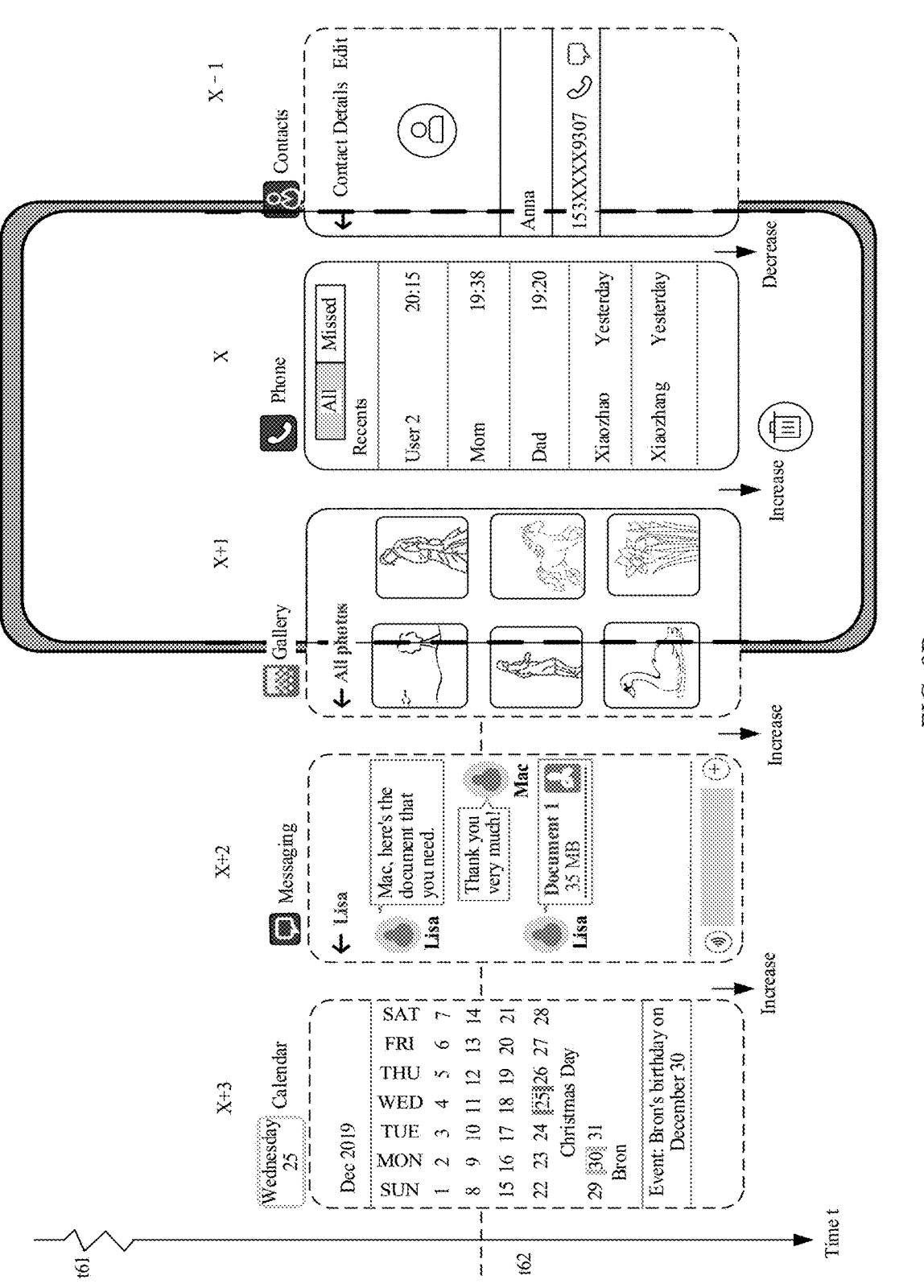
Figure 9C:
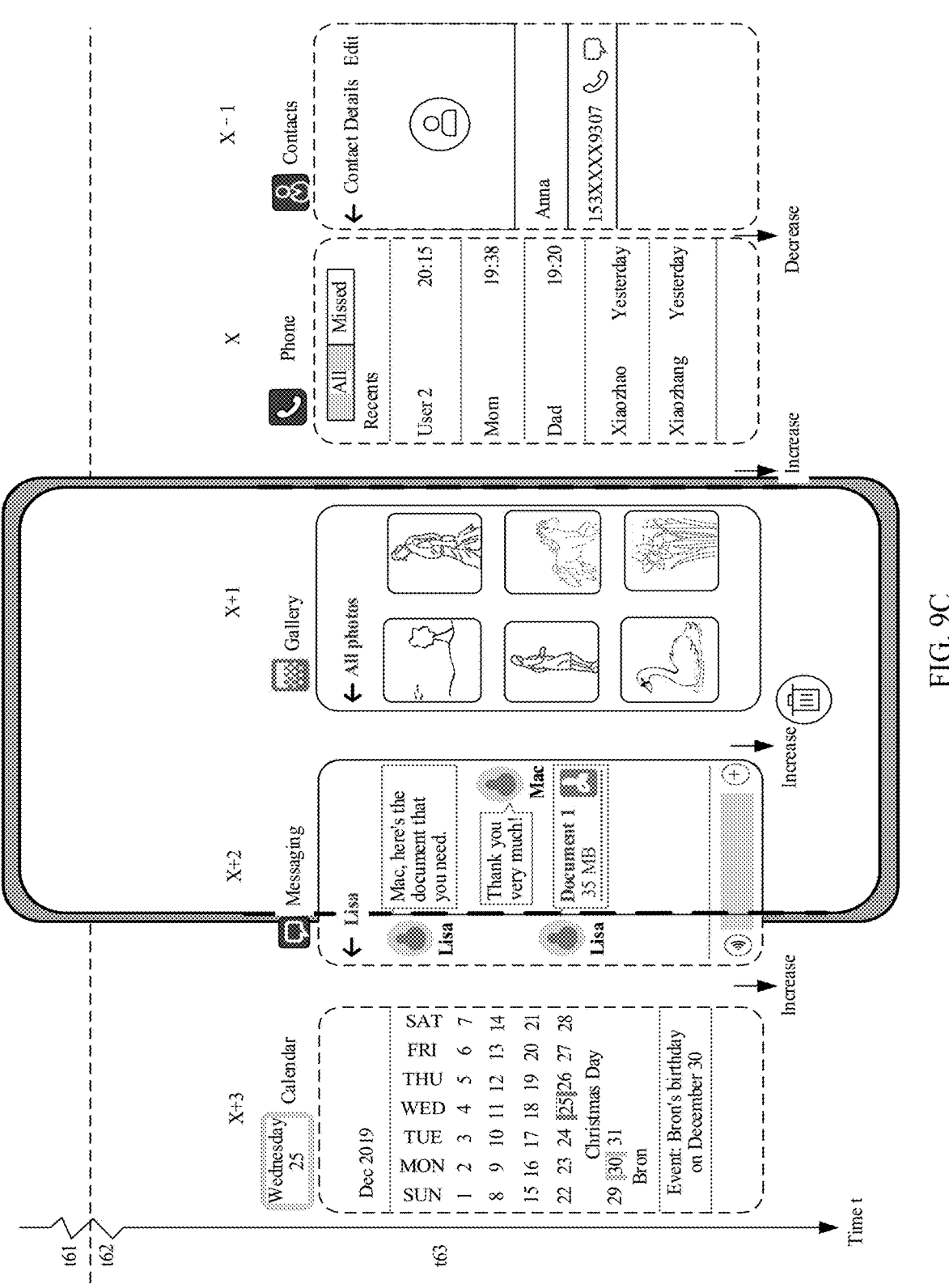
Figure 9D:
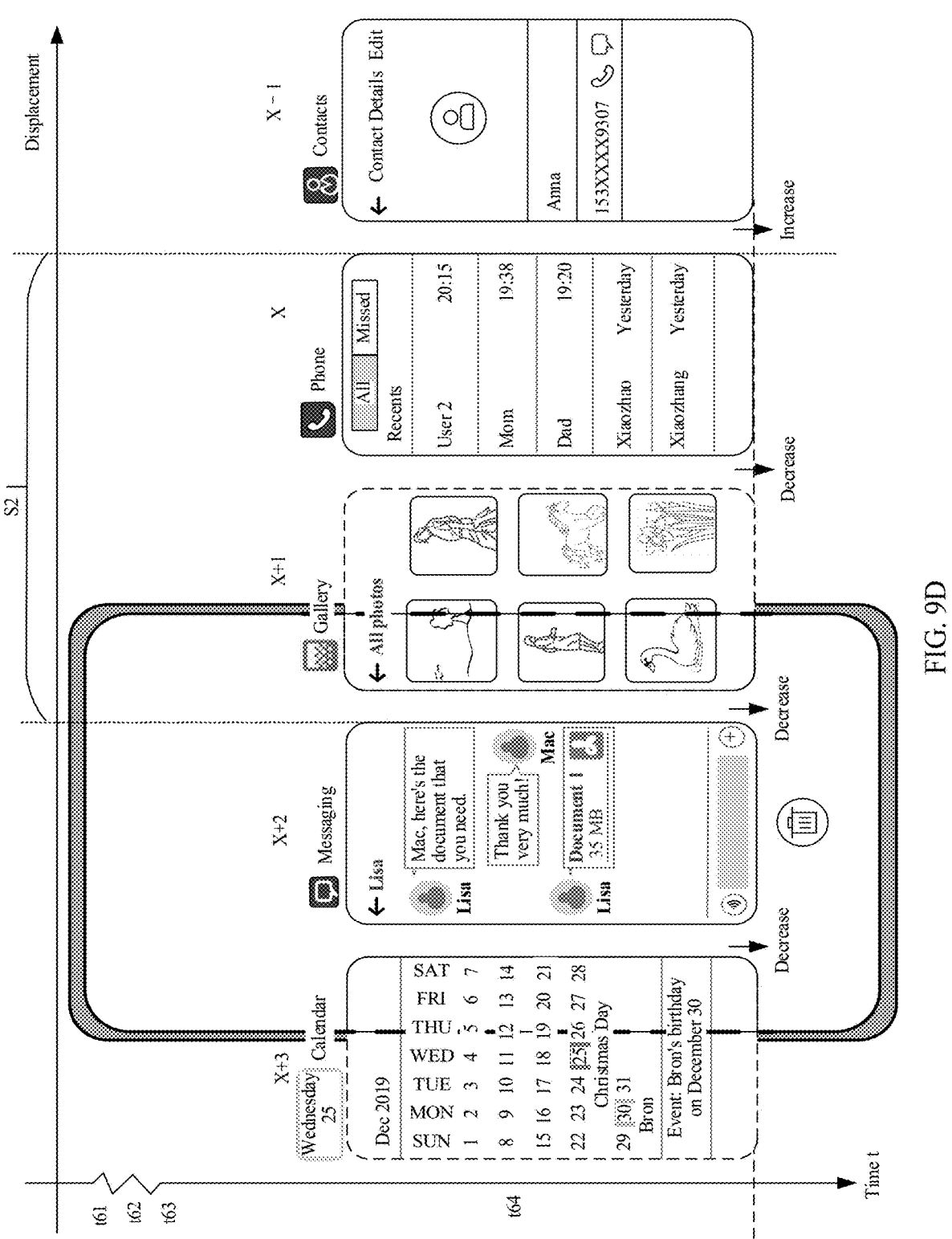

As shown in FIG. 9A and FIG. 9B, during the moment t62 to a moment t63, in the process of sliding the page rightward, the module interval $L_{(X-1, \ X)}$ continues to decrease and the module interval $L_{(X+n-1, \ X+n)}$ continues to increase. As shown in FIG. 9B and FIG. 9C, during the moment t63 to a moment t64, in the process of sliding the page rightward, the module interval $L_{(X-1, \ X)}$ increases to an initial interval between the module X and the module (X–1), and the module interval $L_{(X+n-1, \ X+n)}$ decreases to an initial interval between the module (X+n) and the module (X+n–1).

It can be learned from FIG. 9A to FIG. 9C that, a module interval on a right side of the focus module applied by the user when the user slides the page rightward, (that is, the interval between the module X and the module (X–1)) first decreases from the initial interval and then increases to the initial interval, and a module interval on a left side of the focus module (that is, the interval between the module (X+n) and the module (X+n–1)) first increases from the initial interval and then decreases to the initial interval. Similarly, a module interval on a left side of the focus module applied by the user when the user slides the page leftward first increases from an initial interval and then decreases to the initial interval, and a module interval on a right side of the focus module first decreases from an initial interval and then increases to the initial interval. After a moment t66, each module stops sliding. From the moment t61 to the moment t66, a relative displacement of each module is S2.

In some embodiments of this application, refer to FIG. 9A
and FIG. 9B. The second page module may be the module
(X−1), the third page module may be the module (X+1), the
first interval may be the module interval L$_{(X−1, X)}$, and the
second interval may be the module interval L$_{(X, X+1)}$. The
first time period and the third time period may be a time
period corresponding to the moment t61 to the moment t63,
and the second time period and the fourth time period may
be a time period corresponding to the moment t63 to the
moment t64.

For example, another page sliding effect provided in an
embodiment of this application is described below by using
a multi-task page shown in FIG. 9E as an example.

Figure 9E:
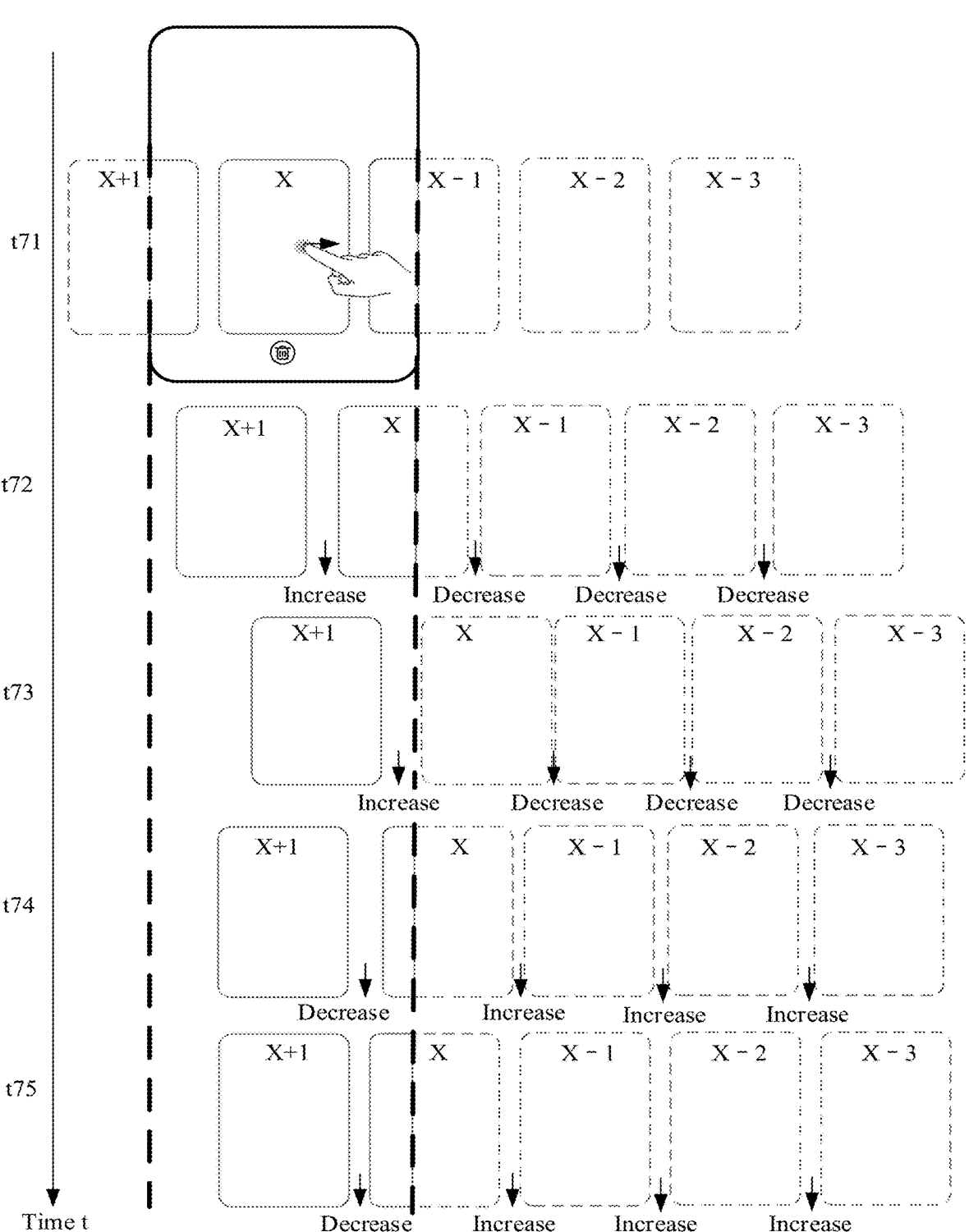
FIG. 9E is a schematic diagram of an effect of sliding a multi-task page according to an embodiment of this application.

As shown in FIG. 9E, a module (X+1) is an edge module
of the page shown in FIG. 9E. One side of the module (X+1)
is connected to a module X, and the other side is connected
to no page module. Refer to FIG. 9E. When a user slides the
page rightward, the module (X+1) is displayed on the
display 194. For this case, this embodiment of this applica-
tion provides another page sliding effect of overstepping
rebounding.

As shown in FIG. 9E, at a moment t71, a module interval
L$_{(X−n−1, X−n)}$ is equal to an initial interval between a module
(X−n) and a module (X−n−1), and a module interval
L$_{(X+1, X)}$ is equal to an initial interval between the module X
and the module (X+1). Starting from a moment t71, a user's
finger slides rightward on the display 194 by using a focus
module X as a start point. After detecting the user operation
applied to the focus module X, the electronic device 100
controls each page module of the multi-task page to slide.
During the moment t71 to a moment t72, each page module
slides rightward. Compared with that at the moment t71, at
the moment t72, the module interval L$_{(X+1, X)}$ increases and
the module interval L$_{(X−n−1, X−n)}$ decreases. During the
moment t72 to a moment t73, each page module continues
to slide rightward. Compared with that at the moment t72, at
the moment t73, the module interval L$_{(X+1, X)}$ continues to
increase and the module interval L$_{(X−n−1, X−n)}$ continues to
decrease. During the moment t73 to a moment t74, each
page module slides leftward. Compared with that at the
moment t73, at the moment t74, the module interval
L$_{(X+1, X)}$ decreases and the module interval L$_{(X−n−1, X−n)}$
increases. At the moment t74, the module (X+1) slides to a
center location of the page. During the moment t74 to a
moment t75, the module (X+1) stops sliding. Compared
with that at the moment t74, at the moment t75, the module
interval L$_{(X+1, X)}$ decreases to the initial interval between the
module X and the module (X+1) and the module interval
L$_{(X−n−1, X−n)}$ increases to the initial interval between the
module (X−n) and the module (X−n−1). After the moment
t75, each page module shown in FIG. 9E stops sliding.

In some embodiments of this application, refer to FIG. 9E.
The second page module may be the module (X−1), the third
page module may be the module (X+1), the first interval
may be a module interval L$_{(X−1, X)}$, and the second interval
may be the module interval L$_{(X, X+1)}$. The first time period
and the third time period may be a time period correspond-
ing to the moment t71 to the moment t73, and the second
time period and the fourth time period may be a time period
corresponding to the moment t73 to the moment t75.

It should be noted that for a page with a center layout, a
page module may be deformed during sliding of the page
module. For example, a width of the page module may be
increased or decreased during sliding of the page module.
For details, refer to the related embodiment of FIG. 7A. For
the page with a center layout, during sliding of the page
module, a change of a module interval may also be related to a size of the page module. For details, refer to the related
embodiment of FIG. 7B. For the page with a center layout,
the page module may perform one or more times of page
rebounding during sliding of the page module. For details,
refer to the related embodiment of FIG. 7C.

Refer to FIG. 5A to FIG. 9E. In the page sliding process-
ing method provided in the embodiments of this application,
a user's finger slides on a page to slide the page. During page
sliding, a rate change mode of each page module may
include one or more of the following rates: a constant speed,
an acceleration, a deceleration, and a parabolic rate, and a
module interval between page modules is dynamically
changed, and a width of the page module may also be
dynamically changed. A module interval in a sliding direc-
tion of the user may first decrease and then restore to an
initial interval, and a module interval in a direction opposite
to the sliding direction of the user may first increase and then
restore to an initial interval. The page sliding processing
method provided in this embodiment of this application
provides a plurality of page sliding effects, thereby increas-
ing interest of page sliding, enhancing an effect of feedback
made by the electronic device 100 for a user, and effectively
improving user experience.

A page sliding system provided in an embodiment of this
application is described below. For example, as shown in
FIG. 10, the sliding system includes a friction model and an
elasticity model.

Figure 10:
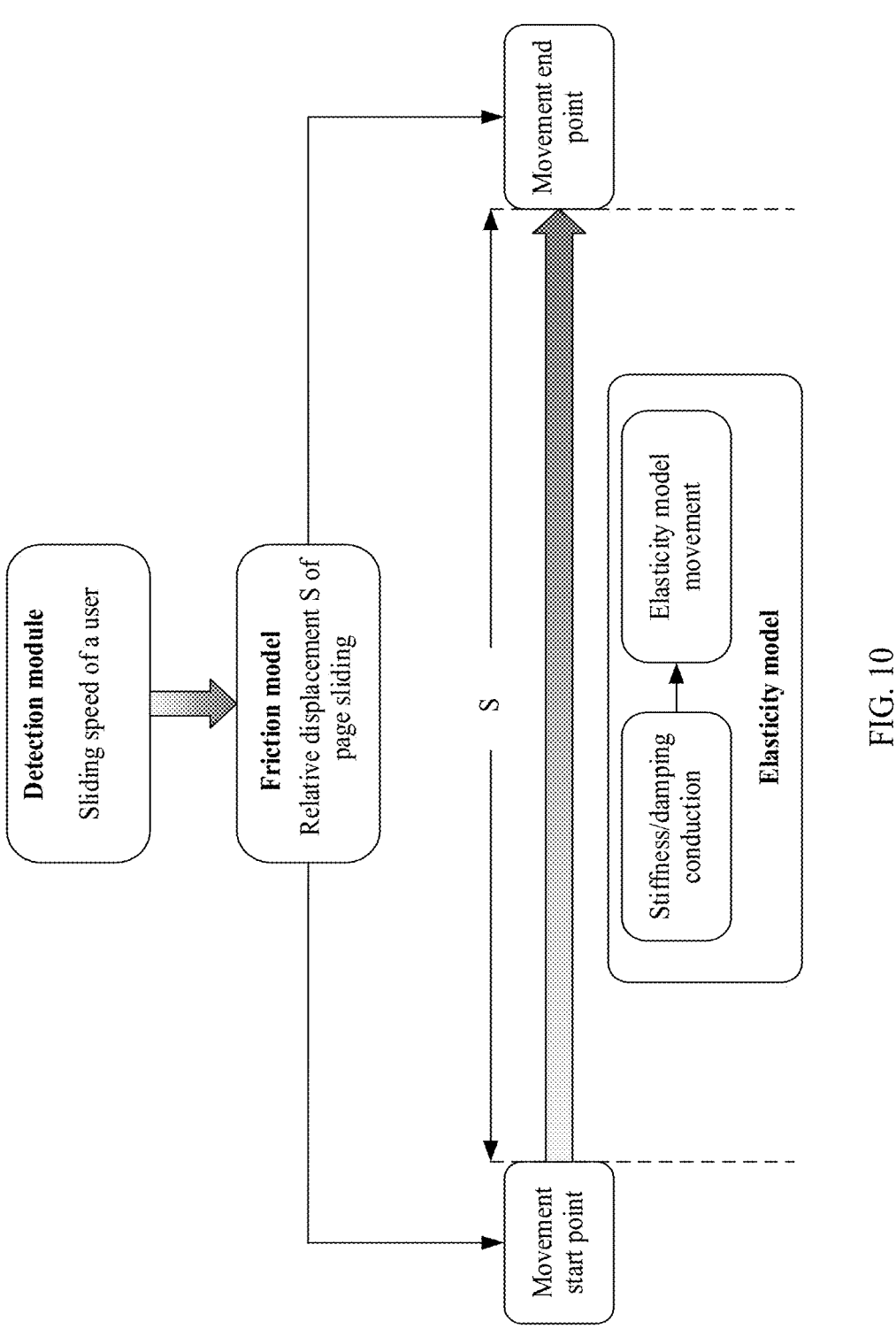
FIG. 10 is a schematic diagram of a page sliding system according to an embodiment of this application.

In some embodiments of this application, as shown in
FIG. 10, the electronic device 100 detects, by a detection
module, a sliding operation of a user applied to a focus
module X, and a sliding speed of the sliding operation. The
electronic device 100 may determine a relative displacement
S of page sliding by using the friction model based on the
sliding speed, to determine a movement start point and a
movement end point of the page. In addition, the electronic
device 100 may determine a spring parameter of each page
module by using a damping conduction algorithm based on
a spring parameter of the module X, to control, based on the
spring parameter of each page module during page sliding in
which a relative displacement is S, each page module to
perform elasticity model movement.

A friction model provided in an embodiment of this
application is described below.

The friction model provided in this embodiment of this
application is a friction model based on an exponential
function, and the following formulas (1) and (2) are func-
tions for a velocity V (velocity), a displacement S, and time
t in the friction model.

$$V(t) = V_0 * e^{-4.2 * f * t} \tag{1}$$

$$S(t) = \left(\frac{V_0}{-4.2 * f}\right) * \left(e^{-4.2 * f * t} - 1\right) \tag{2}$$

where $V_c$, is an initial velocity at which an object moves,
t is time during which an object moves, and f is friction
(friction) received during object movement.

It can be understood that larger friction indicates that an
object easily stops and indicates a shorter movement dis-
tance of the object. On the contrary, smaller friction indi-
cates a longer movement distance of the object. In this
embodiment of this application, the friction may be set by
the electronic device 100 based on a specific scenario, may
be set by default at delivery of the electronic device 100, or
may be set by a user.

Figure 11A:
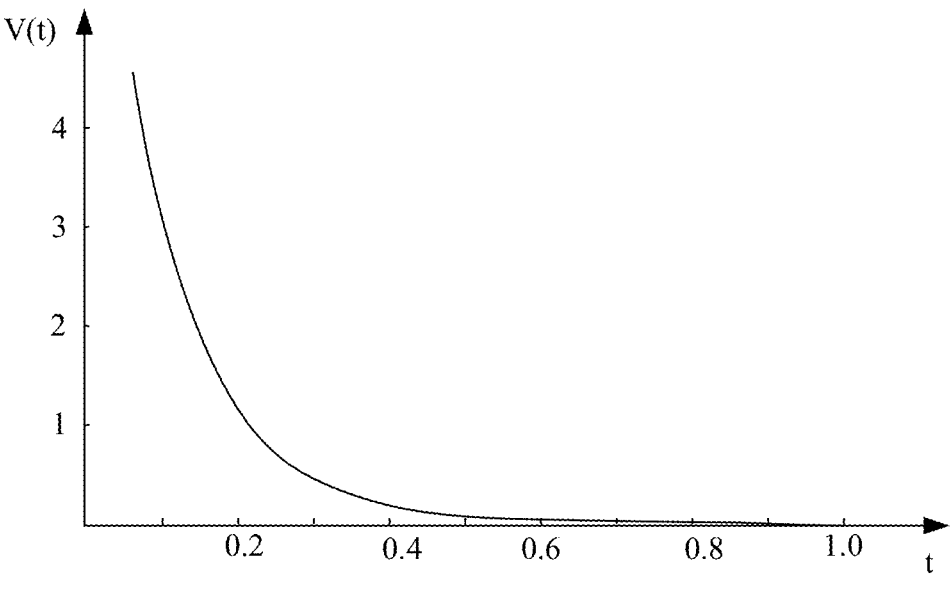
FIG. 11A is a curved graph for a velocity V and time t in a friction model according to an embodiment of this application.
Figure 11B:
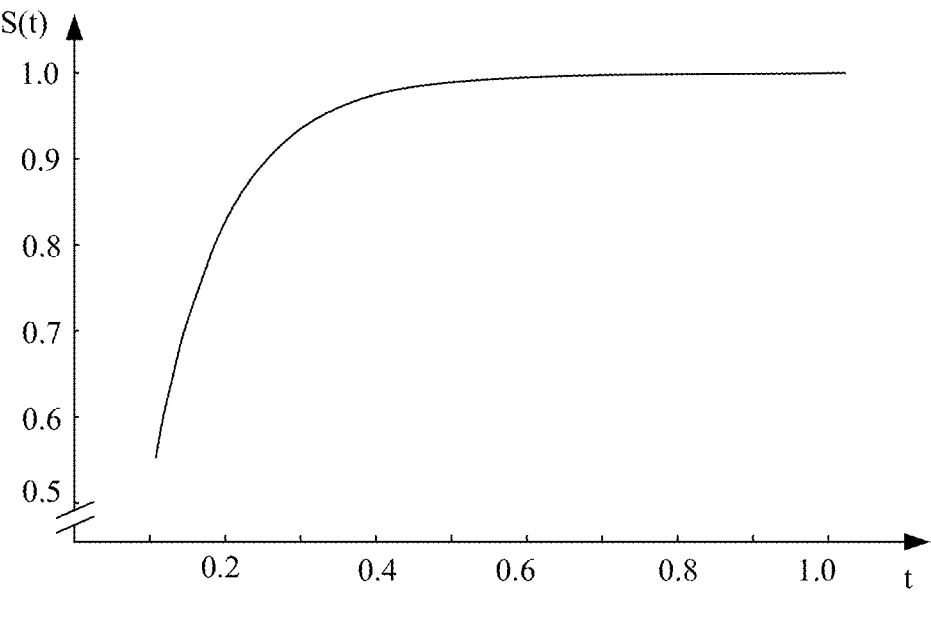
FIG. 11B is a curved graph for a displacement S(t) and time t in a friction model according to an embodiment of this application.

FIG. 11A is a curved graph for a velocity V and time tin a friction model according to an embodiment of this application. FIG. 11B is a curved graph for a displacement S(t) and time t in a friction model according to an embodiment of this application.

In some embodiments of this application, the electronic device 100 may fit a sliding speed of a user on the display 194 by using a velocity detection technology (such as a VelocityTracker algorithm) and set the velocity to $V_0$, and then determine a relative displacement of page sliding by using at least one of the formulas (1) and (2). A unit of the sliding speed may be "pixels per second".

For a page with a non-center layout, how to determine, based on a sliding speed of a user, a relative displacement of page sliding is described below.

In some embodiments of this application, the sliding speed of the user is set to $V_0$. Refer to the formula (1). V(t) tends to zero as t increases. When a speed difference between a moment t81 and a moment (t81-ε1) is less than a preset value λ1, that is. V(t81)-V(t81-ε1)<λ1, the electronic device 100 determines that S(t81) corresponding to the moment t81 in the formula (2) is the relative displacement of page sliding. The preset value ε1 and the preset value λ1 both each are a preset minimum, for example, ε1 is equal to 0.1 and λ1 is equal to 0.01. In some embodiments, the electronic device 100 further determines, by using the friction model, that sliding duration of page sliding is t81.

In some embodiments of this application, refer to the formula (2). S(t) tends to a specific value as t increases. When a displacement difference between the moment t81 and a moment (t81-ε2) is less than a preset value λ2, that is, S(t81)-S(t81-ε)<λ2, the electronic device 100 determines that S(t81) corresponding to the moment t81 is the relative displacement of page sliding. In some embodiments, the electronic device 100 further determines, by using the friction model, that the sliding duration of page sliding is t81.

For a page with a center layout, how to determine a relative displacement of page sliding is described below.

In this embodiment of this application, a page module on the page with a center layout is limited to be at a center location of the page. Therefore, for the page with a center layout, a relative displacement of the page may have one or more fixed displacement values. In some embodiments, the electronic device 100 first determines an intermediate displacement the page with a center layout by using the friction model, and then determines that the relative displacement of the page is a displacement value in the one or more fixed displacement values that has a minimum difference from the intermediate displacement. For how to determine the intermediate displacement of the page with a center layout by using the friction model, refer to the implementation of determining the relative displacement of the page with non-center layout by using the friction model.

For example, refer to FIG. 9A. The electronic device 100 detects a sliding operation of sliding rightward applied to the focus module X, and in response to the sliding operation, the electronic device 100 controls each page module to slide upward. When the page stops sliding, if the module (X+1) is in a center location of the page, a relative displacement of the page is the sum of a width of the module X and the module interval $L_{(X+1, X)}$; if the module (X+2) is in the center location of the page, the relative displacement of the page is the sum of the width of the module X, a width of the module (X+1), the module interval $L_{(X+1, X)}$, and the module interval $L_{(X+1, X+2)}$; and if the module (X+3) is in the center location of the page, the relative displacement of the page is the sum of the width of the module X, the width of the module (X+1), a width of the module (X+2), the module interval $L_{(X, X+1)}$, the module interval $L_{(X+1, X+2)}$, and the module interval $L_{(X+2, X+3)}$. It can be learned from the foregoing that there are only three possible relative displacements for the page shown in FIG. 9A.

An elasticity model provided in an embodiment of this application is described below. Elasticity movement meets damping vibration formulas in the Hook's law that are shown in a formula (3) and a formula (4).

$$f = ma \tag{3}$$

$$-kx - d\frac{dx}{dt} = m\frac{d^2x}{dt^2} \tag{4}$$

where f is force received during vibration, m is mass, a is an acceleration, k is a stiffness (stiffness) coefficient, x is a spring deformation amount, d is a damping coefficient (damping), and t is time.

The stiffness coefficient is an amount elasticity required for a unit deformation amount of a spring. A larger stiffness coefficient k indicates shorter time for the spring to return from a maximum amplitude to an equilibrium location. On the contrary, a smaller stiffness coefficient k indicates longer time for the spring to return from the maximum amplitude to the equilibrium location. In some embodiments, a value range of the stiffness coefficient k may be from 1 to 99, and a recommended value range of the stiffness coefficient k may be from 150 to 400.

The damping coefficient is a quantitative representation of damping force (such as fluid resistance or friction) of the spring during vibration. The damping force enables a spring amplitude to gradually decrease until the spring stops in the equilibrium location. A larger damping coefficient indicates that it is easier for the spring to stop in the equilibrium location. On the contrary, a smaller damping coefficient indicates that it is more difficult for the spring to stop in the equilibrium location. In some embodiments, a value range of the damping coefficient d may be from 1 to 99, and the electronic device 100 may set the damping coefficient based on a specific scenario.

Figure 12A:
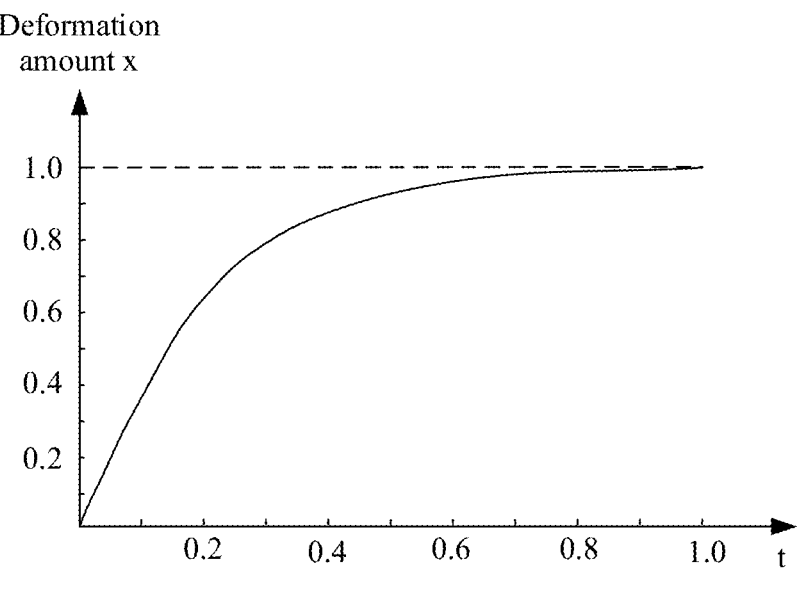
FIG. 12A is a schematic diagram of a critical damping movement state of a spring according to an embodiment of this application.
Figure 12B:
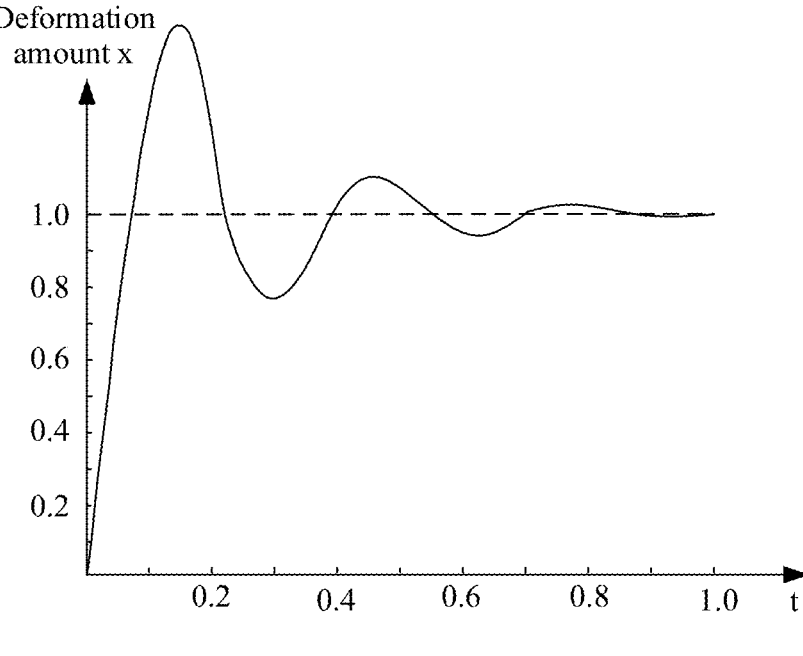
FIG. 12B is a schematic diagram of a light damping movement state of a spring according to an embodiment of this application.
Figure 12C:
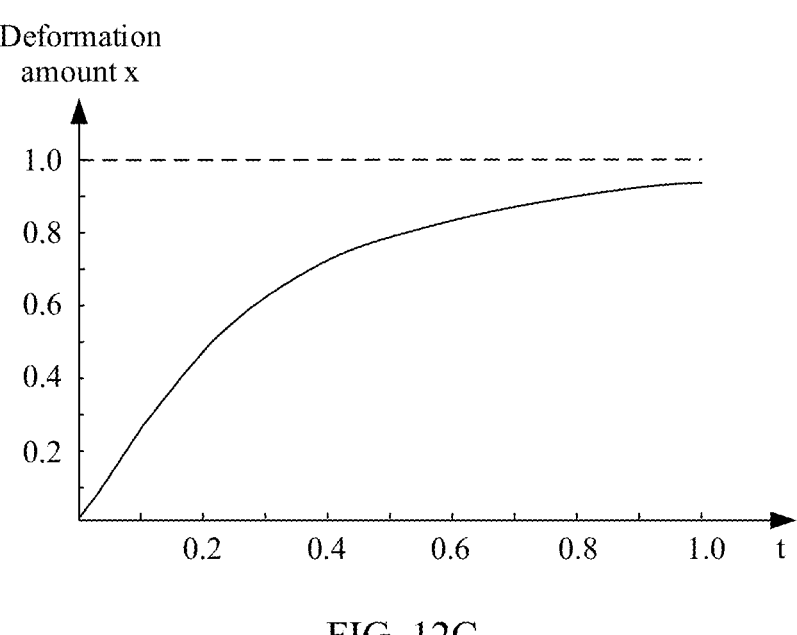
FIG. 12C is a schematic diagram of an over damping movement state of a spring according to an embodiment of this application.

Based on a damping feature of the spring, a movement status of the spring may be divided into three states: a critical damping state, a light damping state, and an over damping state. For example, FIG. 12A to FIG. 12C are curved graphs for a spring deformation amount x and time t in the three states according to an embodiment of this application. Refer to FIG. 12A. In the critical damping state, the spring stops moving and no longer vibrates after returning to the equilibrium location with shortest time at a most stable speed. Refer to FIG. 12B. In the light damping state, the spring slowly gradually decreases an amplitude through a plurality of times of vibration and finally returns to the equilibrium location. Refer to FIG. 12C. In the over damping state, the spring has little vibration and the amplitude gradually decreases, and the spring reaches the equilibrium location. In some embodiments, when $d^2=4*m*k$, the spring is in the critical damping state; and when $d^2<4*m*k$, the spring is in the light damping state. In other words, when $d^2>4*m*k$, the spring is in the over damping state.

In some embodiments of this application, the electronic device 100 may determine a damping coefficient and a stiffness coefficient of the focus module X, and determine, by using a damping conduction algorithm based on the damping coefficient and the stiffness coefficient of the focus module, a damping coefficient and a stiffness coefficient that correspond to another page module. The damping coefficient and the stiffness coefficient of the focus module may be set by default by the electronic device 100, may be set by a user, or may be determined by the electronic device 100 based on a specific scenario. For example, refer to FIG. 5C. The electronic device 100 detects a sliding operation of a user, determines, based on the sliding operation, a focus module X applied by the user, and determines modules (X+c) (such as a module (X+1), a module (X−1), a module (X+2), and a module (X−2)) on two sides of the focus module X in a moment arrangement sequence by using the focus module X as a reference, where c is an integer unequal to 0. A stiffness coefficient of the module X is denoted as $k_X$, a stiffness coefficient of the module (X+c) is denoted as $k_{X+c}$, a damping coefficient of the module X is denoted as $d_X$, and a damping coefficient of the module (X+c) is denoted as $d_{X+c}$.

In some embodiments, refer to a formula (5) and a formula (6). A relationship between the stiffness coefficient $k_X$ and the stiffness coefficient $k_{X+c}$, and a relationship between the damping coefficient $d_X$ and a damping coefficient $d_{X+c}$ may be expressed as follows:

$$k_{X+c}=k_X*(|c|+1)^{-0.18*g} \tag{5}$$

$$d_{X+c}=d_X*(|c|+1)^{-0.18*g} \tag{6}$$

where g is a conduction coefficient.

In some embodiments, refer to a formula (7) and a formula (8). The relationship between the stiffness coefficient $k_X$ and the stiffness coefficient $k_{X+c}$, and the relationship between the damping coefficient $d_X$ and the damping coefficient $d_{X+c}$ may be expressed as follows:

$$k_{X+c}=k_X-|c|*g \tag{7}$$

$$d_{X+c}=d_X-|c|*g \tag{8}$$

In some embodiments, a ratio of the damping coefficient to the stiffness coefficient of module X is denoted as $p_X$ and a ratio of the damping coefficient to the stiffness coefficient of module (X+c) is denoted as $p_{X+c}$. Refer to a damping conduction algorithm shown in a formula (9). A relationship between the parameter $p_X$ and the parameter $p_{X+c}$ may be expressed as follows:

$$p_{X+c}=p_X*(|c|+1)^{-0.18*g} \tag{9}$$

For example, a value of g is 0.9, a value of $k_X$ is 30, and a value of $d_X$ is 228.

It can be learned from the damping conduction algorithm shown in any of the formula (5) to formula (9), a larger conduction coefficient g indicates a larger difference between spring features corresponding to adjacent page modules, and a larger difference between elasticity movement of the adjacent page modules. On the contrary, a smaller conduction coefficient g indicates a smaller difference between spring features corresponding to adjacent page modules, and a smaller difference between elasticity movement of the adjacent page modules. When the conduction coefficient g is 0, damping coefficients of the page modules are equal, stiffness coefficients of the page modules are equal, and spring features corresponding to adjacent page modules are the same.

Figure 13:
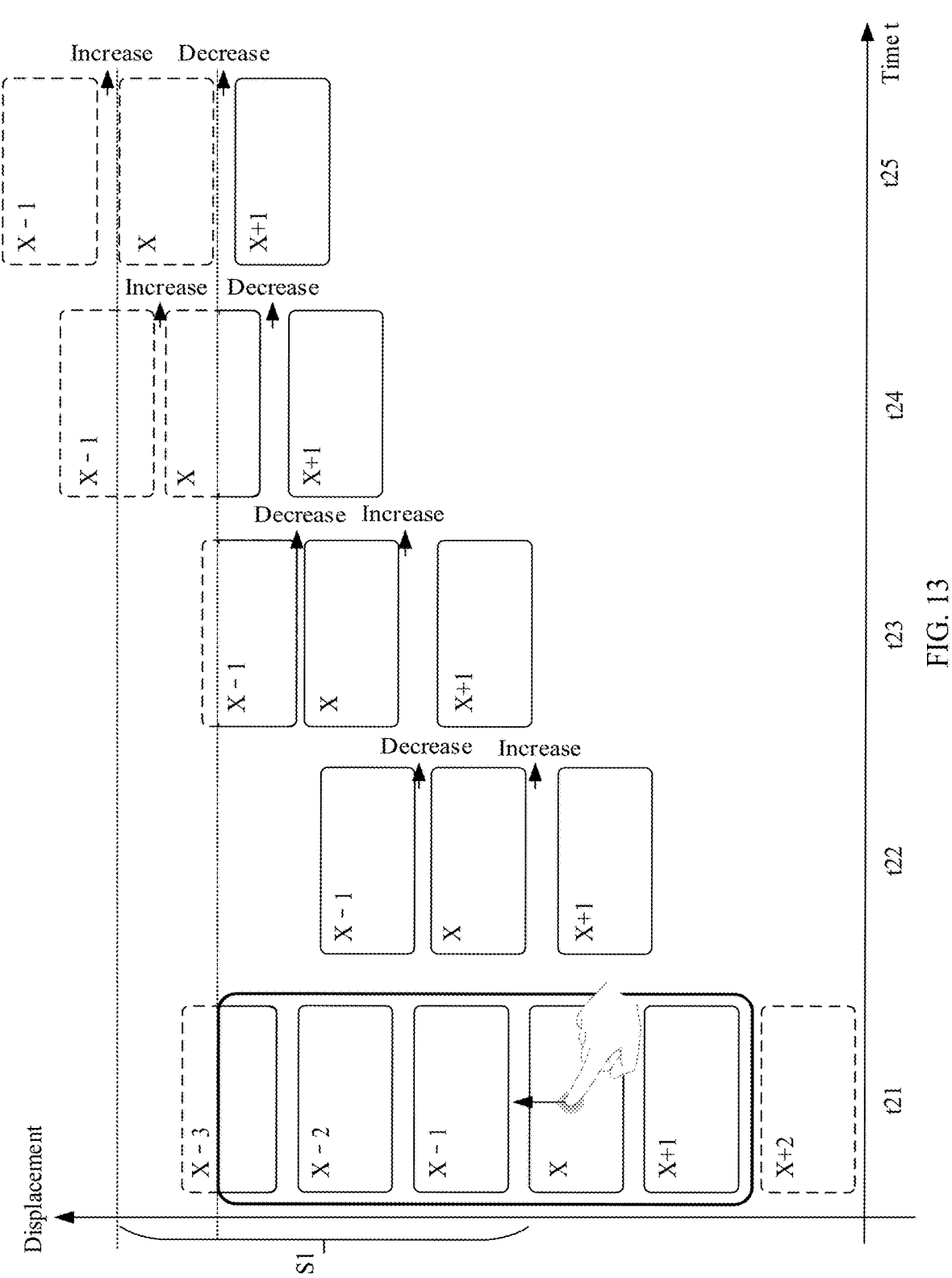
FIG. 13 is a schematic diagram of a page sliding effect according to an embodiment of this application.

For example, FIG. 13 is a schematic diagram of another page sliding effect according to an embodiment of this application. A page shown in FIG. 13 has a smaller conduction coefficient g than the page shown in FIG. 5A. As shown in FIG. 13, a difference between elasticity of two adjacent page modules is smaller in FIG. 13 than that in FIG. 5A, resulting in a relatively small change trend of a module interval between the two adjacent page modules. For example, compared with that in FIG. 5A, in FIG. 13, at the moment t22, the moment t23, and the moment t24, the module interval $L_{(X-1,\ X)}$ is larger and the module interval $L_{(X+1,\ X)}$ is smaller.

In addition, it can be learned from the formula (5) to formula (9) that when g is greater than 0, the focus module X has a maximum damping coefficient and stiffness coefficient, and a module farther from the focus module X has a smaller damping coefficient and stiffness coefficient. When a page module has a smaller damping coefficient and stiffness coefficient, it is less easy for elasticity movement of the page module to return to the equilibrium location, that is, the page module has longer sliding time.

Figure 14A:
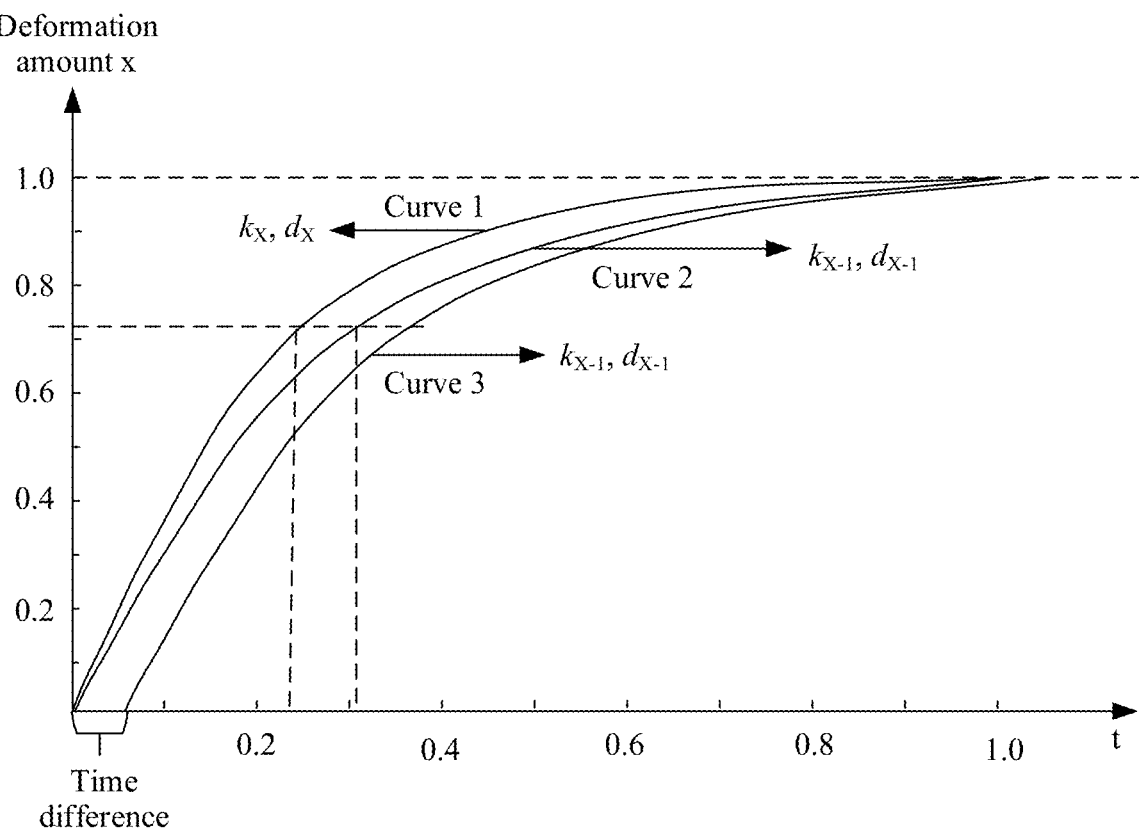
FIG. 14A is a curved graph for movement of a page module according to an embodiment of this application.

For example, a curve 1 shown in FIG. 14A is a movement curve graph of module X, and the curve 2 is a movement curve graph of the module (X−1), where a conduction coefficient of the page module meets g>0. It can be learned from FIG. 14A that in a case of a same displacement (that is, the deformation amount x), a sliding moment 1 corresponding to the module X is later than a sliding moment 2 corresponding to the module (X−1).

Refer to FIG. 5D. There may be a time difference Δt between sliding start moments of adjacent page modules. For example, a curve 3 shown in FIG. 14A is another movement curve graph of the module (X−1), and a sliding start moment that is of the module (X−1) and that corresponds to the curve 3 is later than that of the module X by Δt. It can be learned from FIG. 14A that in a case of a same displacement (that is, the deformation amount x), a sliding moment 3 corresponding to the module (X−1) in the curve 3 is later than the sliding moment 1 corresponding to the module X, and a difference between the moment 3 and the moment 1 is greater than the time difference Δt.

Figure 14B:
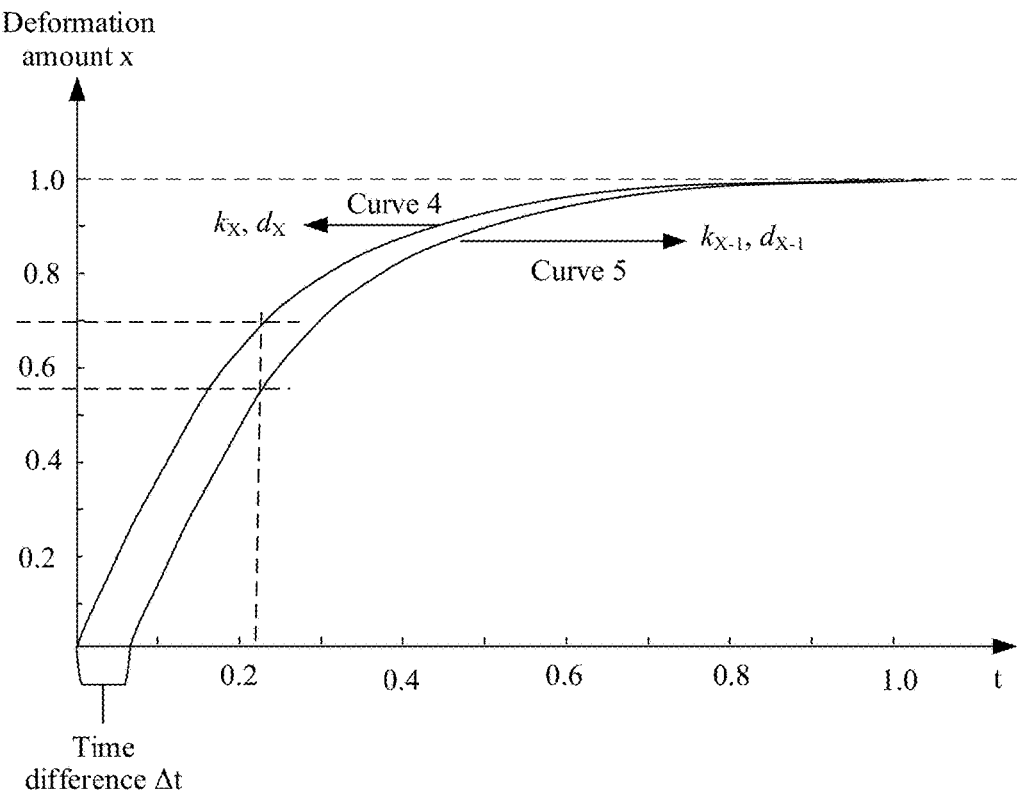
FIG. 14B is another curved graph for movement of a page module according to an embodiment of this application.

For example, a curve 4 shown in FIG. 14B is a movement curve graph of the module X, and a curve 5 is a movement curve graph of the module (X−1), where a conduction coefficient of the page module meets g=0, and a sliding start moment of the module (X−1) is later than that of the module X by Δt. It can be learned from FIG. 14B that in a case of a same sliding moment, a displacement (that is, the deformation amount x) corresponding to the module X in the curve 4 is larger than a displacement corresponding to the module (X−1).

It can be learned from FIG. 14A and FIG. 14B that, the displacement of the module (X−1) and that of the module X first increase and then decrease, and total relative displacements (that is, maximum deformation amounts x shown in FIG. 14A and FIG. 14B) are equal. Therefore, if the module (X−1) is in a sliding direction of a user, as the time t increases, the module interval $L_{(X-1,\ X)}$ between the module (X−1) and the module X may decrease and then increase. If the module (X−1) is in a direction opposite to the sliding direction of the user, as the time t increases, the module interval $L_{(X-1,\ X)}$ between the module (X−1) and the module X may increase and then decrease.

FIG. 15A to FIG. 15D are schematic diagrams of sliding time of page modules when g and Δt have different values.

Figure 15A:
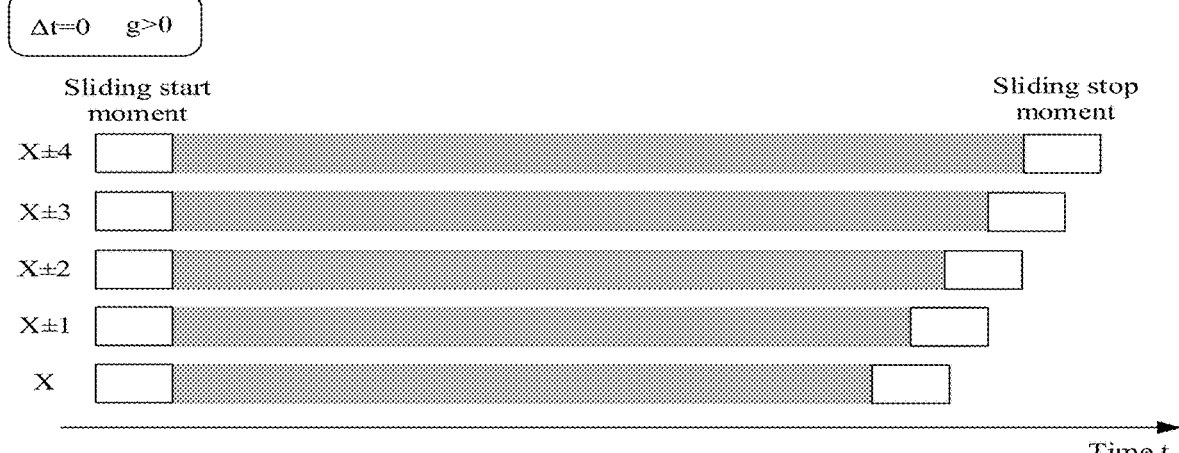
FIG. 15A to FIG. 15D are schematic diagrams of sliding time of a page module according to an embodiment of this application.
Figure 15B:
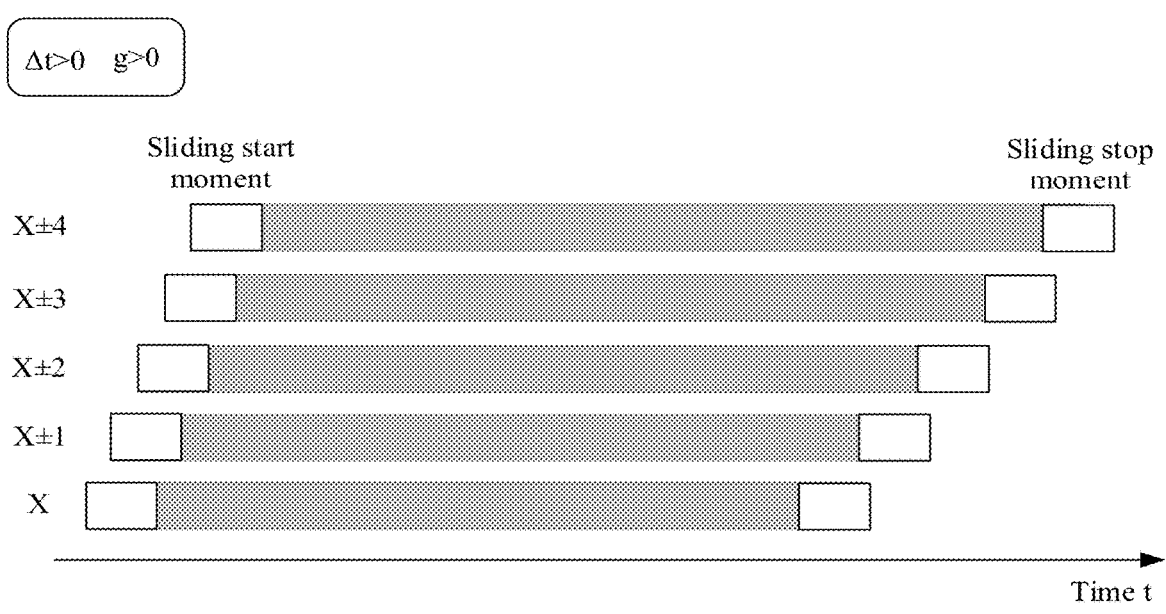
Figure 15C:
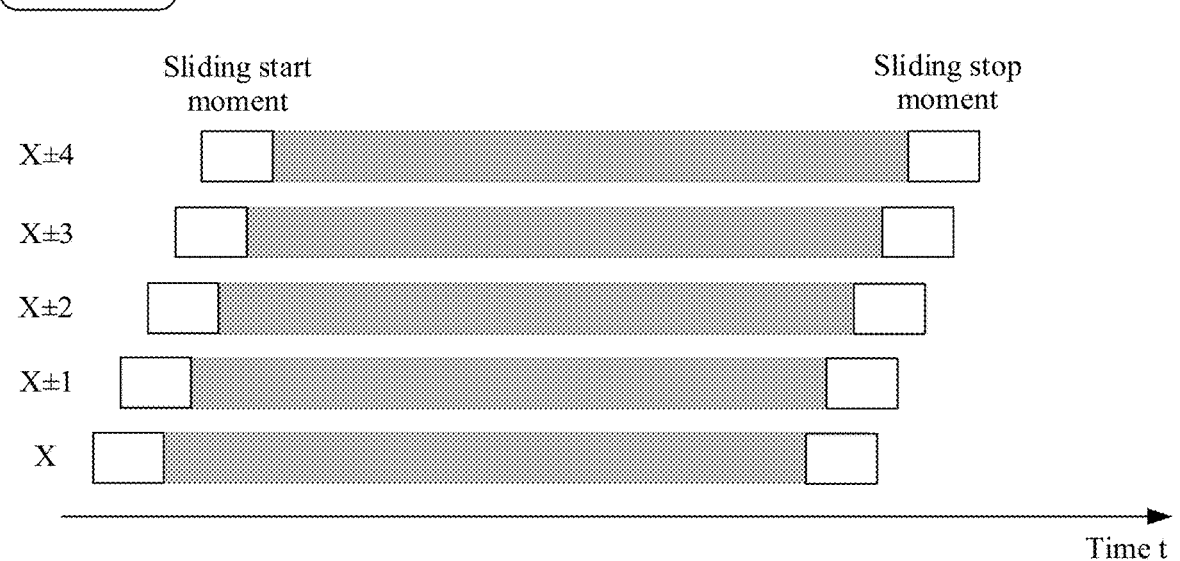
Figure 15D:
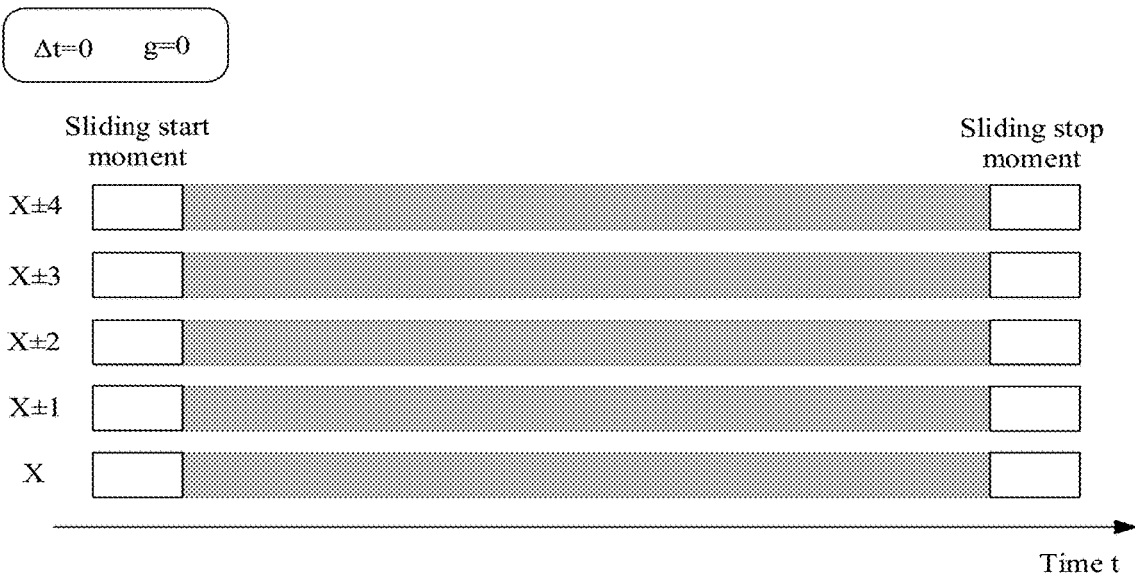

As shown in FIG. 15A, when Δt=0, there is no time difference between sliding start moments of adjacent page modules, and the page modules move at the same time. When g>0, a module farther from the focus module X has longer sliding duration. As shown in FIG. 15B, when Δt>0 and g>0, compared with that in FIG. 15A, a module farther from the focus module X has a later sliding start moment and longer sliding duration, and therefore the module farther from the focus module X has later sliding stop time. As shown in FIG. 15C, when Δt>0 and g=0, the page modules has same sliding duration, and a time difference between sliding start moments of adjacent page modules is equal to a time difference between the sliding stop moments of the adjacent page modules. As shown in FIG. 15D, when Δt=O and g=0, the page modules has same sliding duration, and sliding start moments of adjacent page modules are the same, that is, movement trends of the page module are the same, and module intervals between the page modules remain unchanged.

An animation implementation principle of page sliding provided in an embodiment of this application is described below.

Figure 16:
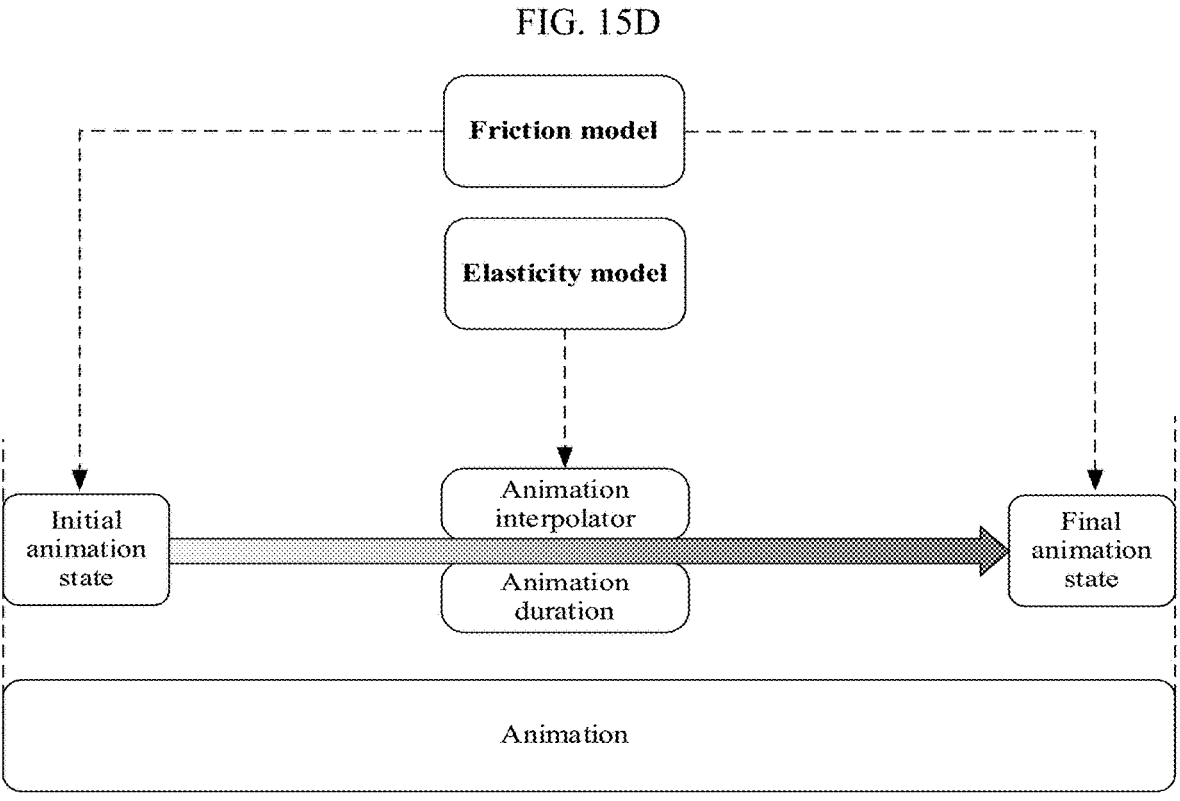
FIG. 16 is a diagram of an animation implementation principle according to an embodiment of this application.

For example, FIG. 16 is a diagram of an animation implementation principle according to an embodiment of this application. As shown in FIG. 16, elements for implementing an animation include an initial state of the animation, a final state of the animation, animation duration, and an interpolator of the animation. The interpolator is used to set change logic for transition of an animation property value from the initial state to the final state, to control an animation change rate, so that an animation effect can be changed at one or more of the following rates: a constant speed, an acceleration, a deceleration, and a parabolic rate.

In some embodiments of this application, the electronic device 100 may determine the animation duration, the initial state of the animation, and the final state of the animation based on a friction model, and set the change logic for the animation property value through a system interpolator or a customized interpolator (such as an elasticity interpolator or a friction interpolator). When the animation is running, if the electronic device 100 determines, based on the change logic, that the animation property value changes, the electronic device 100 draws a frame image based on the animation property value, and refreshes a display page. FIG. 5A to FIG. 9E show some animation effects of page sliding provided in the embodiments of this application.

In some embodiments of this application, when determining, based on the change logic of the interpolator, that the animation property value changes, the electronic device 100 invokes, based on the animation property value, an invalidate( ) function to refresh a view, that is, invoking an onDraw( ) function to redraw a view and display the view.

In some embodiments of this application, the electronic device 100 customizes an elasticity interpolator. For example, function code of the elasticity interpolator may be expressed as one of the following: "SpringInterpolator(float stiffness, float damping)", "SpringInterpolator(float stiffness, float damping, float endPos)", "SpringInterpolator (float stiffness, float damping, float endPos, float velocity)", and "SpringInterpolator(float stiffness, float damping, float endPos, float velocity, float valueThreshold)". In an implementation, parameters in a function of the elasticity interpolator include at least a stiffness coefficient and a damping coefficient.

The parameter endPos represents a relative displacement, that is, a difference between an initial location and a rest location of a spring. In this embodiment of this application, endPos can represent a relative displacement of page sliding.

The parameter valueThreshold represents a threshold for determining that the animation stops. When a displacement (or another property) difference between two adjacent frames is less than the threshold, the animation stops running. When the threshold is larger, the animation is more prone to stop, and running time is shorter. On the contrary, when the threshold is smaller, the running time of the animation is longer. A value of the threshold may be set based on a specific animation property. In some embodiments, default of the parameter FloatValueHold of the elasticity interpolator is denoted as 1/1000, and the value of the threshold is 1 in another construction method. In some embodiments, when the threshold is customized, a suggested value shown in Table 1 may be used based on an animation property.

TABLE 1

| Animation property | valueThreshold |
|---|---|
| ROTATION/ROTATION_X/ROTATION_Y | 1/10 |
| ALPHA | 1/256 |
| SCALE_X/SCALE_Y | 1/500 |
| TRANSLATION_Y/TRANSLATION_X | 1 |

In addition, the threshold may be directly the following constants provided by a DynamicAnimation class: MIN_VISIBLE_CHANGE_PIXELS, MIN_VISI-BLE_CHANGE_ROTATION_DEGREES, MIN_VISI-BLE_CHANGE_ALPHA, and MIN_VISIBLE_CHANGE_SCALE.

For example, specific code of an animation class of the customized elasticity interpolator may be expressed as follows:

"PhysicalInterpolatorBase interpolator=new SpringInterpolator(400F, 40F, 200F, 2600F, 1F);

ObjectAnimator animator=ObjectAnimator.ofFloat(listView, "translationY", 0, 346);

animator.setDuration(interpolator.getDuration( ); //obtaining the animation duration animator.setInterpolator(interpolator); //setting the customized interpolator for the animation class animator.start( ); //running the animation".

In some embodiments of this application, the electronic device 100 customizes a friction interpolator. For example, function code of the friction interpolator may be expressed as "FlingInterpolator(float initVelocity,float friction)", where initVelocity represents an initial speed.

For example, specific code of an animation class using the friction interpolator may be expressed as follows:

"PhysicalInterpolatorBase interpolator=new FlingInterpolator(600F, 0.5F);

ObjectAnimator animator=ObjectAnimator.ofFloat(listView, "translationY", 0, interpolator.getEndOffset( );

animator.setDuration(interpolator.getDuration( ); //obtaining the animation duration animator.setInterpolator(interpolator); //setting the customized interpolator for the animation class animator.start( ); "//running the animation".

In some embodiments of this application, the electronic device 100 may set the animation duration and a start location by itself, or may invoke an engine model to obtain the animation duration and an end location, and then set the animation duration and the end location for the animation class.

For example, code for invoking the engine model by the electronic device 100 to obtain the animation duration may be expressed as "com.huawei.dynamicanimation.interpolator.
PhysicalInterpolatorBase#getDuration"

For example, code for invoking the engine model to obtain the end location of the spring may be expressed as "com.huawei.dynamicanimation.interpolator.
PhysicalInterpolatorBase#getEndOffset".

For example, code for setting the parameter valueThreshold may be expressed as "com.huawei.dynamicanimation.interpolator. PhysicalInterpolatorBase#setValueThreshold".

In some embodiments of this application, code of an animation class using an elastic engine may be expressed as one of the following code: "HWSpringAnimation(K object, FloatPropertyCompat<K>property, float stiffness, float damping, float startValue, float endValue, float velocity)", and "HWSpringAnimation(K object, FloatPropertyCompat<K> property, float stiffness, float damping, float endValue, float velocity)".

The parameter "object" represents an animation object, and "Property" represents a property object to which the animation class or the interpolator is applied. Refer to Table 1. The parameter may be used to indirectly set valueThreshold. The parameter is optional in an interpolator version, and the parameter may not be set when valueThreshold is set in another manner, that is, a construction method without the property parameter is used directly. The parameter is a mandatory parameter in an animation class version. The DynamicAnimation class provides the following constants that can be used directly: "TRANSLATION_X, TRANSLATION_Y, TRANSLATION_Z, SCALE_X, SCALE_Y, ROTATION, ROTATION_X, ROTATION_Y, X, Y, Z, ALPHA, SCROLL_X, and SCROLL_Y". The electronic device 100 may customize a ViewProperty interface.

For example, specific code of an animation class using a spring engine may be expressed as follows:

"HWSpringAnimation animation=HWSpringAnimation (listView, DynamicAnimation.TRANSLATION_Y, 400F, 40F, 0, 1000F);

animation.start( )"

In some embodiments of this application, code of an animation class using a friction engine may be expressed as follows: "HWFlingAnimation (K object, FloatPropertyCompat<K> property, float initVelocity, float friction)".

For example, specific code of an animation class using the friction may be expressed as follows:

"HWFlingAnimation animation=HWFlingAnimation (listView,

DynamicAnimation.TRANSLATION_Y, 2000F, 0.5F);

animation.start( )".

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DIGITAL VERSATILE DISC (DVD)), a semiconductor medium (for example, a solid-state drive), or the like.

A person of ordinary skill in the art may understand that all or some of the procedures in the methods in the foregoing embodiments may be implemented by a computer program instructing related hardware. The program may be stored in the computer-readable storage medium. When the program is executed, the procedures in the methods in the foregoing embodiments may be included. The foregoing storage medium includes any medium that can store program code, such as a read-only memory (ROM), a random-access memory (RAM), a magnetic disk, or an optical disc.

The invention claimed is:

1. A page sliding processing method, comprising:

displaying a first page module, a second page module, and a third page module that are of a first page, wherein the second page module, the first page module, and the third page module are sequentially arranged on the first page;

receiving a sliding operation on the first page module in a first direction from the first page module to the second page module; and sliding the first page module, the second page module, and the third page module in the first direction in response to the sliding operation, wherein a first interval between the first page module and the second page module decreases while a second interval between the first page module and the third page module increases, wherein the first interval between the first page module and the second page module increases while the second interval between the first page module and the third page module decreases, wherein before the first page module, the second page module, and the third page module slide in the first direction, the first interval is equal to a first value and the second interval is equal to a second value, wherein the first interval increases to the first value while the second interval decreases to the second value, wherein a sliding direction of the first page module while the first interval increases is opposite to the first direction, and wherein a size of at least one of the first, second, or third page modules varies during the sliding operation.

2. The page sliding processing method of claim 1, wherein a first width of the second page module in the first direction decreases in a first time period and increases in a second time period, and wherein a second width of the third page module in the first direction increases in a third time period and decreases in a fourth time period.

3. The page sliding processing method of claim 1, wherein a first width of the second page module in the first direction is unequal to a second width of the third page module in the first direction.

4. The page sliding processing method of claim 1, wherein the first interval between the first page module and the second page module decreases in a first time period and increases in a third time period.

5. The page sliding processing method of claim 4, wherein a first duration of the sliding operation is a sixth time period, wherein a third start moment of the sixth time period is the same as that of the first time period, and wherein a first cutoff moment is a third cutoff moment of the sixth time period.

6. The page sliding processing method of claim 5, wherein the first page module stops sliding after the sixth time period.

7. The page sliding processing method of claim 1, wherein before the first page module, the second page module, and the third page module slide in the first direction, the first interval decreases to the first value while the second interval increases to the second value, and wherein the sliding direction of the first page module is opposite to the first direction.

8. A device comprising:

a memory configured to store instructions; and a processor coupled to the memory and configured to:

display a first page module, a second page module, and a third page module that are of a first page, wherein the second page module, the first page module, and the third page module are sequentially arranged on the first page;

receive a sliding operation on the first page module in a first direction from the first page module to the second page module; and slide the first page module, the second page module, and the third page module in the first direction in response to the sliding operation, wherein a first interval between the first page module and the second page module decreases while a second interval between the first page module and the third page module increases, wherein the first interval between the first page module and the second page module increases while the second interval between the first page module and the third page module decreases, wherein before the first page module, the second page module, and the third page module slide in the first direction, the first interval is equal to a first value and the second interval is equal to a second value, wherein the first interval increases to the first value while the second interval decreases to the second value, wherein a sliding direction of the first page module while the first interval increases is opposite to the first direction, and wherein a size of at least one of the first, second, or third page modules varies during the sliding operation.

9. The device of claim 8, wherein a first width of the second page module in the first direction decreases in a first time period and increases in a second time period, and wherein a second width of the third page module in the first direction increases in a third time period and decreases in a fourth time period.

10. The device of claim 8, wherein a first width of the second page module in the first direction is unequal to a second width of the third page module in the first direction.

11. The device of claim 8, wherein the first interval between the first page module and the second page module decreases in a first time period and increases in a third time period.

12. The device of claim 11, wherein first duration of the sliding operation is a sixth time period, wherein a third start moment of the sixth time period is the same as that of the first time period, and wherein a first cutoff moment is a third cutoff moment of the sixth time period.

13. The device of claim 12, wherein the first page module stops sliding after the sixth time period.

14. The device of claim 8, wherein before the first page module, the second page module, and the third page module slide in the first direction, the first interval decreases to the first value while the second interval increases to the second value, and wherein a sliding direction of the first page module is opposite to the first direction.

15. A computer program product comprising computer-executable instructions that are stored on a non-transitory computer-readable storage medium and that, when executed by a processor, cause a device to:

display a first page module, a second page module, and a third page module that are of a first page, wherein the second page module, the first page module, and the third page module are sequentially arranged on the first page;

receive a sliding operation on the first page module in a first direction that points from the first page module to the second page module; and slide the first page module, the second page module, and the third page module in the first direction in response to the sliding operation, wherein a first interval between the first page module and the second page module decreases while a second interval between the first page module and the third page module increases and the first interval between the first page module, wherein the second page module increases while the second interval between the first page module and the third page module decreases, wherein before the first page module, the second page module, and the third page module slide in the first direction, the first interval is equal to a first value and the second interval is equal to a second value, wherein the first interval increases to the first value while the second interval decreases to the second value, wherein a sliding direction of the first page module while the first interval increases is opposite to the first direction, and wherein a size of at least one of the first, second, or third page modules varies during the sliding operation.

16. The computer program product of claim 15, wherein a first width of the second page module in the first direction decreases in a first time period and increases in a second time period, and wherein a second width of the third page module in the first direction increases in a third time period and decreases in a fourth time period.

17. The computer program product of claim 15, wherein a first width of the second page module in the first direction is unequal to a second width of the third page module in the first direction.

18. The computer program product of claim 15, wherein before the first page module, the second page module, and the third page module slide in the first direction, the first interval decreases to the first value while the second interval increases to the second value, and wherein the sliding direction of the first page module is opposite to the first direction.

* * * * *